United States Patent
Mitobe et al.

(10) Patent No.: US 11,768,324 B2
(45) Date of Patent: Sep. 26, 2023

(54) LIGHT ABSORPTION ANISOTROPIC LAYER, LAMINATE, OPTICAL FILM, IMAGE DISPLAY DEVICE, AND BACKLIGHT MODULE

(71) Applicant: FUJIFILM Corporation, Tokyo (JP)

(72) Inventors: Fumitake Mitobe, Kanagawa (JP); Naoya Nishimura, Kanagawa (JP); Takashi Katou, Kanagawa (JP); Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/848,105

(22) Filed: Jun. 23, 2022

(65) Prior Publication Data

US 2022/0342134 A1    Oct. 27, 2022

Related U.S. Application Data

(63) Continuation of application No. PCT/JP2020/046278, filed on Dec. 11, 2020.

(30) Foreign Application Priority Data

Dec. 26, 2019 (JP) .................. 2019-236916
Feb. 14, 2020 (JP) .................. 2020-023354
Oct. 30, 2020 (JP) .................. 2020-182666

(51) Int. Cl.
*G02B 5/30* (2006.01)
*F21V 8/00* (2006.01)

(52) U.S. Cl.
CPC ......... *G02B 5/3016* (2013.01); *G02B 6/0056* (2013.01); *G02B 6/0076* (2013.01)

(58) Field of Classification Search
CPC .. G02B 5/3016; G02B 6/0056; G02B 6/0076; G02B 5/3083; G02B 5/30; G09F 19/14; G02F 1/1335
See application file for complete search history.

(56) References Cited

U.S. PATENT DOCUMENTS

| | | | |
|---|---|---|---|
| 2009/0153783 A1 | 6/2009 | Umemoto | |
| 2018/0348557 A1* | 12/2018 | Nakano | ................ G02F 1/1339 |
| 2019/0250457 A1 | 8/2019 | Nishimura et al. | |
| 2019/0322937 A1 | 10/2019 | Matsuyama et al. | |
| 2019/0382586 A1 | 12/2019 | Katou et al. | |
| 2020/0033521 A1 | 1/2020 | Kuwayama et al. | |
| 2020/0033663 A1 | 1/2020 | Hoshino et al. | |
| 2020/0411609 A1 | 12/2020 | Yonemoto | |
| 2021/0072443 A1 | 3/2021 | Hoshino et al. | |
| 2021/0088825 A1 | 3/2021 | Muto | |

FOREIGN PATENT DOCUMENTS

| | | | | |
|---|---|---|---|---|
| CN | 110168051 A | 8/2019 | | |
| CN | 110476094 A | 11/2019 | | |
| JP | 2008-098037 A | 4/2008 | | |
| JP | 2008098037 A | * 4/2008 | ................ | F21V 8/00 |
| JP | 2009-145776 A | 7/2009 | | |
| JP | 2011-237513 A | 11/2011 | | |
| JP | 2017-181821 A | 10/2017 | | |
| JP | 2019-120949 A | 7/2019 | | |
| JP | 2019120949 A | * 7/2019 | ................ | G02B 5/30 |
| WO | 2018/079854 A1 | 5/2018 | | |
| WO | 2018/199096 A1 | 11/2018 | | |
| WO | 2019/176918 A1 | 9/2019 | | |
| WO | 2019/225468 A1 | 11/2019 | | |
| WO | WO-2019225468 A1 | * 11/2019 | ........... | B60H 1/2212 |
| WO | 2019/235355 A1 | 12/2019 | | |

OTHER PUBLICATIONS

International Search Report issued in PCT/JP2020/046278 dated Jan. 19, 2021.
Written Opinion issued in PCT/JP2020/046278 dated Jan. 19, 2021.
International Preliminary Report on Patentability completed by WIPO dated Jun. 28, 2022 in connection with International Patent Application No. PCT/JP2020/046278.
Office Action, issued by the Japanese Patent Office dated Jan. 31, 2023, in connection with Japanese Patent Application No. 2021-567239.
Office Action, issued by the Japanese Patent Office dated May 9, 2023, in connection with Japanese Patent Application No. 2021-567239.
Extended European Search Report issued by the European Patent Office dated May 9, 2023, in connection with European Patent Application No. 20906449.2.
Office Action, issued by the State Intellectual Property Office dated Jun. 8, 2023, in connection with Chinese Patent Application No. 202080089362.6.

* cited by examiner

*Primary Examiner* — Donald L Raleigh
(74) *Attorney, Agent, or Firm* — Edwards Neils LLC; Jean C. Edwards, Esq.

(57) ABSTRACT

Provided is a light absorption anisotropic layer including a dichroic substance, in which a transmittance as viewed from a front direction is high and a transmittance as viewed from an oblique direction can be lowered, a laminate, an optical film, an image display device, and a backlight module. The light absorption anisotropic layer includes a liquid crystalline compound and at least one dichroic substance, in which the dichroic substance is aligned perpendicular to the film surface, and an alignment degree of the light absorption anisotropic layer at a wavelength of 550 nm is 0.95 or more.

28 Claims, 1 Drawing Sheet

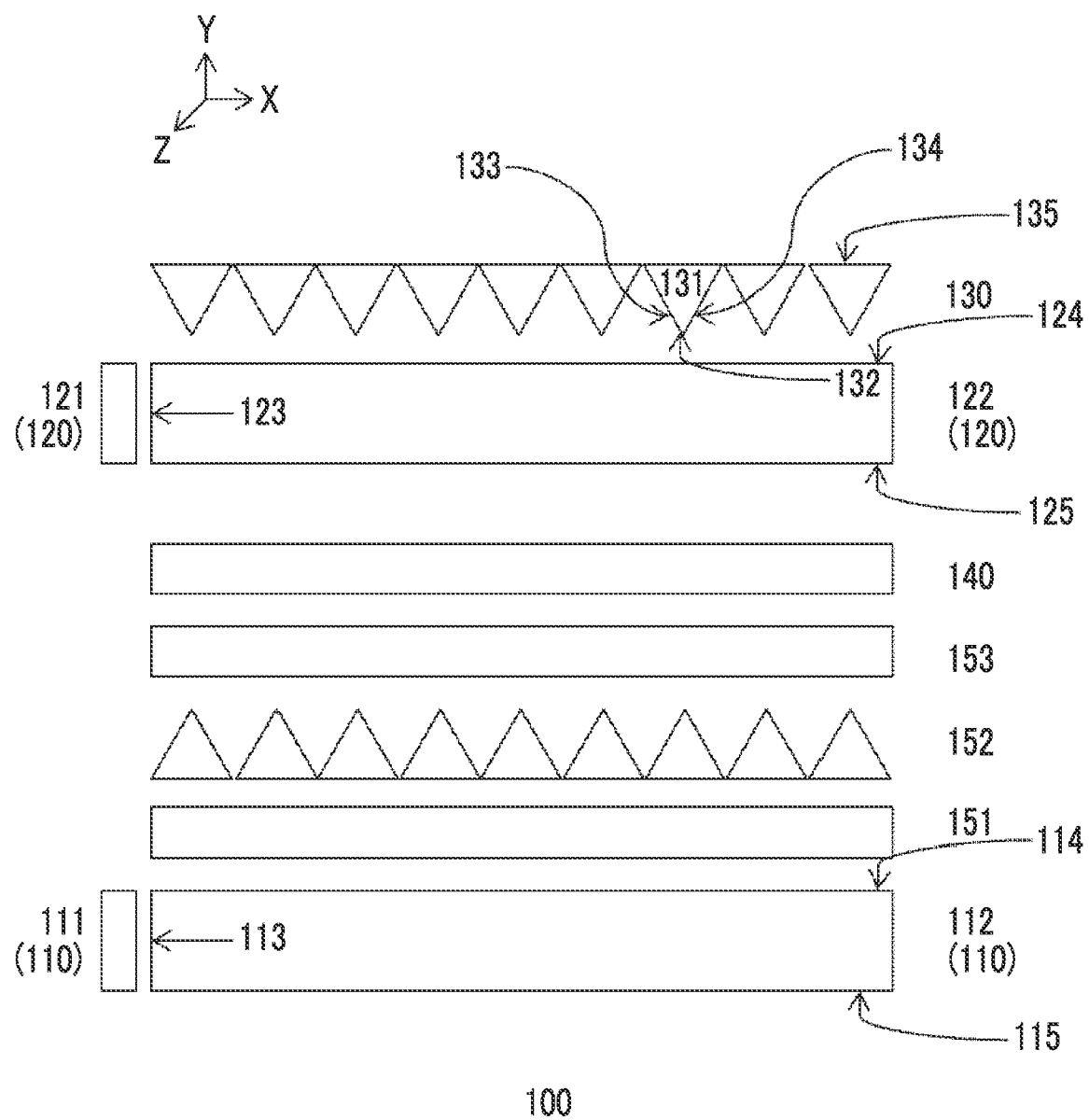

1

LIGHT ABSORPTION ANISOTROPIC LAYER, LAMINATE, OPTICAL FILM, IMAGE DISPLAY DEVICE, AND BACKLIGHT MODULE

CROSS-REFERENCE TO RELATED APPLICATIONS

This application is a Continuation of PCT International Application No. PCT/JP2020/046278 filed on Dec. 11, 2020, which was published under PCT Article 21(2) in Japanese, and which claims priority under 35 U.S.C. § 119(a) to Japanese Patent Application No. 2019-236916 filed on Dec. 26, 2019, Japanese Patent Application No. 2020-023354 filed on Feb. 14, 2020, and Japanese Patent Application No. 2020-182666 filed on Oct. 30, 2020. The above applications are hereby expressly incorporated by reference, in their entirety, into the present application.

BACKGROUND OF THE INVENTION

1. Field of the Invention

The present invention relates to a light absorption anisotropic layer, a laminate, an optical film, an image display device, and a backlight module.

2. Description of the Related Art

There is known a technique of using a light absorption anisotropic layer having an absorption axis in the thickness direction in order to prevent peeping into a liquid crystal display device or to control an angle of view. For example, in JP2009-145776A and WO2018/079854A, a polarizing element relating to a system that controls an angle of view, using a film including a dichroic substance and having an angle formed by an absorption axis and a normal of the film surface of 0° to 45°, is proposed.

SUMMARY OF THE INVENTION

In recent years, there have been problems in energy saving, a lifespan of organic electroluminescence (EL), and the like, and there have thus been an increasing demand for a film having a high transmittance in the front direction with respect to the film surface.

An object of the present invention is to provide a light absorption anisotropic layer including a dichroic substance, in which a transmittance as viewed from a front direction is high and a transmittance as viewed from an oblique direction can be lowered.

In addition, another object of the present invention is to provide a laminate, an optical film, an image display device, and a backlight module.

The present inventors have found that by setting an alignment degree of a light absorption anisotropic layer having a dichroic substance aligned perpendicular to the film surface at a wavelength of 550 nm to 0.95 or more, a front transmittance is high and a transmittance in an oblique direction can be lowered, thereby leading to the present invention.

That is, the present inventors have found that the objects can be accomplished by the following configurations.

(1) A light absorption anisotropic layer comprising:
a liquid crystalline compound; and
at least one dichroic substance,
in which the dichroic substance is aligned perpendicular to a film surface, and
an alignment degree of the light absorption anisotropic layer at a wavelength of 550 nm is 0.95 or more.

(2) The light absorption anisotropic layer as described in (1),
in which an alignment degree of the light absorption anisotropic layer at a wavelength of 420 nm is 0.93 or more.

(3) A light absorption anisotropic layer comprising:
a region A including a liquid crystalline compound and at least one dichroic substance; and
a region B having a higher oblique transmittance as viewed from a polar angle of 30° than the region A,
in which the dichroic substance is aligned perpendicular to a film surface, and
an alignment degree of the region A at a wavelength of 550 nm is 0.95 or more.

(4) The light absorption anisotropic layer as described in (3),
in which the oblique transmittance as viewed from a polar angle of 30° of the region A is 10% or less, and
the oblique transmittance as viewed from a polar angle of 30° of the region B is 80% or more.

(5) A laminate comprising:
the light absorption anisotropic layer as described in any one of (1) to (4); and
a polarizer layer
in which a dichroic substance is aligned horizontally with respect to a film surface, the light absorption anisotropic layer and the polarizer layer being laminated with each other.

(6) A laminate comprising:
the light absorption anisotropic layer as described in any one of (1) to (4); and
a polarizer layer
in which a liquid crystalline compound and a dichroic substance are aligned horizontally with respect to a film surface, the light absorption anisotropic layer and the polarizer layer being laminated with each other.

(7) An optical film comprising the light absorption anisotropic layer as described in any one of (1) to (4) or the laminate as described in (5) or (6).

(8) An image display device comprising the light absorption anisotropic layer as described in any one of (1) to (4), the laminate as described in (5) or (6), or the optical film as described in (7).

(9) The image display device as described in (8),
in which the image display device has a curved surface part in a display portion.

(10) An image display device capable of switching an angle of view, comprising the light absorption anisotropic layer as described in (3) or (4).

(11) An image display device capable of switching an angle of view, comprising the light absorption anisotropic layer as described in (1) or (2).

(12) A backlight module capable of switching an angle of view, comprising:
a first light guide plate;
an optical filter element; and
a second light guide plate in this order from a visual recognition side,
in which the optical filter element is the light absorption anisotropic layer as described in (1) or (2).

According to the present invention, it is possible to provide a light absorption anisotropic layer including a dichroic substance, in which a transmittance as viewed from a front direction is high and a transmittance as viewed from an oblique direction can be lowered.

In addition, according to the present invention, it is possible to provide a laminate, an optical film, an image display device, and a backlight module.

BRIEF DESCRIPTION OF THE DRAWINGS

FIG. 1 is a schematic diagram of a backlight module according to an embodiment of the present invention.

DESCRIPTION OF THE PREFERRED EMBODIMENTS

Hereinafter, the present invention will be described in detail.

Description of configuration requirements described below may be made based on representative embodiments of the present invention, but the present invention is not limited to such embodiments.

Furthermore, in the present specification, a numerical range expressed using "to" means a range which includes the preceding and succeeding numerical values of "to" as a lower limit value and an upper limit value, respectively.

In addition, in the present specification, being parallel and being perpendicular do not mean parallel and perpendicular in strict meanings, respectively, but mean ranges within ±5° from being parallel or perpendicular.

Moreover, in the present specification, in measurement of transmittances by changing the inclination angle (polar angle) and the inclination direction (azimuthal angle) of a light absorption anisotropic layer with respect to the normal direction, with a direction having the highest transmittance being taken as the central axis of the transmittance, in a case where an angle between a central axis of the transmittance and the film surface of the light absorption anisotropic layer (a main surface of the light absorption anisotropic layer) is almost vertical, the dichroic substance is defined to be aligned vertically. The alignment in which the angle between the central axis of the transmittance and the film surface is vertical means the alignment in which the angle is in the range of 70° to 90°, and the alignment in which the angle is in the range of 80° to 90° is preferable, and the alignment in which the angle is in the range of 85° to 900 is more preferable.

In addition, in the present specification, a liquid crystalline composition and a liquid crystalline compound further encompass those already not exhibiting liquid crystallinity by curing or the like in their concepts.

Moreover, in the present specification, as each component, a substance corresponding to each component may be used alone or in combination of two or more kinds thereof. Here, in a case where two or more kinds of substances are used in combination for each component, a content of the component refers to a total content of the substances used in combination unless otherwise specified.

Moreover, in the present specification, "(meth)acrylate" is a notation representing "acrylate" or "methacrylate", "(meth)acryl" is a notation representing "acryl" or "methacryl", and "(meth)acryloyl" is a notation representing "acryloyl" or "methacryloyl".

First Embodiment of Light Absorption Anisotropic Layer

A first embodiment of the light absorption anisotropic layer of the present invention is a light absorption anisotropic layer including a liquid crystalline compound and at least one dichroic substance, in which the dichroic substance is aligned perpendicular to a film surface (the main surface of the light absorption anisotropic layer), and an alignment degree of the light absorption anisotropic layer at a wavelength of 550 nm satisfies 0.95 or more.

Furthermore, the alignment degree of the light absorption anisotropic layer at a wavelength of 550 nm is preferably 0.96 or more from the viewpoint that the transmittance in a case where the light absorption anisotropic layer is viewed from the front direction is higher and the transmittance in a case where the light absorption anisotropic layer is viewed from an oblique direction can be lowered (hereinafter also simply expressed as follows: "the effect of the present invention is more excellent"). The upper limit is not particularly limited, but may be 1.00.

The alignment degree at a wavelength of 550 nm is calculated by the following method.

The transmittance of the light absorption anisotropic layer at a wavelength of 550 nm is measured using AxoScan OPMF-1 (manufactured by Opto Science, Inc.). At the time of measurement, the transmittance at a wavelength of 550 nm at the omnidirectional angle at each polar angle is measured while changing the polar angle which is an angle of the light absorption anisotropic layer with respect to the normal direction every 5° from 0 to 60°. Next, after removing the influence of surface reflection, the transmittance at an azimuthal angle and a polar angle, at which the transmittance is the highest, is defined as Tm(0), and the transmittance at an angle after further tilting a polar angle, at which the transmittance is the highest, by 40° is defined as Tm(40). Absorbances are calculated by the following equation from the obtained Tm(0) and Tm(40), and A(0) and A(40) are calculated.

$$A=-\log(Tm)$$

Here, Tm represents a transmittance and A represents an absorbance.

An alignment degree S defined by the following equation is calculated from the calculated A(0) and A(40).

$$S=(4.6\times A(40)-A(0))/(4.6\times A(40)+2\times A(0))$$

In the first embodiment of the light absorption anisotropic layer of the present invention, the front transmittance is high and the transmittance in an oblique direction can be lowered. This is presumed to be due to the following reasons.

By increasing the thickness of the light absorption anisotropic layer, it can be realized to lower the transmittance in an oblique direction, but the front transmittance is simultaneously decreased. It is considered that by setting the alignment degree of the light absorption anisotropic layer at a wavelength of 550 nm to 0.95 or more, the existence frequency of the dichroic substance whose absorption axis is deviated from the vertical direction is decreased. This is presumed to enable the absorption by the dichroic substance in a case where the light absorption anisotropic layer is viewed from the front direction to be suppressed, and as a result, enable the transmittance in the front direction to be increased.

In addition, it is preferable that an alignment degree of the light absorption anisotropic layer at a wavelength of 420 nm satisfies 0.93 or more from the viewpoint that a tint in the front direction can be neutralized. Above all, the alignment degree at a wavelength of 420 nm is preferably 0.94 or more from the viewpoint that the tint in the front direction can be further neutralized. The upper limit is not particularly limited, but is preferably 1.00.

The tint control of the light absorption anisotropic layer including the dichroic substance is usually performed by adjusting the addition amount of the dichroic substance included in the light absorption anisotropic layer. However, it was found that it was not possible to set both the tints in the front direction and the oblique direction to the neutral states only by adjusting the addition amount of the dichroic substance. A reason why the tints in the front direction and the oblique direction could not be set to the neutral states was found to be that the alignment degree at a wavelength of 420 nm was low, and thus, the tints in the front direction and the oblique direction can be neutralized by setting the alignment degree at a wavelength of 420 nm to a high level.

Examples of a method for calculating the alignment degree at a wavelength of 420 nm include a modified method of the above-mentioned method for calculating the alignment degree at a wavelength of 550 nm by changing the measurement wavelength from 550 nm to 420 nm.

[Liquid Crystalline Compound]

The light absorption anisotropic layer includes a liquid crystalline compound. By incorporating the liquid crystalline compound into the composition, it is possible to align the dichroic substance with a high alignment degree while suppressing the precipitation of the dichroic substance.

The liquid crystalline compound is a liquid crystalline compound which does not exhibit dichroism.

As the liquid crystalline compound, either a low-molecular-weight liquid crystalline compound or a high-molecular-weight liquid crystalline compound can be used, and it is also preferable to use the both in combination. Here, the "low-molecular-weight liquid crystalline compound" refers to a liquid crystalline compound having no repeating unit in the chemical structure. In addition, the "high-molecular-weight liquid crystalline compound" refers to a liquid crystalline compound having a repeating unit in the chemical structure.

Examples of the low-molecular-weight liquid crystalline compound include the liquid crystalline compounds described in JP2013-228706A. As the low-molecular-weight liquid crystalline compound, a liquid crystalline compound exhibiting a smectic phase can also be preferably used.

Examples of the high-molecular-weight liquid crystalline compound include the thermotropic liquid crystalline polymers described in JP2011-237513A. In addition, it is preferable that the high-molecular-weight liquid crystalline compound has a repeating unit having a crosslinkable group at a terminal thereof from the viewpoint that the strength (particularly bending resistance) of the light absorption anisotropic film is excellent. Examples of the crosslinkable group include the polymerizable groups described in paragraphs [0040] to [0050] of JP2010-244038A. Among these, the acryloyl group, the methacryloyl group, the epoxy group, the oxetanyl group, or the styryl group is preferable, and the acryloyl group or the methacryloyl group is more preferable from the viewpoint of improving the reactivity and the synthesis suitability.

In a case where the light absorption anisotropic layer in the embodiment of the present invention includes a high-molecular-weight liquid crystalline compound, it is preferable that the high-molecular-weight liquid crystalline compound forms a nematic liquid crystal phase.

A temperature range exhibiting a nematic liquid crystal phase is preferably room temperature (23° C.) to 450° C., and preferably 50° C. to 400° C. from the viewpoint of handling and manufacturing suitability.

A content of the liquid crystalline compound is preferably 25 to 2,000 parts by mass, more preferably 100 to 1,300 parts by mass, and still more preferably 200 to 900 parts by mass with respect to 100 parts by mass of a content of the dichroic substance in the light absorption anisotropic layer. By setting the content of the liquid crystalline compound to be within the range, the alignment degree of the light absorption anisotropic layer is further improved.

The liquid crystalline compounds may be included alone or in combination of two or more kinds thereof. In a case where two or more kinds of liquid crystalline compounds are included, the content of the liquid crystalline compounds means a total content of the liquid crystalline compounds.

For a reason that the alignment degree is more excellent, the liquid crystalline compound is preferably a high-molecular-weight liquid crystalline compound including a repeating unit represented by Formula (1L) (hereinafter also referred to as a "repeating unit (1L)").

In Formula (1L), P1 represents a main chain of the repeating unit, L1 represents a single bond or a divalent linking group, SP1 represents a spacer group, M1 represents a mesogenic group, and T1 represents a terminal group.

Specific examples of the main chain of the repeating unit represented by P1 include groups represented by Formulae (P1-A) to (P1-D), and among these, the group represented by Formula (P1-A) is preferable from the viewpoints of a diversity of monomers used as raw materials and easy handling.

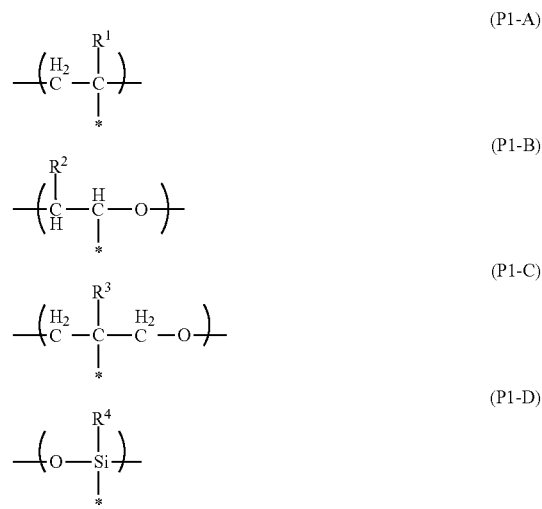

In Formulae (P1-A) to (P1-D), "*" represents a bonding position to L1 in Formula (1L). In Formulae (P1-A) to (P1-D), $R^1$, $R^2$, $R^3$, and $R^4$ each independently represent a hydrogen atom, a halogen atom, an alkyl group having 1 to 10 carbon atoms, or an alkoxy group having 1 to 10 carbon atoms. The alkyl group may be a linear or branched alkyl group, or may be an alkyl group (cycloalkyl group) having a cyclic structure. Moreover, the number of carbon atoms in the alkyl group is preferably 1 to 5.

A group represented by Formula (P1-A) is preferably one unit of a partial structure of poly(meth)acrylic acid ester obtained by polymerization of (meth)acrylic acid ester.

A group represented by Formula (P1-B) is preferably an ethylene glycol unit formed by ring-opening polymerization of an epoxy group of a compound having the epoxy group.

A group represented by Formula (P1-C) is preferably a propylene glycol unit formed by ring-opening polymerization of an oxetane group of a compound having the oxetane group.

A group represented by Formula (P1-D) is preferably a siloxane unit of a polysiloxane obtained by condensation polymerization of a compound having at least one group of an alkoxysilyl group or a silanol group. Here, examples of the compound having at least one group of an alkoxysilyl group or a silanol group include a compound having a group represented by a formula of $SiR^4(OR_5)_2$—. In the formula, $R^4$ has the same definition as $R^4$ in Formula (P1-D), and a plurality of $R^5$'s each independently represent a hydrogen atom or an alkyl group having 1 to 10 carbon atoms.

L1 is a single bond or a divalent linking group.

Examples of the divalent linking group represented by L1 include —C(O)O—, —OC(O)—, —O—, —S—, —C(O)NR$^3$—, —NR$^3$C(O)—, —SO$_2$—, and —NR$^3$R$^4$—. In the formulae, $R^3$ and $R^4$ each independently represent a hydrogen atom, or an alkyl group having 1 to 6 carbon atoms, which may have a substituent W (which will be described).

In a case where P1 is the group represented by Formula (P1-A), L1 is preferably a group represented by —C(O)O— from the viewpoint that the alignment degree is more excellent.

In a case where P1 is the group represented by each of Formulae (P1-B) to (P1-D), L1 is preferably the single bond from the viewpoint that the alignment degree is more excellent.

From the viewpoints of easy exhibition of liquid crystallinity, availability of a raw material, and the like, it is preferable that the spacer group represented by SP1 includes at least one structure selected from the group consisting of an oxyethylene structure, an oxypropylene structure, a polysiloxane structure, and an alkylene fluoride structure.

Here, the oxyethylene structure represented by SP1 is preferably a group represented by *—(CH$_2$—CH$_2$O)$_{n1}$—*. In the formula, n1 represents an integer of 1 to 20, and * represents a bonding position to L1 or M1 in Formula (1L). From the viewpoint that the alignment degree is more excellent, n1 is preferably an integer of 2 to 10, more preferably an integer of 2 to 4, and still more preferably 3.

In addition, from the viewpoint that the alignment degree is more excellent, the oxypropylene structure represented by SP1 is preferably a group represented by *—(CH(CH$_3$)—CH$_2$O)$_{n2}$—*. In the formula, n2 represents an integer of 1 to 3, and * represents a bonding position to L1 or M1.

In addition, from the viewpoint that the alignment degree is more excellent, the polysiloxane structure represented by SP1 is preferably a group represented by *—(Si(CH$_3$)$_2$—O)$_{n3}$—*. In the formula, n3 represents an integer of 6 to 10, and * represents a bonding position to L1 or M1.

In addition, from the viewpoint that the alignment degree is more excellent, the alkylene fluoride structure represented by SP1 is preferably a group represented by *—(CF$_2$—CF$_2$)$_{n4}$—*. In the formula, n4 represents an integer of 6 to 10, and * represents a bonding position to L1 or M1.

The mesogenic group represented by M1 is a group indicating a main skeleton of a liquid crystal molecule which contributes to liquid crystal formation. The liquid crystal molecule exhibits liquid crystallinity which is an intermediate state (mesophase) between a crystalline state and an isotropic liquid state. The mesogenic group is not particularly limited, and reference can be made to, for example, "Flussige Kristalle in Tabellen II" (VEB Deutsche Verlag fur Grundstoff Industrie, Leipzig, published in 1984), particularly the descriptions on pages 7 to 16, and Editorial committee of Liquid Crystal Handbook, liquid crystal handbook (Maruzen Publishing Co., Ltd., published in 2000), particularly the descriptions in Chapter 3.

As the mesogenic group, for example, a group having at least one kind of cyclic structure selected from the group consisting of an aromatic hydrocarbon group, a heterocyclic group, and an alicyclic group is preferable.

From the viewpoint that the alignment degree is more excellent, the mesogenic group preferably has aromatic hydrocarbon groups, more preferably has two to four aromatic hydrocarbon groups, and still more preferably has three aromatic hydrocarbon groups.

As the mesogenic group, a group represented by Formula (M1-A) or Formula (M1-B) is preferable, and the group represented by Formula (M1-B) is more preferable from the viewpoints of exhibition of liquid crystallinity, adjustment of a liquid crystal phase transition temperature, availability of a raw material, and synthesis suitability, and from the viewpoint that the alignment degree is more excellent.

(M1-A)

(M1-B)

In Formula (M1-A), A1 is a divalent group selected from the group consisting of an aromatic hydrocarbon group, a heterocyclic group, and an alicyclic group. These groups may be substituted with an alkyl group, an alkyl fluoride group, an alkoxy group, or a substituent W.

The divalent group represented by A1 is preferably a 4- to 6-membered ring. Moreover, the divalent group represented by A1 may be monocyclic or condensed cyclic.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoint of a diversity of design of a mesogenic skeleton, availability of a raw material, or the like, a phenylene group or a naphthylene group is preferable and a phenylene group is more preferable.

The divalent heterocyclic group represented by A1 may be either a divalent aromatic heterocyclic group or a divalent non-aromatic heterocyclic group, but is preferably the divalent aromatic heterocyclic group from the viewpoint that the alignment degree is further improved.

Examples of atoms which constitute the divalent aromatic heterocyclic group and are other than carbon include a nitrogen atom, a sulfur atom, and an oxygen atom. In a case where the aromatic heterocyclic group has a plurality of atoms which constitute a ring and are other than carbon, these atoms may be the same as or different from each other.

Specific examples of the divalent aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or more, a plurality of A1's may be the same as or different from each other.

In Formula (M1-B), A2 and A3 are each independently a divalent group selected from the group consisting of an aromatic hydrocarbon group, a heterocyclic group, and an alicyclic group. Specific examples and suitable aspects of A2 and A3 are the same as those of A1 in Formula (M1-A), and thus descriptions thereof will be omitted.

In Formula (M1-B), a2 represents an integer of 1 to 10, and in a case where a2 is 2 or more, a plurality of A2's may be the same as or different from each other, a plurality of A3's may be the same as or different from each other, and a plurality of LA1's may be the same as or different from each other. From the viewpoint that the alignment degree is more excellent, a2 is preferably an integer of 2 or more, and more preferably 2.

In Formula (M1-B), in a case where a2 is 1, LA1 is a divalent linking group. In a case where a2 is 2 or more, the plurality of LA1's are each independently a single bond or a divalent linking group, and at least one among the plurality of LA1's is a divalent linking group. From the viewpoint that the alignment degree is more excellent, in a case where a2 is 2, it is preferable that one of two LA1's is the divalent linking group and the other is the single bond.

In Formula (M1-B), examples of the divalent linking group represented by LA1 include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, —C(O)O— is preferable from the viewpoint that the alignment degree is more excellent. LA1 may be a group obtained by combining two or more of these groups.

Specific examples of M1 include the following structures. Moreover, in the following specific examples, "Ac" represents an acetyl group.

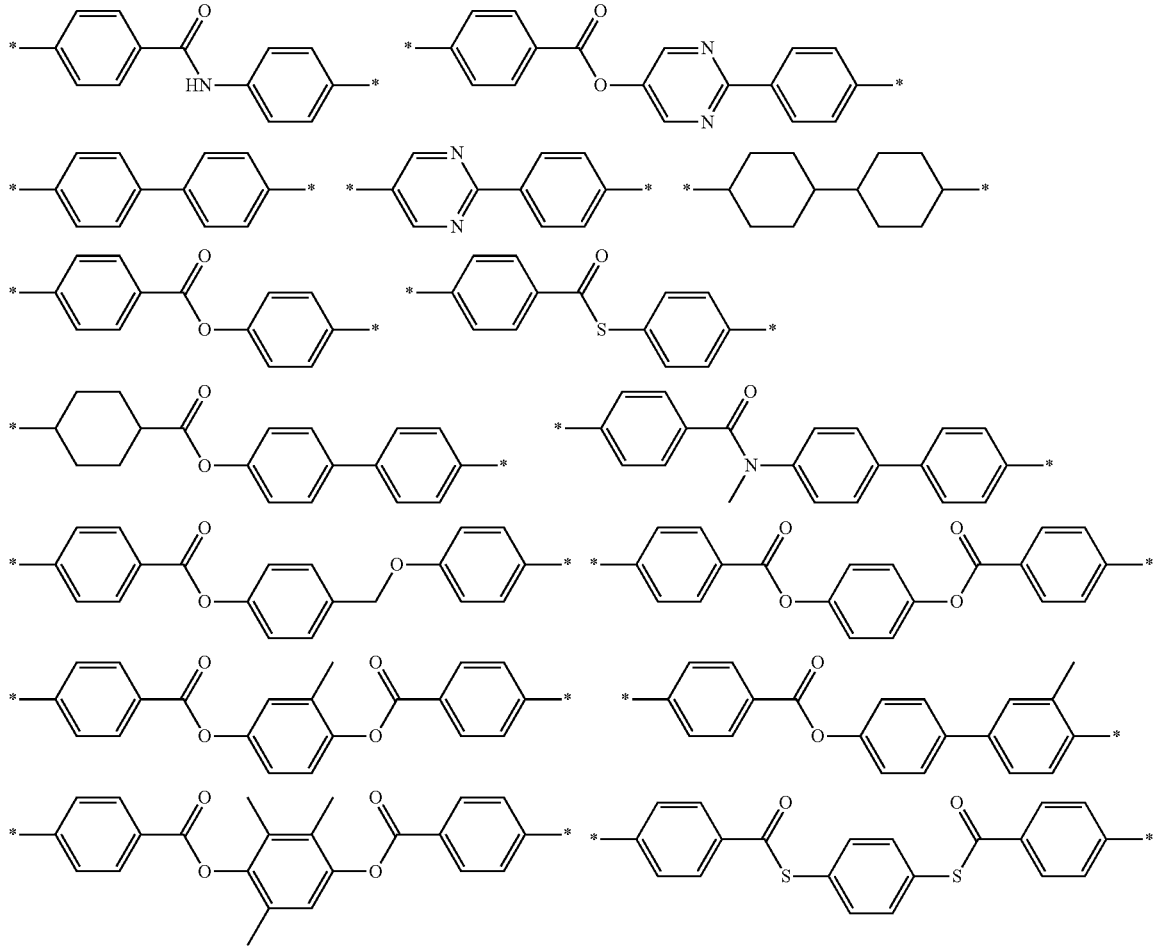

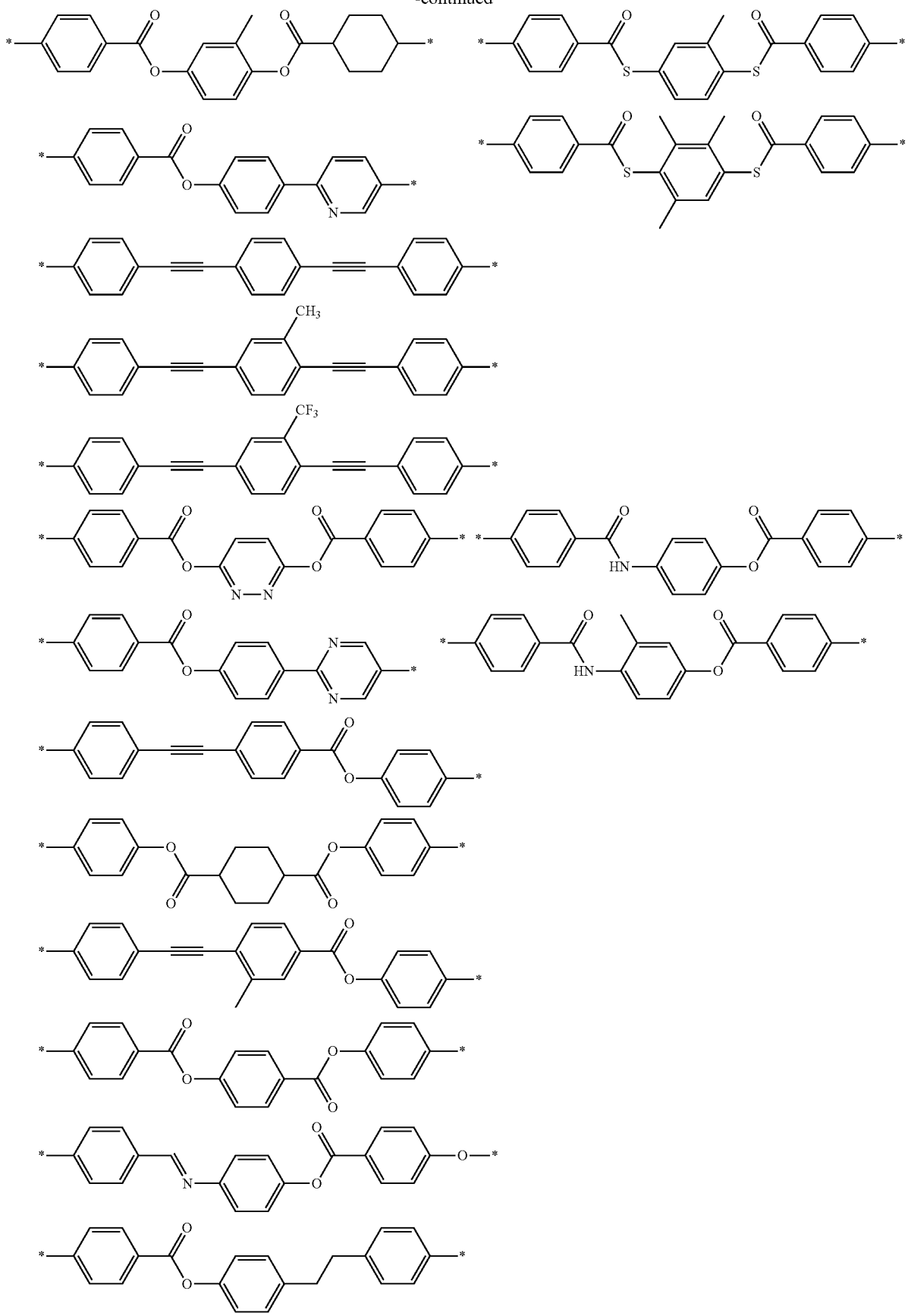

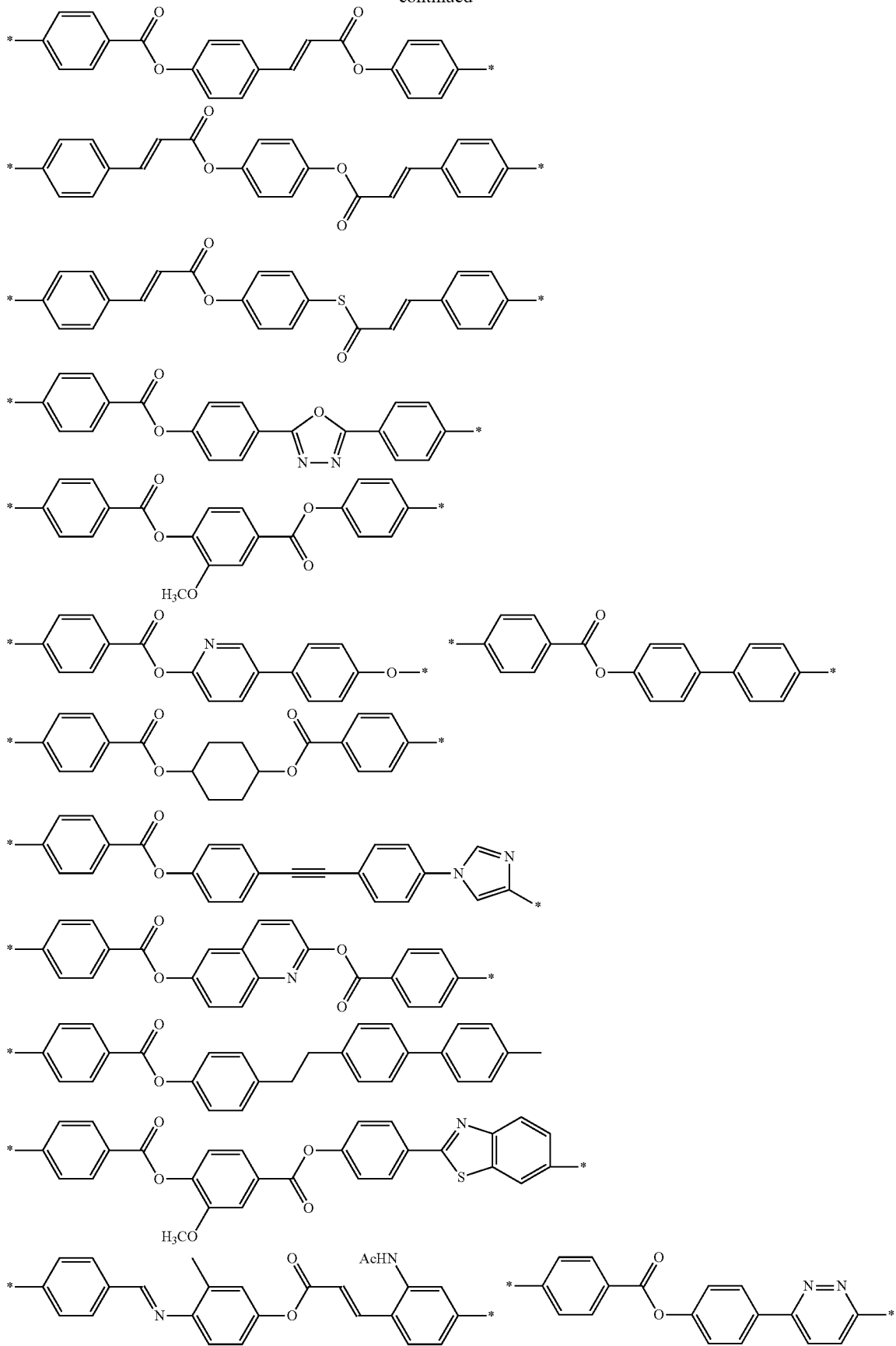

-continued
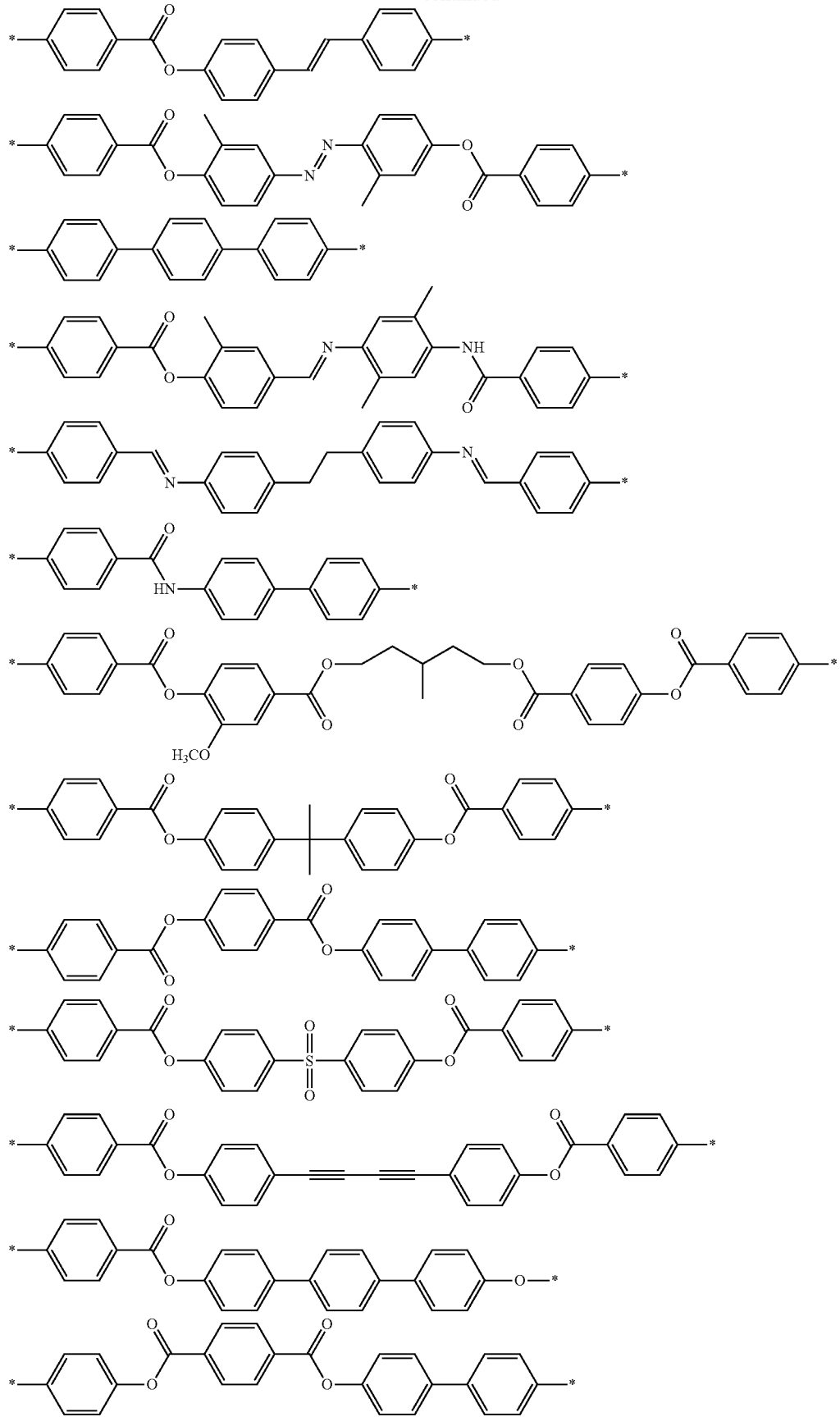

-continued

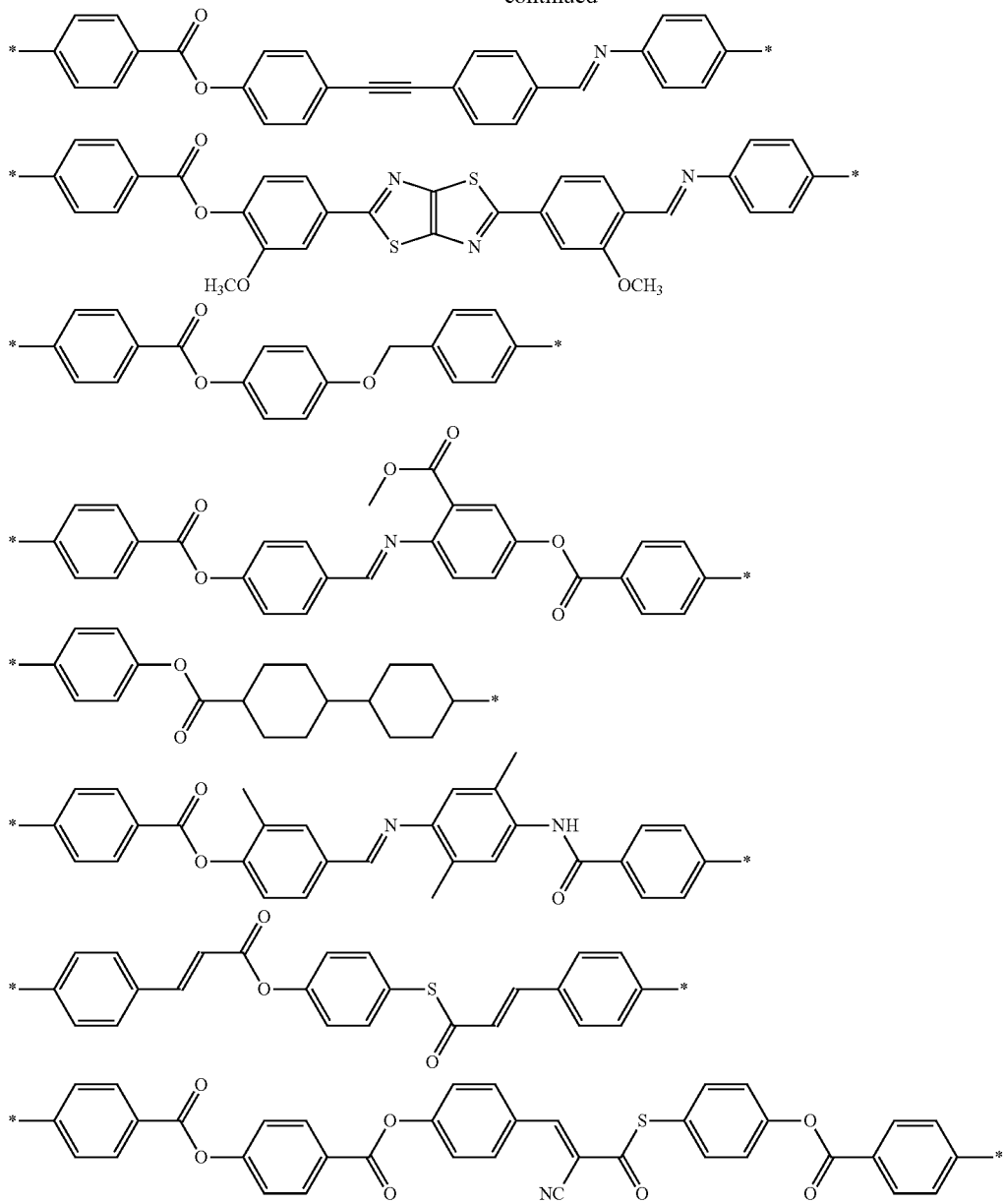

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group (ROC(O)—: R is an alkyl group) having 1 to 10 carbon atoms, an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureide group having 1 to 10 carbon atoms, and a (meth)acryloyloxy group-containing group. Examples of the (meth)acryloyloxy group-containing group include a group represented by -L-A (L represents a single bond or a linking group. Specific examples of the linking group are the same as those of L1 and SP1. A represents a (meth) acryloyloxy group).

From the viewpoint that the alignment degree is more excellent, T1 is preferably an alkoxy group having 1 to 10 carbon atoms, more preferably an alkoxy group having 1 to 5 carbon atoms, and still more preferably a methoxy group. These terminal groups may be further substituted with these groups or the above-mentioned crosslinkable group.

From the viewpoint that the alignment degree is more excellent, the number of atoms in the main chain of T1 is preferably 1 to 20, more preferably 1 to 15, still more preferably 1 to 10, and particularly preferably 1 to 7. In a case where the number of atoms in the main chain of T1 is 20 or less, the alignment degree of the light absorption anisotropic layer is further improved. Here, the "main chain" in T1 means the longest molecular chain bonded to M1, and the number of hydrogen atoms is not counted as the number of atoms in the main chain of T1. For example, in a case where T1 is an n-butyl group, the number of atoms in the main chain is 4, and in a case where T1 is a sec-butyl group, the number of atoms in the main chain is 3.

From the viewpoint that the alignment degree is more excellent, a content of the repeating unit (1L) is preferably 20% to 100% by mass with respect to 100% by mass of all the repeating units in the high-molecular-weight liquid crystalline compound.

In the present invention, a content of each repeating unit included in the high-molecular-weight liquid crystalline compound is calculated based on a charged amount (mass) of each monomer used to obtain each repeating unit.

The high-molecular-weight liquid crystalline compound may include one kind of repeating unit (1L) alone, or two or more kinds thereof. Among those, two kinds of the repeating units (1L) are preferably included in the high-molecular-weight liquid crystalline compound from the viewpoint that the alignment degree is more excellent.

From the viewpoint that the alignment degree is more excellent, in a case where the high-molecular-weight liquid crystalline compound includes two kinds of the repeating units (1L), it is preferable that the terminal group represented by T1 in one repeating unit (repeating unit A) is an alkoxy group and the terminal group represented by T1 in the other repeating unit (repeating unit B) is a group other than an alkoxy group.

From the viewpoint that the alignment degree is more excellent, the terminal group represented by T1 in the repeating unit B is preferably an alkoxycarbonyl group, a cyano group, or a (meth)acryloyloxy group-containing group, and more preferably an alkoxycarbonyl group or a cyano group.

From the viewpoint that the alignment degree is more excellent, a proportion (A/B) of the content of the repeating unit A in the high-molecular-weight liquid crystalline compound to the content of the repeating unit B in the high-molecular-weight liquid crystalline compound is preferably 50/50 to 95/5, more preferably 60/40 to 93/7, and still more preferably 70/30 to 90/10.

In addition, the high-molecular-weight liquid crystalline compound may have a repeating unit having no mesogenic group, in addition to a repeating unit (1L). Examples of the repeating unit having no mesogenic group include a repeating unit in which M1 in Formula (1L) is a single bond.

From the viewpoint that the alignment degree is more excellent, in a case where the high-molecular-weight liquid crystalline compound has the repeating unit having no mesogenic group, a content of the repeating unit having no mesogenic group is preferably more than 0% by mass and 30% by mass or less, and more preferably more than 10% by mass and 20% by mass or less with respect to 100% by mass of all the repeating units of the high-molecular-weight liquid crystalline compound.

From the viewpoint that the alignment degree is more excellent, a weight-average molecular weight (Mw) of the high-molecular-weight liquid crystalline compound is preferably 1,000 to 500,000 and more preferably 2,000 to 300,000. In a case where the Mw of the high-molecular-weight liquid crystalline compound is in the range, the handling of the high-molecular-weight liquid crystalline compound is easy.

In particular, from the viewpoint of suppression of cracks during application, the weight-average molecular weight (Mw) of the high-molecular-weight liquid crystalline compound is preferably 10,000 or more, and more preferably 10,000 to 300,000. In addition, from the viewpoint of a temperature latitude of the alignment degree, the weight-average molecular weight (Mw) of the high-molecular-weight liquid crystalline compound is preferably less than 10,000 and more preferably 2,000 or more and less than 10,000.

Here, the weight-average molecular weight and the number-average molecular weight in the present invention are values measured by a gel permeation chromatography (GPC) method.

Solvent (eluent): N-Methylpyrrolidone
Device name: TOSOH HLC-8220GPC
Column: Three columns of TOSOH TSKgel Super AWM-H (6 mm×15 cm) linked to each other are used
Column temperature: 25° C.
Sample concentration: 0.1% by mass
Flow rate: 0.35 mL/min
Calibration curve: Calibration curve obtained from seven samples of TSK standard polystyrene Mw of 2,800,000 to 1,050 (Mw/Mn=1.03 to 1.06) manufactured by Tosoh Corporation is used The substituent W in the present specification will be explained.

Examples of the substituent W include an alkyl group (preferably an alkyl group having 1 to 20 carbon atoms, more preferably an alkyl group having 1 to 12 carbon atoms, and still more preferably an alkyl group having 1 to 8 carbon atoms, such as a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and still more preferably an alkenyl group having 2 to 8 carbon atoms, such as a vinyl group, an allyl group, a 2-butenyl group, and a 3-pentenyl group), an alkynyl group (preferably an alkynyl group having 2 to 20 carbon atoms, more preferably an alkynyl group having 2 to 12 carbon atoms, and still more preferably an alkynyl group having 2 to 8 carbon atoms, such as a propargyl group and a 3-pentynyl group), an aryl group (preferably an aryl group having 6 to 30 carbon atoms, more preferably an aryl group having 6 to 20 carbon atoms, and still more preferably an aryl group having 6 to 12 carbon atoms, such as a phenyl group, a 2,6-diethylphenyl group, a 3,5-ditrifluoromethylphenyl group, a styryl group, a naphthyl group, and a biphenyl group), a substituted or unsubstituted amino group (preferably a substituted or unsubstituted amino group having 0 to 20 carbon atoms, more preferably a substituted or unsubstituted amino group having 0 to 10 carbon atoms, and still more preferably a substituted or unsubstituted amino group having 0 to 6 carbon atoms, such as an unsubstituted amino group, a methylamino group, a dimethylamino group, a diethylamino group, and an anilino group), an alkoxy group (preferably an alkoxy group having 1 to 20 carbon atoms, and more preferably an alkoxy group having 1 to 15 carbon atoms, such as a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and still more preferably an oxycarbonyl group having 2 to 10 carbon atoms, such as a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and still more preferably an acyloxy group having 2 to 6 carbon atoms, such as an acetoxy group, a benzoyloxy group, an acryloyl group, and a methacryloyl group), an acylamino group (preferably an acylamino group having 2 to 20 carbon atoms, more preferably an acylamino group having 2 to 10 carbon atoms, and still more preferably an acylamino group having 2 to 6 carbon atoms, such as an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and still more preferably an alkoxycarbonylamino group having 2 to 6 carbon atoms, such as a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and still more preferably an aryloxycarbonylamino group having 7 to 12 carbon atoms, such as a phenyloxycarbonylamino group), a sulfonylamino group (preferably a sulfonylamino group having 1 to 20 carbon atoms, more preferably a sulfonylamino group having 1 to 10 carbon atoms, and still more preferably a sulfonylamino group having 1 to 6 carbon atoms, such as a methanesulfonylamino group and a benzenesulfonylamino group), a sulfamoyl group (preferably a sulfamoyl group having 0 to 20 carbon atoms, more preferably a sulfamoyl group having 0 to 10 carbon atoms, and still more preferably a sulfamoyl group having 0 to 6 carbon atoms, such as an unsubstituted sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and still more preferably a carbamoyl group having 1 to 6 carbon atoms, such as an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and still more preferably an alkylthio group having 1 to 6 carbon atoms, such as a methylthio group and an ethylthio group), an arylthio group (preferably an arylthio group having 6 to 20 carbon atoms, more preferably an arylthio group having 6 to 16 carbon atoms, and still more preferably an arylthio group having 6 to 12 carbon atoms, such as a phenylthio group), a sulfonyl group (preferably a sulfonyl group having 1 to 20 carbon atoms, more preferably a sulfonyl group having 1 to 10 carbon atoms, and still more preferably a sulfonyl group having 1 to 6 carbon atoms, such as a mesyl group and a tosyl group), a sulfinyl group (preferably a sulfinyl group having 1 to 20 carbon atoms, more preferably a sulfinyl group having 1 to 10 carbon atoms, and still more preferably a sulfinyl group having 1 to 6 carbon atoms, such as a methanesulfinyl group and a benzenesulfinyl group), a ureide group (preferably a ureide group having 1 to 20 carbon atoms, more preferably a ureide group having 1 to 10 carbon atoms, and still more preferably a ureide group having 1 to 6 carbon atoms, such as an unsubstituted ureide group, a methylureide group, and a phenylureide group), a phosphate amide group (preferably a phosphate amide group having 1 to 20 carbon atoms, more preferably a phosphate amide group having 1 to 10 carbon atoms, and still more preferably a phosphate amide group having 1 to 6 carbon atoms, such as a diethylphosphoramide group and a phenylphosphoramide group), a hydroxy group, a mercapto group, a halogen atom (for example, a fluorine atom, a chlorine atom, a bromine atom, and an iodine atom), a cyano group, a nitro group, a hydroxamic acid group, a sulfino group, a hydrazino group, an imino group, an azo group, a heterocyclic group (preferably a heterocyclic group having 1 to 30 carbon atoms, and more preferably a heterocyclic group having 1 to 12 carbon atoms, such as a heterocyclic group having a heteroatom such as a nitrogen atom, an oxygen atom, and a sulfur atom, such as an epoxy group, an oxetanyl group, an imidazolyl group, a pyridyl group, a quinolyl group, a furyl group, a piperidyl group, a morpholino group, a benzoxazolyl group, a benzimidazolyl group, and a benzthiazolyl group), a silyl group (preferably a silyl group having 3 to 40 carbon atoms, more preferably a silyl group having 3 to 30 carbon atoms, and still more preferably a silyl group having 3 to 24 carbon atoms, such as a trimethylsilyl group and a triphenylsilyl group), a carboxyl group, a sulfonic acid group, and a phosphoric acid group.

[Dichroic Substance]

The dichroic substance used in the present invention is not particularly limited, and is a visible light absorption substance (a dichroic coloring agent or a dichroic azo compound), a luminescent substance (a fluorescent substance, a phosphorescent substance), an ultraviolet absorbing substance, an infrared absorbing substance, a nonlinear optical substance, a carbon nanotube, and an inorganic substance (for example, a quantum rod), and dichroic substances (dichroic coloring agents) known in the related art can be used.

A particularly preferably used dichroic substance is a dichroic azo coloring agent compound.

The dichroic azo coloring agent compound is not particularly limited, the dichroic azo coloring agents known in the related art can be used, but compounds described below are preferably used.

In the present invention, the dichroic azo coloring agent compound means a coloring agent having an absorbance that varies depending on a direction.

The dichroic azo coloring agent compound may or may not exhibit liquid crystallinity.

In a case where the dichroic azo coloring agent compound exhibits liquid crystallinity, it may exhibit either a nematic property or a smectic property. A temperature range exhibiting a liquid crystal phase is preferably room temperature (about 20° C. to 28° C.) to 300° C., and more preferably 50° C. to 200° C. from the viewpoint of handleability and manufacturing suitability.

In the present invention, from the viewpoint of tint adjustment, it is preferable that the light absorption anisotropic layer has at least one coloring agent compound having a maximum absorption wavelength in the wavelength range of 560 to 700 nm (hereinafter also simply referred to as a "first dichroic azo coloring agent compound") and at least one coloring agent compound having a maximum absorption wavelength in the wavelength range of 455 nm or more and less than 560 nm (hereinafter also simply referred to as a "second dichroic azo coloring agent compound"), and specifically, it is more preferable that the light absorption anisotropic layer includes at least a dichroic azo coloring agent compound represented by Formula (1) which will be described later and a dichroic azo coloring agent compound represented by Formula (2) which will be described later.

In the present invention, three or more kinds of dichroic azo coloring agent compounds may be used in combination, and for example, from the viewpoint of bringing the light absorption anisotropic layer closer to black, it is preferable that the first dichroic azo coloring agent compound and the second dichroic azo coloring agent compound are used in combination with at least one coloring agent compound having a maximum absorption wavelength in the wavelength range of 380 nm or more and less than 455 nm (hereinafter also simply referred to as a "third dichroic azo coloring agent compound").

In the present invention, the dichroic azo coloring agent compound preferably has a crosslinkable group from the viewpoint that the pressing resistance is improved.

Specific examples of the crosslinkable group include a (meth)acryloyl group, an epoxy group, an oxetanyl group, and a styryl group, and among these, the (meth)acryloyl group is preferable.

(First Dichroic Azo Coloring Agent Compound)

The first dichroic azo coloring agent compound is preferably a compound having a chromophore as a nucleus and a side chain bonded to a terminal of the chromophore.

Specific examples of the chromophore include an aromatic ring group (for example, an aromatic hydrocarbon group and an aromatic heterocyclic group); and an azo group, and preferably has a structure having both an aromatic ring group and an azo group, and more preferably has a bisazo structure having an aromatic heterocyclic group (preferably a thienothiazole group) and two azo groups.

The side chain is not particularly limited, and examples thereof include groups represented by R1, R2, and R3 of Formula (1) which will be described later.

The first dichroic azo coloring agent compound is a dichroic azo coloring agent compound having a maximum absorption wavelength in the wavelength range from 560 nm to 700 nm, and from the viewpoint of adjusting the tint of the light absorption anisotropic layer, the first dichroic azo coloring agent compound is preferably a first dichroic azo coloring agent compound having a maximum absorption wavelength in the wavelength range of 560 to 650 nm, and more preferably a dichroic azo coloring agent compound having a maximum absorption wavelength in the wavelength range of 560 to 640 nm.

The maximum absorption wavelength (nm) of the dichroic azo coloring agent compound in the present specification is determined from an ultraviolet visible light spectrum in the wavelength range of 380 to 800 nm measured by a spectrophotometer, using a solution in which the dichroic azo coloring agent compound is dissolved in a good solvent.

In the present invention, the first dichroic azo coloring agent compound is preferably a compound represented by Formula (1) from the viewpoint that the alignment degree of a light absorption anisotropic layer thus formed is further improved.

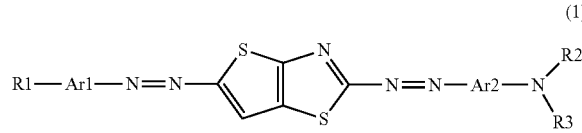

(1)

In Formula (1), Ar1 and Ar2 each independently represent a phenylene group which may have a substituent or a naphthylene group which may have a substituent, and the phenylene group is preferable.

In Formula (1), R1 represents a hydrogen atom, a linear or branched alkyl group which may have a substituent having 1 to 20 carbon atoms, an alkoxy group, an alkylthio group, an alkylsulfonyl group, an alkylcarbonyl group, an alkyloxycarbonyl group, an acyloxy group, an alkyl carbonate group, an alkylamino group, acylamino group, an alkylcarbonylamino group, an alkoxycarbonylamino group, an alkylsulfonylamino group, an alkylsulfamoyl group, an alkylcarbamoyl group, an alkylsulfinyl group, an alkylureide group, an alkylphosphate amide group, an alkylimino group, or an alkylsilyl group.

—$CH_2$— constituting the alkyl group may be substituted with —O—, —CO—, —C(O)—O—, —O—C(O)—, —Si($CH_3$)$_2$—O—Si($CH_3$)$_2$—, —N(R1')—, —N(R1')—CO—, —CO—N(R1')—, —N(R1')—C(O)—O—, —O—C(O)—N(R1')—, —N(R1')—C(O)—N(R1')—, —CH═CH—, C≡C—, —N═N—, —C(R1')═CH—C(O)—, or —O—C(O)—O—.

In a case where R1 is a group other than the hydrogen atom, the hydrogen atom of each group may be substituted with a halogen atom, a nitro group, a cyano group, —N(R1')$_2$, an amino group, —C(R1')═C(R1')—NO$_2$, —C(R1')═C(R1')—CN, or —C(R1')═C(CN)$_2$.

R1' represents a hydrogen atom or a linear or branched alkyl group having 1 to 6 carbon atoms. In a case where a plurality of R1's are present in each group, R1's may be the same as or different from each other.

In Formula (1), R2 and R3 each independently represent a hydrogen atom, a linear or branched alkyl group which may have a substituent having 1 to 20 carbon atoms, an alkoxy group, an acyl group, an alkyloxy group, a carbonyl group, an alkylamide group, an alkylsulfonyl group, an aryl group, an arylcarbonyl group, an arylsulfonyl group, an aryloxycarbonyl group, or an arylamide group.

—$CH_2$— constituting the alkyl group may be substituted with —O—, —S—, —C(O)—, —C(O)—O—, —O—C(O)—, —C(O)—S—, —S—C(O)—, —Si($CH_3$)$_2$—O—Si($CH_3$)$_2$—, —NR2'-, —NR2'-CO—, —CO—NR2'-, —NR2'-C(O)—O—, —O—C(O)—NR2'-, —NR2'-C(O)—NR2'-, —CH═CH—, —C≡C—, —N═N—, —C(R2')═CH—C(O)—, or —O—C(O)—O—.

In a case where R2 and R3 are groups other than the hydrogen atom, the hydrogen atoms of each group may be substituted with a halogen atom, a nitro group, a cyano group, an —OH group, an —N(R2')$_2$, an amino group, —C(R2')═C(R2')—NO$_2$, —C(R2')═C(R2')—CN, or —C(R2')═C(CN)$_2$.

R2' represents a hydrogen atom or a linear or branched alkyl group having 1 to 6 carbon atoms. In a case where a plurality of R2's are present in each group, R2's may be the same as or different from each other.

R2 and R3 may be bonded to each other to form a ring, and R2 or R3 may be bonded to Ar2 to form a ring.

From the viewpoint of light resistance, R1 is preferably an electron-withdrawing group, and R2 and R3 are each preferably a group having a low electron-donating property.

Specific examples of such groups as R1 include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureide group, and specific examples of the groups as R2 and R3 include groups having the following structures. Furthermore, the groups having the following structure represent forms that include a nitrogen atom to which R2 and R3 are bonded in Formula (1).

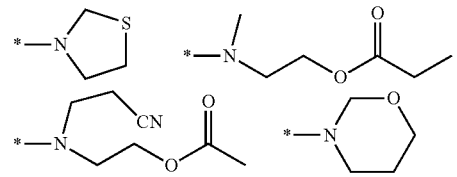

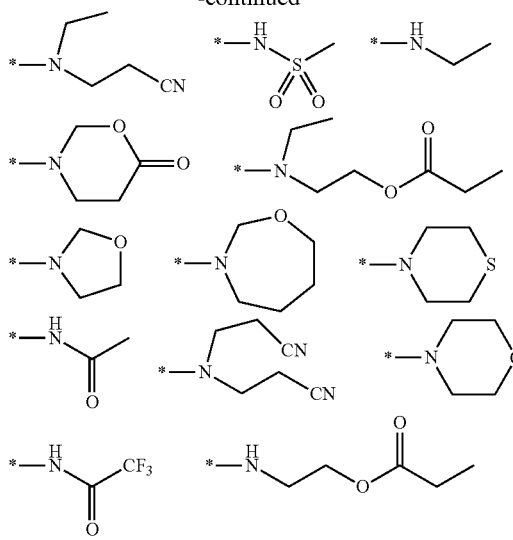
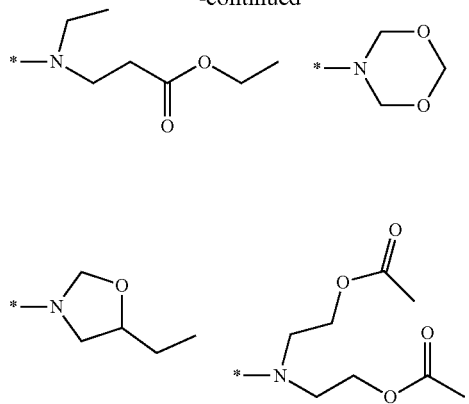
Specific examples of the first dichroic azo coloring agent compound are shown below, but are not limited thereto.
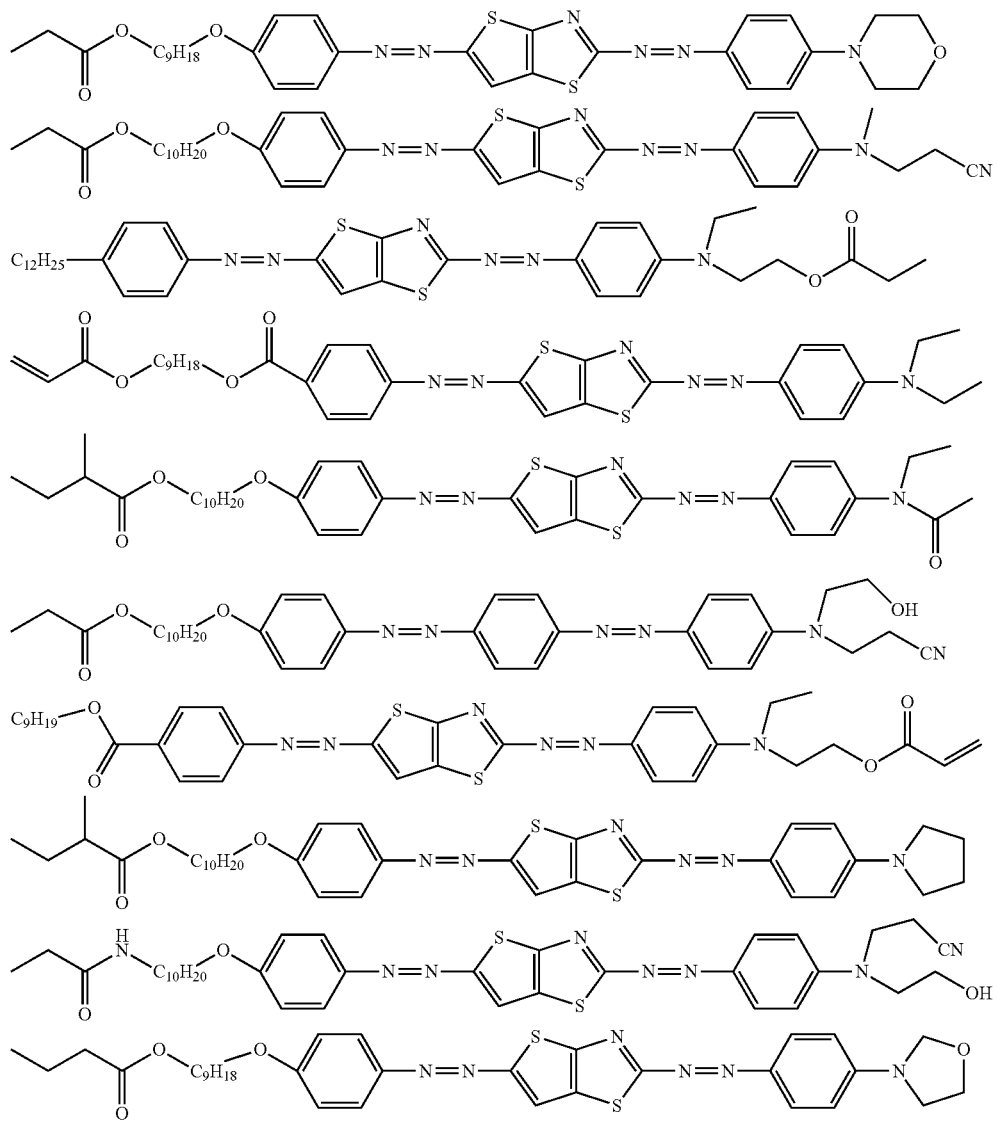

-continued
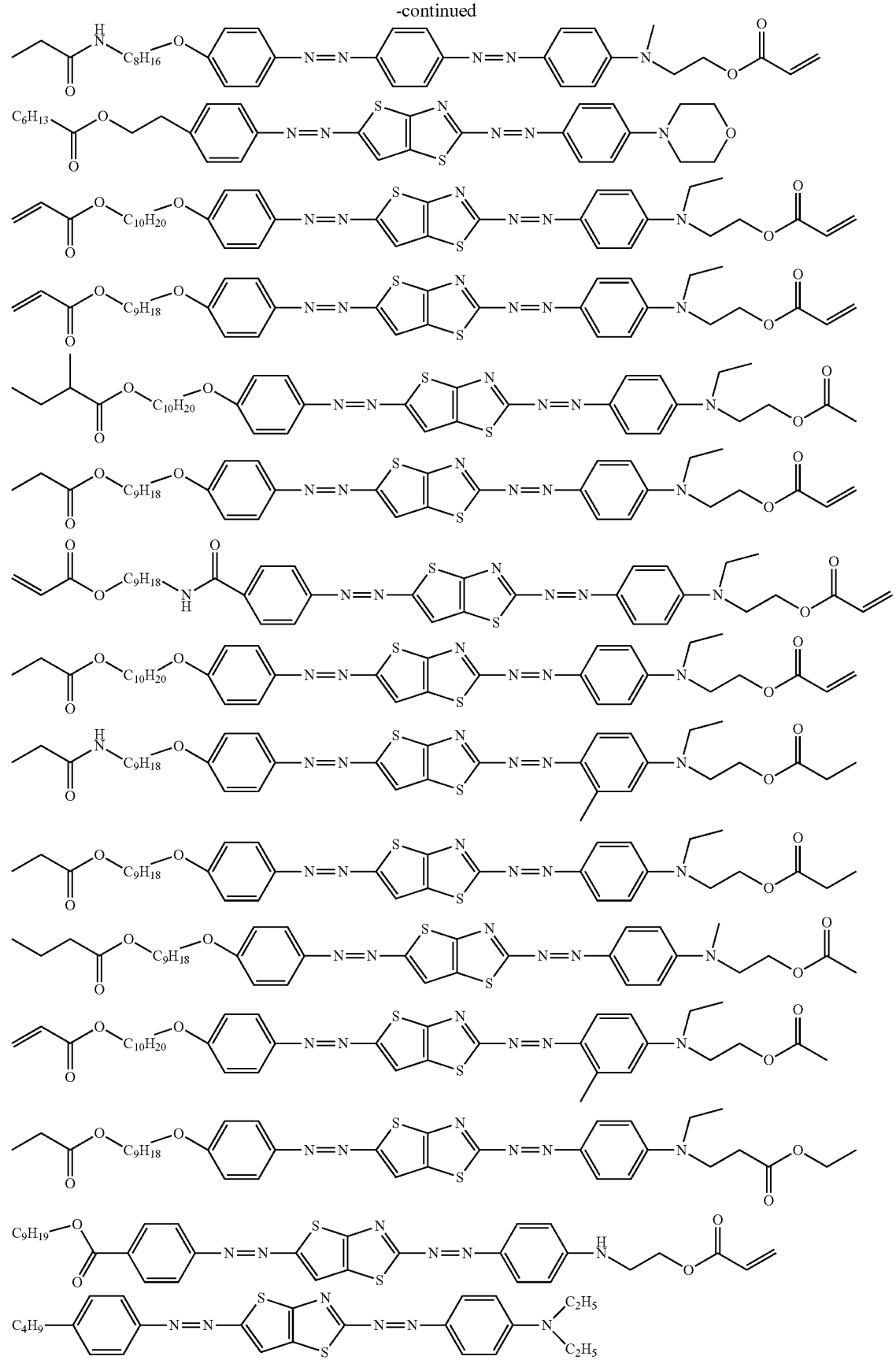

(Second Dichroic Azo Coloring Agent Compound)

The second dichroic azo coloring agent compound is a compound which is different from the first dichroic azo coloring agent compound, and specifically different from the first dichroic azo coloring agent compound in the chemical structure.

The second dichroic azo coloring agent compound is preferably a compound having a chromophore which is the core of the dichroic azo coloring agent compound, and a side chain which is bonded to the end of the chromophore.

Specific examples of the chromophore include an aromatic ring group (for example, an aromatic hydrocarbon group and an aromatic heterocyclic group) and an azo group, and preferably has a structure having both an aromatic hydrocarbon group and an azo group, and more preferably has a bisazo or trisazo structure having an aromatic hydrocarbon group and 2 or 3 azo groups.

The side chain is not particularly limited, and examples thereof include a group represented by R4, R5, or R6 of Formula (2) which will be described later.

The second dichroic azo coloring agent compound is a dichroic azo coloring agent compound having a maximum absorption wavelength in the wavelength range of 455 nm or more and less than 560 nm, and from the viewpoint of adjusting the tint of the light absorption anisotropic layer, the second dichroic azo coloring agent compound is preferably a dichroic azo coloring agent compound having a maximum absorption wavelength in the range of 455 to 555 nm, and more preferably a dichroic azo coloring agent compound having a maximum absorption wavelength in the wavelength range of 455 to 550 nm.

In particular, in a case where the first dichroic azo coloring agent compound having a maximum absorption wavelength in the range of 560 to 700 nm and the second dichroic azo coloring agent compound having a maximum absorption wavelength in the range of 455 nm or more and less than 560 nm are used, it is easy to adjust the tint of the light absorption anisotropic layer.

The second dichroic azo coloring agent compound is preferably a compound represented by Formula (2) from the viewpoint that the alignment degree of the light absorption anisotropic layer is further improved.

$$R4-Ar3-N=N\underset{n}{\overline{\left(Ar4-N=N\right)}}Ar5-N\underset{R6}{\overset{R5}{\diagdown}}$$ (2)

In Formula (2), n represents 1 or 2.

In Formula (2), Ar3, Ar4, and Ar5 each independently represent a phenylene group which may have a substituent, a naphthylene group which may have a substituent, or a heterocyclic group which may have a substituent.

The heterocyclic group may be either an aromatic heterocyclic group or a non-aromatic heterocyclic group.

Examples of atoms which constitute the aromatic heterocyclic group and are other than carbon include a nitrogen atom, a sulfur atom, and an oxygen atom. In a case where the aromatic heterocyclic group has a plurality of atoms which constitute a ring and are other than carbon, these atoms may be the same as or different from each other.

Specific examples of the aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

The definition of R4 in Formula (2) is the same as that of R1 in Formula (1).

The definitions of R5 and R6 in Formula (2) are the same as those of R2 and R3 in Formula (1), respectively.

From the viewpoint of light resistance, R4 is preferably an electron-withdrawing group, and R5 and R6 are each preferably a group having a low electron-donating property.

Specific examples of a case where R4 is the electron-withdrawing group among such groups are the same as the specific examples of the case where R1 is the electron-withdrawing group, and specific examples of a case where R5 and R6 are each the group having a low electron-donating property are the same as the specific examples of the case where R2 and R3 are each the group having a low electron donating property.

Specific examples of the second dichroic azo coloring agent compound are shown below, but are not limited thereto.

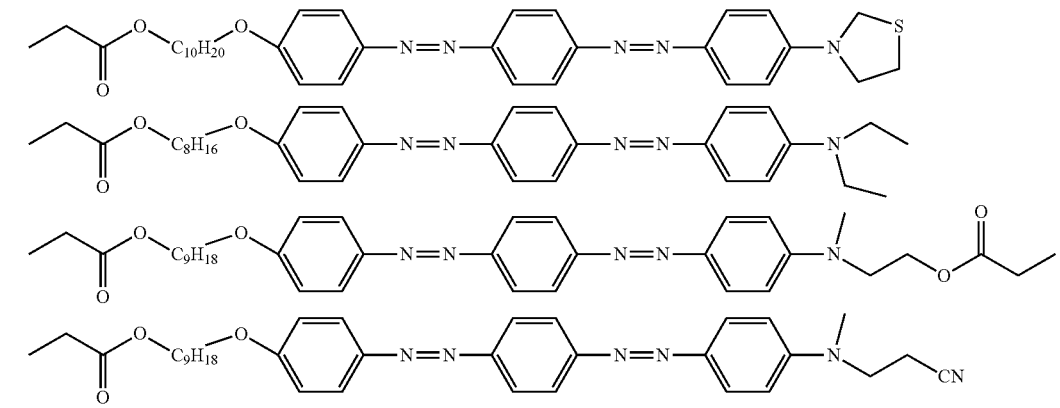

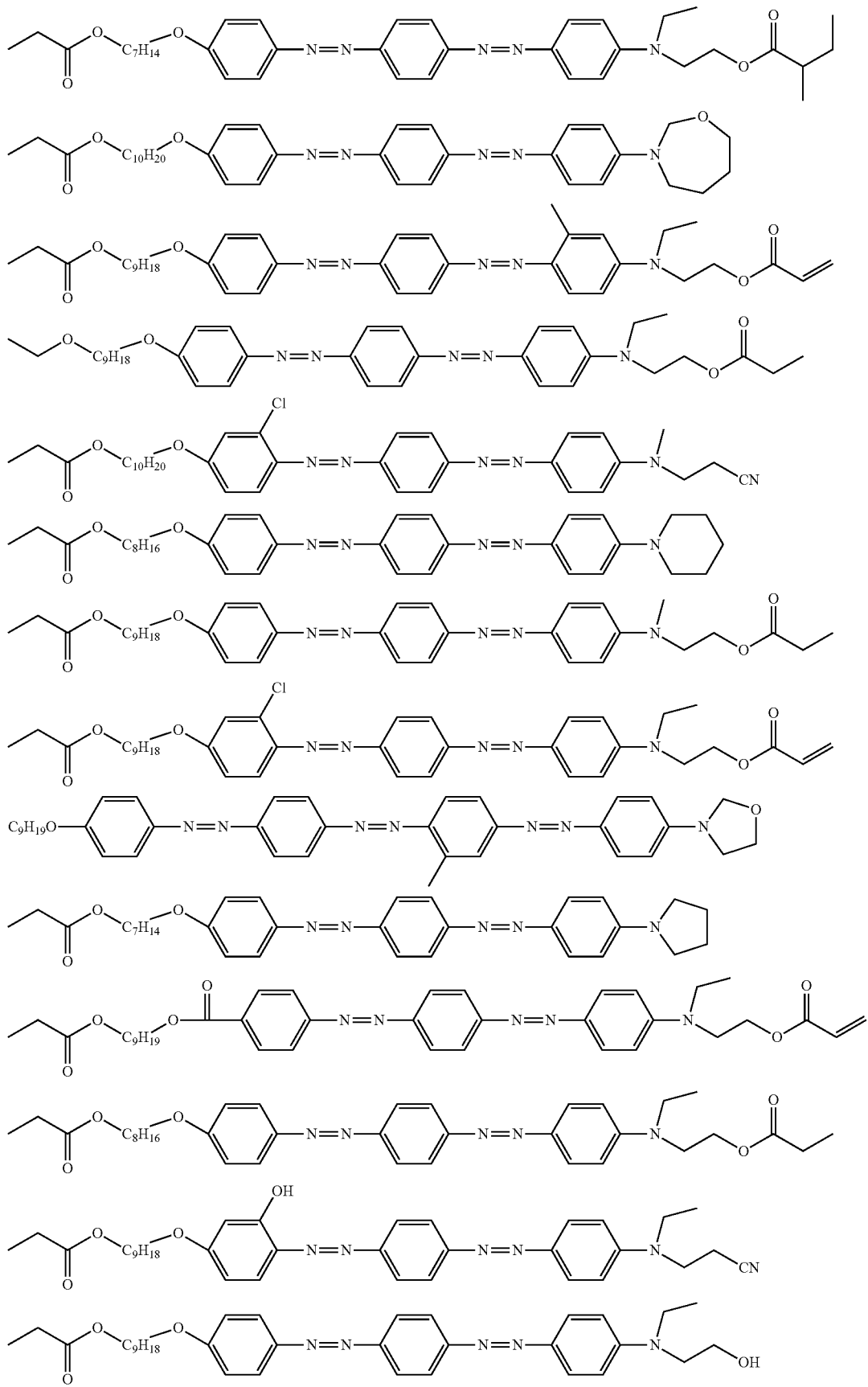

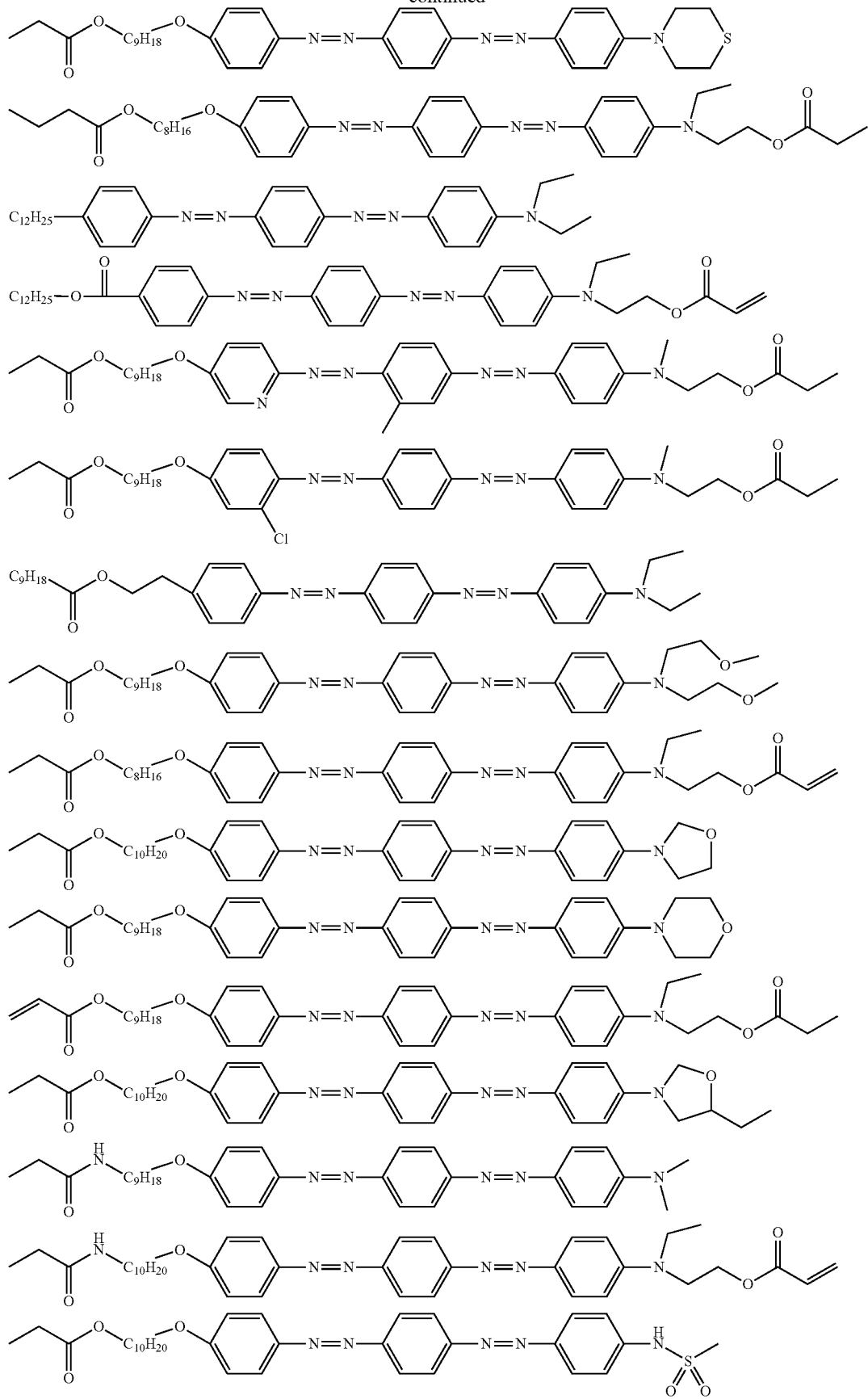

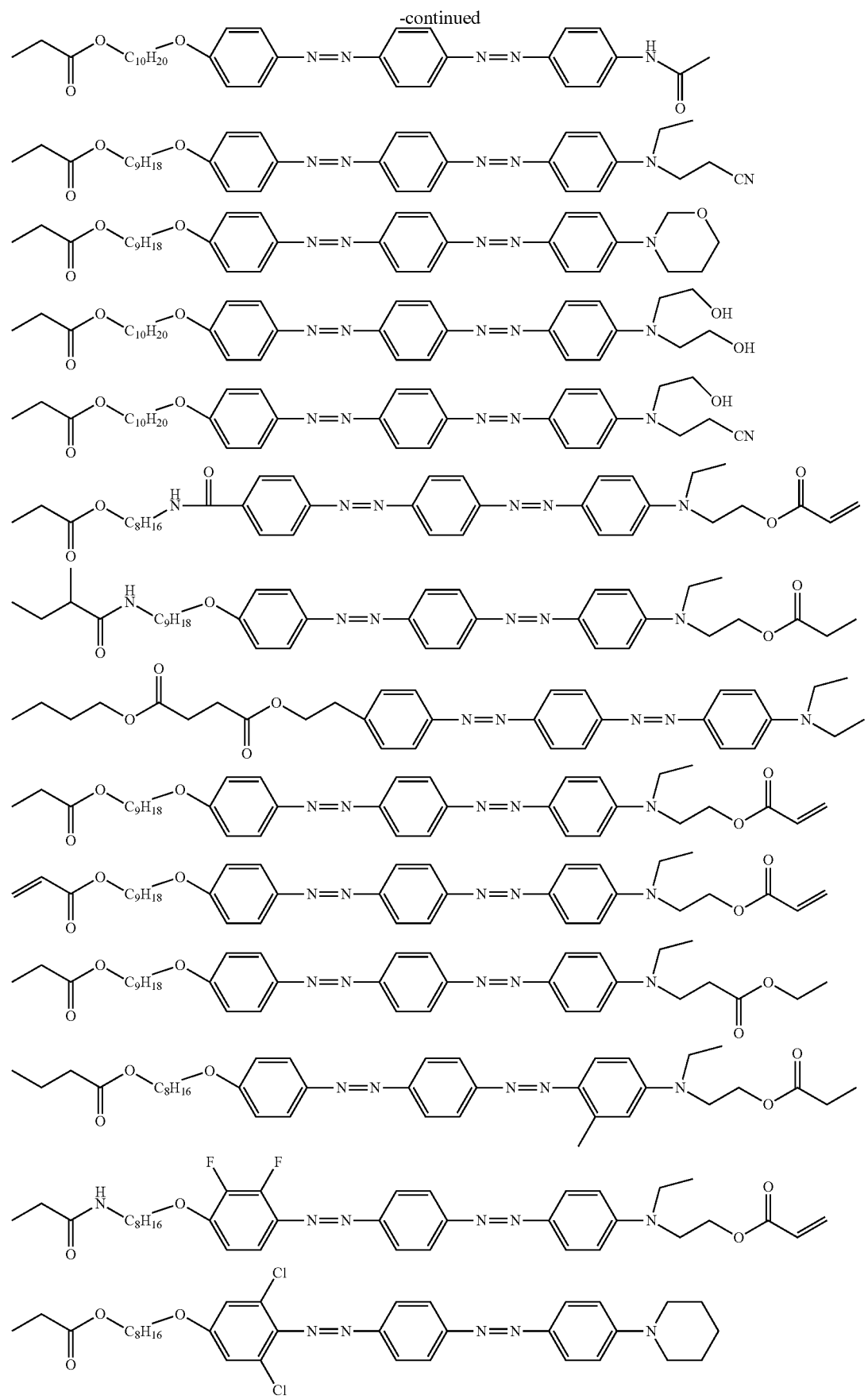

-continued

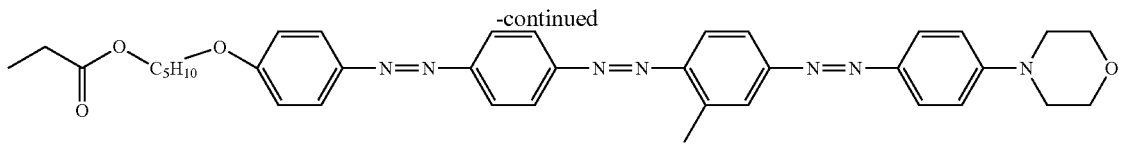

(Difference in Log P Value)

The log P value is an index expressing hydrophilicity and hydrophobicity of a chemical structure. The absolute value of a difference between the log P value of a chain of the first dichroic azo coloring agent compound and the log P value of a side chain of the second dichroic azo coloring agent compound (hereinafter also referred to as a "log P difference") is preferably 2.30 or less, more preferably 2.0 or less, still more preferably 1.5 or less, and particularly preferably 1.0 or less. In a case where the log P difference is 2.30 or less, the affinity between the first dichroic azo coloring agent compound and the second dichroic azo coloring agent compound is enhanced, and the sequence structure is more easily formed, whereby the alignment degree of the light absorption anisotropic layer is further improved.

Furthermore, in a case where there are a plurality of side chains of the first dichroic azo coloring agent compound or the second dichroic azo coloring agent compound, it is preferable that at least one log P difference satisfies the value.

Here, the side chains of the first dichroic azo coloring agent compound and the second dichroic azo coloring agent compound each mean a group bonded to a terminal of the above-mentioned chromophore. For example, in a case where the first dichroic azo coloring agent compound is the compound represented by Formula (1), R1, R2, and R3 in Formula (1) are side chains, and in a case where the second dichroic azo coloring agent compound is the compound represented by Formula (2), R4, R5, and R6 in Formula (2) are side chains. In particular, in a case where the first dichroic azo coloring agent compound is the compound represented by Formula (1) and the second dichroic azo coloring agent compound is the compound represented by Formula (2), it is preferable that at least one log P difference of a difference in the log P value between R1 and R4, a difference in the log P value between R1 and R5, a difference in the log P value between R2 and R4, or a difference in the log P value between R2 and R5 satisfies the value.

Here, the log P value is an index expressing hydrophilicity and hydrophobicity of a chemical structure, and is sometimes referred to as a hydrophilicity/hydrophobicity parameter. The log P value can be calculated using software such as ChemBioDraw Ultra or HSPiP (Ver. 4.1.07). In addition, the log P value can be experimentally determined by the method in OECD Guidelines for the Testing of Chemicals, Sections 1, Test No. 117, and the like. In the present invention, a value calculated by inputting a structural formula of a compound into HSPiP (Ver. 4.1.07) is adopted as the log P value unless otherwise specified.

(Third Dichroic Azo Coloring Agent Compound)

The third dichroic azo coloring agent compound is a dichroic azo coloring agent compound other than the first dichroic azo coloring agent compound and the second dichroic azo coloring agent compound, and is specifically different from the first dichroic azo coloring agent compound and the second dichroic azo coloring agent compound in the chemical structure. In a case where the light absorption anisotropic layer includes the third dichroic azo coloring agent compound, there is an advantage that the tint of the light absorption anisotropic layer can be easily adjusted.

A maximum absorption wavelength of the third dichroic azo coloring agent compound is 380 nm or more and less than 455 nm, and preferably 385 to 454 nm.

As the third dichroic azo coloring agent compound, a dichroic azo coloring agent represented by Formula (6) is preferable.

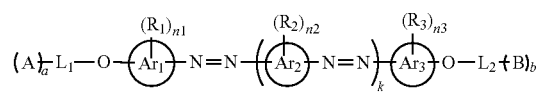

In Formula (6), A and B each independently represent a crosslinkable group.

In Formula (6), a and b each independently represent 0 or 1. From the viewpoint that the alignment at a wavelength of 420 nm is excellent, both a and b are preferably 0.

In Formula (6), in a case of a=0, $L_1$ represents a monovalent substituent, and in a case with a=1, $L_1$ represents a single bond or a divalent linking group. In addition, in a case of b=0, $L_2$ represents a monovalent substituent, and in a case of b=1, $L_2$ represents a single bond or a divalent linking group.

In Formula (6), $Ar_1$ represents an (n1+2)-valent aromatic hydrocarbon group or heterocyclic group, $Ar_2$ represents an (n2+2)-valent aromatic hydrocarbon group or heterocyclic group, and $Ar_3$ represents an (n3+2)-valent aromatic hydrocarbon group or a heterocyclic group.

In Formula (6), $R_1$, $R_2$, and $R_3$ each independently represent a monovalent substituent. In a case of n1≥2, a plurality of $R_1$'s may be the same as or different from each other, in a case of n2≥2, a plurality of $R_2$'s may be the same as or different from each other, and in a case of n3≥2, a plurality of $R_3$'s may be the same as or different from each other.

In Formula (6), k represents an integer of 1 to 4. In a case of k≥2, a plurality of $Ar_2$'s may be the same as or different from each other, and a plurality of $R_2$'s may be the same as or different from each other.

In Formula (6), n1, n2, and n3 each independently represent an integer of 0 to 4. It should be noted that in a case of k=1, n1+n2+n3≥0 is satisfied, and in a case of k≥2, n1+n2+n3≥1 is satisfied.

Examples of the crosslinkable groups represented by A and B in Formula (6) include the polymerizable group described in paragraphs [0040] to [0050] of JP2010-244038A. Among these, the acryloyl group, the methacryloyl group, the epoxy group, the oxetanyl group, or the styryl group is preferable, and from the viewpoint that the synthesis suitability can be further improved, the acryloyl group or the methacryloyl group is more preferable.

In Formula (6), in a case of a=0, $L_1$ represents a monovalent substituent, and in a case of a=1, $L_1$ represents a single bond or a divalent linking group. In addition, in a case of b=0, $L_2$ represents a monovalent substituent, and in a case of b=1, $L_2$ represents a single bond or a divalent linking group.

As the monovalent substituent represented by each of $L_1$ and $L_2$, a group introduced to increase the solubility of a dichroic substance, or a group having an electron-donating property or an electron-withdrawing property, introduced to adjust the tone as a coloring agent, is preferable.

For example, as a substituent, an alkyl group (preferably an alkyl group having 1 to 20 carbon atoms, more preferably an alkyl group having 1 to 12 carbon atoms, and still more preferably an alkyl group having 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and still more preferably an alkenyl group having 2 to 8 carbon atoms, and examples thereof include a vinyl group, an allyl group, a 2-butenyl group, and a 3-pentenyl group), an alkynyl group (preferably an alkynyl group having 2 to 20 carbon atoms, more preferably an alkynyl group having 2 to 12 carbon atoms, and still more preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and still more preferably an aryl group having 6 to 12 carbon atoms, and examples thereof include a phenyl group, a 2,6-diethylphenyl group, 3,5-ditrifluoromethylphenyl group, a naphthyl group, and a biphenyl group), a substituted or unsubstituted amino group (preferably an amino group having 0 to 20 carbon atoms, more preferably an amino group having 0 to 10 carbon atoms, and still more preferably an amino group having 0 to 6 carbon atoms, and examples thereof include an unsubstituted amino group, a methylamino group, a dimethylamino group, a diethylamino group, and an amino group), an alkoxy group (preferably an alkoxy group having 1 to 20 carbon atoms, and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and still more preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and still more preferably an acyloxy group having 2 to 6 carbon atoms, and examples thereof include an acetoxy group and a benzoyloxy group), an acylamino group (preferably an acylamino group having 2 to 20 carbon atoms, more preferably an acylamino group having 2 to 10 carbon atoms, and still more preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atom, more preferably an alkoxycarbonylamino group having 2 to 10 carbon atoms, and still more preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and still more preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and still more preferably a sulfonylamino group having 1 to 6 carbon atoms, and examples thereof include a methanesulfonylamino group and a benzenesulfonylamino group), a sulfamoyl group (preferably a sulfamoyl group having 0 to 20 carbon atoms, more preferably sulfamoyl group having 0 to 10 carbon atoms, and still more preferably sulfamoyl group having 0 to 6 carbon atoms, and examples thereof include an unsubstituted sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and still more preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and still more preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and still more preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and still more preferably a sulfonyl group having 1 to 6 carbon atoms, and examples thereof include a mesyl group and a tosyl group), a sulfinyl group (preferably 1 to 20 carbon atoms, more preferably 1 to 10 carbon atoms, still more preferably 1 to 6 carbon atoms, and examples thereof include a methanesulfinyl group and a benzenesulfinyl group), a ureide group (preferably a ureide group having 1 to 20 carbon atoms, more preferably a ureide group having 1 to 10 carbon atoms, and still more preferably a ureide group having 1 to 6 carbon atoms, and examples thereof include an unsubstituted ureide group, a methyl ureide group, and a phenyl ureide group), a phosphate amide group (preferably a phosphate amide group having 1 to 20 carbon atoms, more preferably a phosphate amide group having 1 to 10 carbon atoms, and still more preferably a phosphate amide group having 1 to 6 carbon atoms, and examples thereof include a diethyl phosphate amide group and a phenyl phosphate amide group), a heterocyclic group (preferably a heterocyclic group having 1 to 30 carbon atoms, and more preferably a heterocyclic group having 1 to 12 carbon atoms, and examples thereof include a heterocyclic group having a heteroatom such as a nitrogen atom, an oxygen atom, and a sulfur atom, such as an Imidazolyl group, a pyridyl group, a quinolyl group, a furyl group, a piperidyl group, a morpholino group, a benzoxazolyl group, a benzimidazolyl group, and a benzthiazolyl group), a silyl group (preferably a silyl group having 3 to 40 carbon atoms, more preferably a silyl group having 3 to 30 carbon atoms, and still more preferably a silyl group having 3 to 24 carbon atoms, and examples thereof include a trimethylsilyl group and a triphenylsilyl group), a halogen atom (examples thereof include a fluorine atom, a chlorine atom, a bromine atom, and an iodine atom), a hydroxy group, a mercapto group, a cyano group, a nitro group, a hydroxamic acid group, a sulfino group, a hydrazino group, an imino group, an azo group, or the like can be used.

These substituents may also be substituted with these substituents. In addition, in a case where two or more of the substituents are included, the substituents may be the same as or different from each other. Further, if possible, the substituents may be bonded to each other to form a ring.

Examples of the group in which the substituent is further substituted by the substituent include an $R_B$—(O—$R_A$)$_{na}$- group in which the alkoxy group is substituted with an alkyl group. Here, in the formula, $R_A$ represents an alkylene group having 1 to 5 carbon atoms, $R_B$ represents an alkyl group having 1 to 5 carbon atoms, and na represents an integer of 1 to 10 (preferably 1 to 5, and more preferably 1 to 3).

Among these, as the monovalent substituent represented by each of $L_1$ and $L_2$, the alkyl group, the alkenyl group, the alkoxy group, and groups which are further substituted with these groups (for example, the above-mentioned $R_B$—(O—$R_A$)$_{na}$— group) is preferable, and the alkyl group, the alkoxy group, and the group in which these groups are further substituted with these groups (for example, the above-mentioned $R_B$—(O—$R_A$)$_{na}$— group) is more preferable.

Examples of the divalent linking group represented by each of $L_1$ and $L_2$ include —O—, —S—, —CO—, —COO—, —OCO—, —O—CO—O—, —CO—$NR_N$—, —O—CO—$NR_N$—, —$NR_N$—CO—$NR_N$—, —$SO_2$—, Here, $R_N$ represents a hydrogen atom or an alkyl group. In a case where there are a plurality of $R_N$'s, the plurality of $R_N$'s may be the same as or different from each other.

From the viewpoint that the solubility of the dichroic substance is further improved, the number of atoms in at least one of $L_1$ or $L_2$ is preferably 3 or more, more preferably 5 or more, still more preferably 7 or more, and particularly preferably 10 or more. In addition, the upper limit of the number of atoms in the main chain is preferably 20 or less, and more preferably 12 or less.

On the other hand, from the viewpoint that the alignment degree of the light absorption anisotropic layer is further improved, the number of atoms in at least one of $L_1$ or $L_2$ is preferably 1 to 5.

Here, in a case where A in Formula (6) exists, the "main chain" in $L_1$ refers to a portion necessary to directly link an "O" atom linked to $L_1$ with "A", and the "number of atoms in the main chain" refers to the number of atoms constituting the portion. Similarly, in a case where B in Formula (6) exists, the "main chain" in $L_2$ refers to a portion necessary to directly link an "O" atom linked to $L_2$ with "B", and the "number of atoms in the main chain" refers to the number of atoms constituting the portion. Incidentally, the "number of atoms in the main chain" does not include the number of atoms in a branched chain which will be described later.

In addition, in a case where A does not exist, the "number of atoms in the main chain" in $L_1$ refers to the number of atoms in $L_1$ not including a branched chain. In a case where B does not exist, the "number of atoms in the main chain" in $L_2$ refers to the number of atoms in $L_2$ not including a branched chain.

Specifically, in Formula (D1), the number of atoms in the main chain of $L_1$ is 5 (the number of atoms in the dotted line frame on the left side of Formula (D1)), and the number of atoms in the main chain of $L_2$ is 5 (the number of atoms in the dotted frame on the right side of Formula (D1)). In addition, in Formula (D10), the number of atoms in the main chain of $L_1$ is 7 (the number of atoms in the dotted line frame on the left side of Formula (D10)), and the number of atoms in the main chain of $L_2$ is 5 (the number of atoms in the dotted frame on the right side of Formula (D10)).

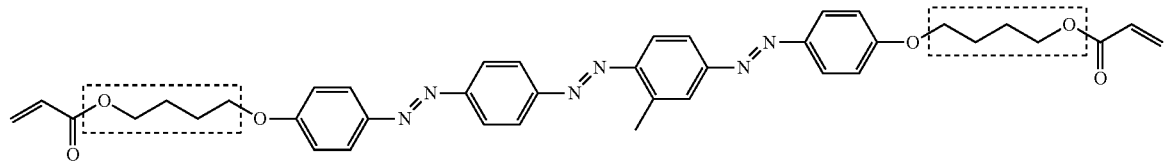

D1

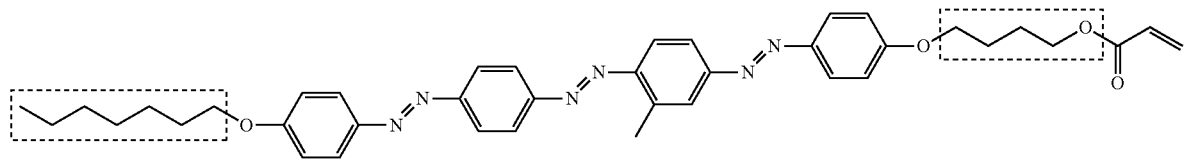

D10

—SO—, an alkylene group, a cycloalkylene group, an alkenylene group, and a group in which two or more of these groups are combined.

Among these, a group in which an alkylene group and one or more groups selected from the group consisting of —O—, —COO—, —OCO—, and —O—CO—O— are combined is preferable.

$L_1$ and $L_2$ may each have a branched chain.

Here, in a case where A exists in Formula (6), the "branched chain" in $L_1$ is a portion other than the portion necessary for directly linking the "O" atom linked to $L_1$ in Formula (6) with "A". Similarly, in a case where B exists in Formula (6), the "branched chain" in $L_2$ is a portion other than the portion necessary for directly linking the "O" atom linked to $L_2$ in Formula (6) with "B".

In addition, in a case where A does not exist in Formula (6), the "branched chain" in $L_1$ is the longest atom chain (that is, the main chain) extending from the "O" atom linked to $L_1$ in Formula (6). Similarly, in a case where B does not exist in Formula (6), the "branched chain" in $L_2$ is the longest atom chain (that is, the main chain) extending from the "O" atom linked to $L_2$ in Formula (6).

The number of atoms in the branched chain is preferably 3 or less. In a case where the number of atoms in the branched chain is 3 or less, there is an advantage that the alignment degree of the light absorption anisotropic layer is further improved. The number of the branched chain atoms does not include the number of hydrogen atoms.

In Formula (6), $Ar_1$ represents an (n1+2)-valent (for example, trivalent in a case where n1 is 1) aromatic hydrocarbon group or heterocyclic group, $Ar_2$ represents an (n2+2)-valent (for example, trivalent in a case where n2 is 1) aromatic hydrocarbon group or heterocyclic group, and $Ar_3$ represents an (n3+2)-valent (for example, trivalent in a case where n3 is 1) aromatic hydrocarbon group or heterocyclic group. Here, $Ar_1$ to $Ar_3$ are also each referred to as a divalent aromatic hydrocarbon group or divalent substituted heterocyclic group having n1 to n3 substituents ($R_1$ to $R_3$ which will be described later).

The divalent aromatic hydrocarbon group represented by each of $Ar_1$ to $Ar_3$ may be a monocycle or may have a fused ring structure with two or more rings. The number of rings of the divalent aromatic hydrocarbon group is preferably 1 to 4, more preferably 1 or 2, and still more preferably 1 (that is, a phenylene group) from the viewpoint that the solubility is further improved.

Specific examples of the divalent aromatic hydrocarbon group include a phenylene group, a naphthylene group, a fluorene-diyl group, an anthracene-diyl group, and a tetracene-diyl group, and from the viewpoint that the solubility is further improved, the phenylene group or the naphthylene group is preferable, and the phenylene group is more preferable.

Specific examples of the third dichroic coloring agent compound are shown below, but the present invention is not limited thereto. Incidentally, in the following specific example, n represents an integer of 1 to 10.

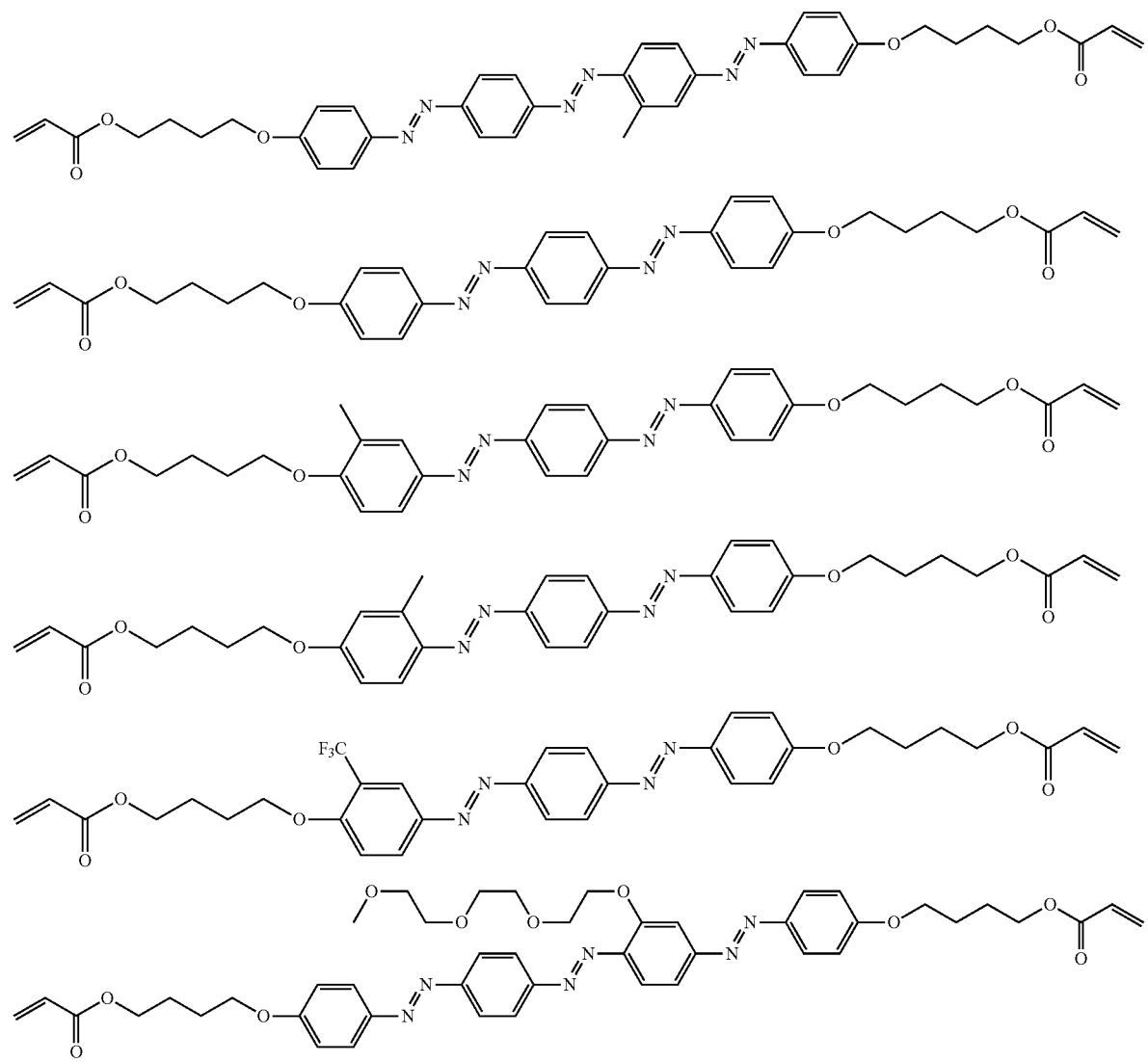

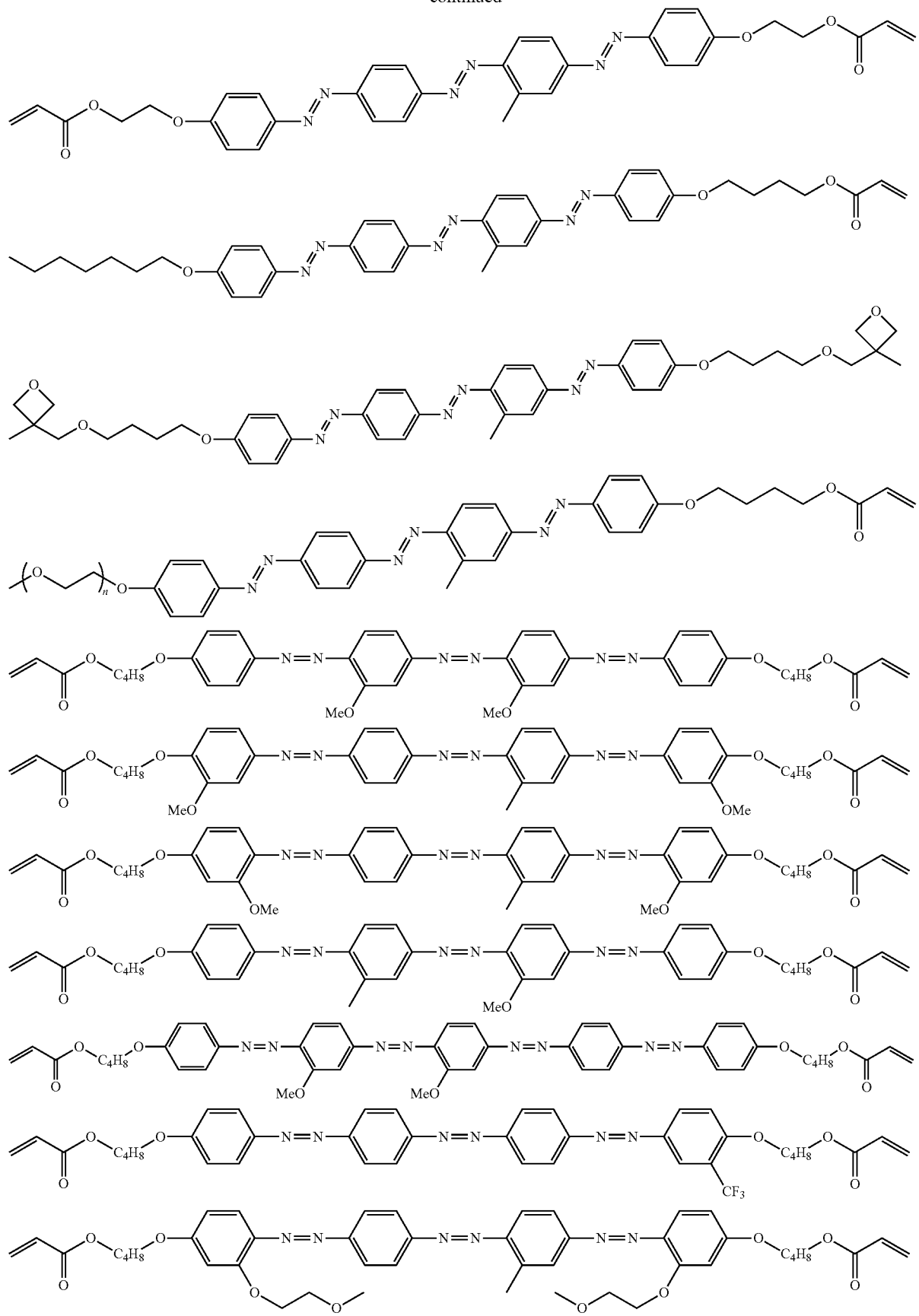

-continued

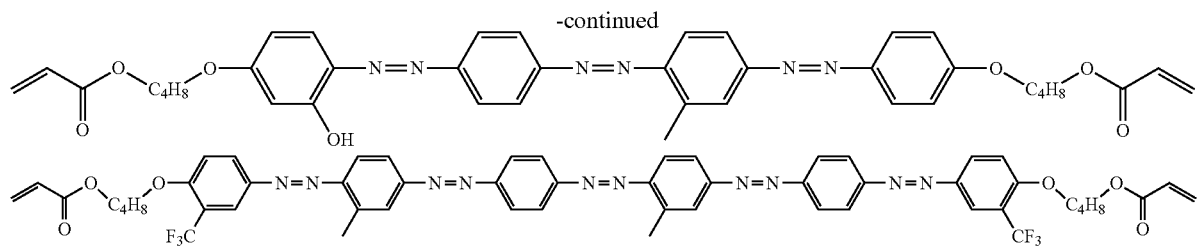

From the viewpoint that the alignment at 420 nm is excellent, it is preferable that the third dichroic azo coloring agent compound does not have a radically polymerizable group. Examples of the structure of the third dichroic azo coloring agent compound include the following structures.

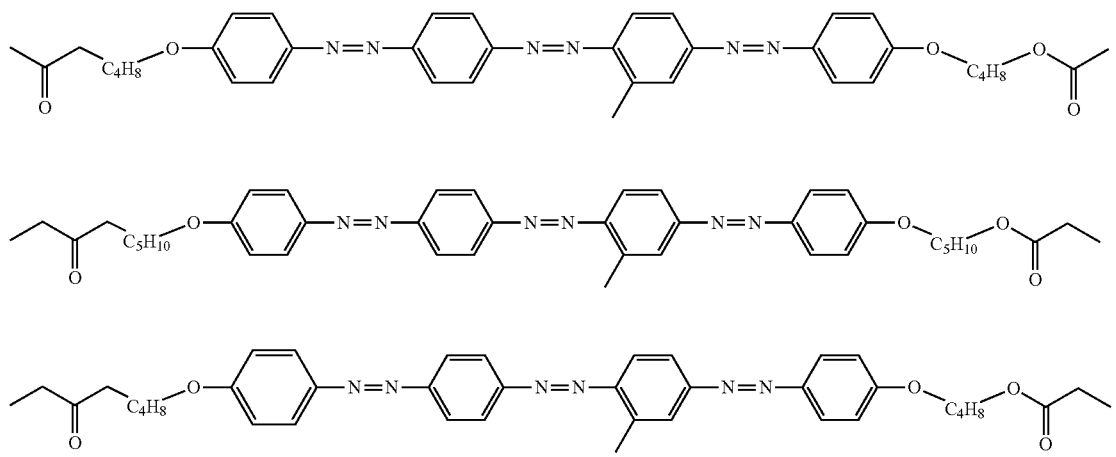

From the viewpoint that the alignment degree at 420 nm is particularly excellent, it is more preferable that the third dichroic azo coloring agent compound is a dichroic substance having a structure represented by Formula (1-1).

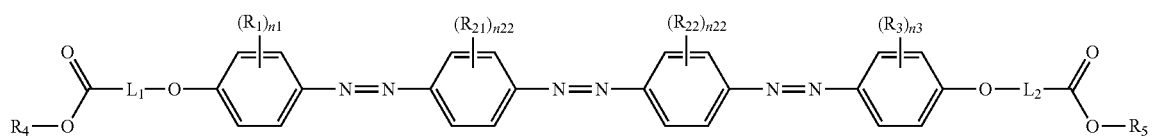

(1-1)

In Formula (1-1), the definitions of $R_1$, $R_3$, $R_4$, $R_5$, n1, n3, $L_1$, and $L_2$ are the same as the definitions of $R_1$, $R_3$, $R_4$, $R_5$, n1, n3, $L_1$, and $L_2$ in Formula (1), respectively.

In Formula (1-1), the definitions of $R_{21}$ and $R_{22}$ are each independently the same as the definition of $R_2$ in Formula (1).

In Formula (1-1), the definitions of n21 and n22 are each independently the same as the definition of n2 in Formula (1).

n1+n21+n22+n3≥1 is satisfied, and n1+n21+n22+n3 is preferably 1 to 9, and more preferably 1 to 5.

Specific examples of the dichroic substance are shown below, but the present invention is not limited thereto.

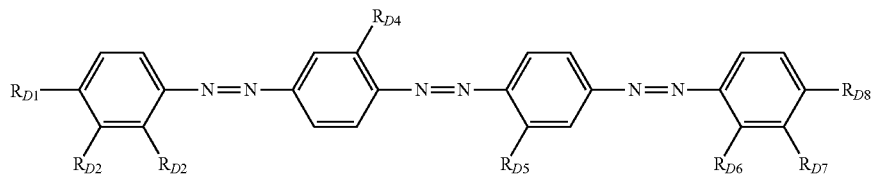

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |
| D7 | $OC_3H_6C(O)OCH_2CH_3$ | H | H | H | $CH_3$ | H | H | $OC_3H_6C(O)OCH_2CH_3$ |
| D8 | $OC_3H_6C(O)OCH_2CH_3$ | H | H | Cl | H | Cl | H | $OC_3H_6C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH=CH_2$ | H | H | H | $CH_3$ | H | H | $OC_4H_8C(O)OCH_2CH=CH_2$ |
| D11 | $OC_4H_8C(O)OCH_2CH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

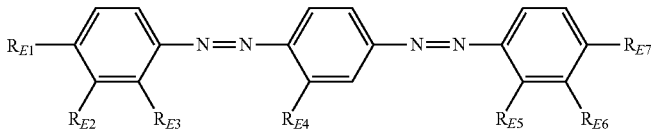

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_6C(O)OCH_2CH_3$ |
| E7 | $OC_9H_{18}C(O)OCH_2CH_3$ | H | H | H | H | H | $OC_9H_{18}C(O)OCH_2CH_3$ |
| E8 | $OC_4H_8C(O)OCH_2CH=CH_2$ | H | H | H | H | H | $OC_4H_8C(O)OCH_2CH=CH_2$ |

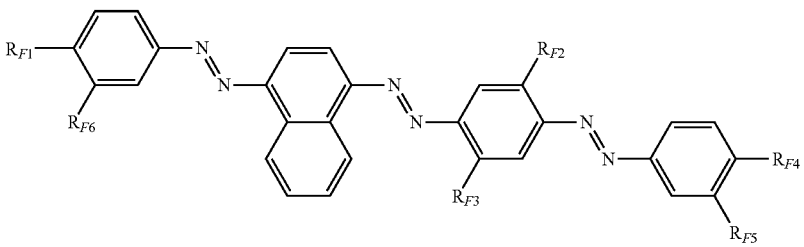

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C(O)OCH_2CH_3$ | H | Cl |

A content of the dichroic substance is preferably 10% to 30% by mass, more preferably 15% to 30% by mass, still more preferably 18% to 28% by mass, and particularly preferably 20% to 26% by mass with respect to the total mass of the light absorption anisotropic layer. In a case where the content of the dichroic substance is within the range, a light absorption anisotropic layer having a high degree of alignment can be obtained even in a case where the light absorption anisotropic layer is made into a thin film. Therefore, a light absorption anisotropic layer having excellent flexibility is easily obtained.

A content of the first dichroic azo coloring agent compound is preferably 40 to 90 parts by mass, and more preferably 45 to 75 parts by mass with respect to 100 parts by mass of the total content of the dichroic substance in the light absorption anisotropic layer.

A content of the second dichroic azo coloring agent compound is preferably 6 to 50 parts by mass, and more preferably 8 to 35 part by mass with respect to 100 parts by mass of the total content of the dichroic substance in the light absorption anisotropic layer.

The content of the third dichroic azo coloring agent compound is preferably 3 to 35 parts by mass, and more preferably 5 to 35 parts by mass with respect to 100 parts by mass of the dichroic substance in the light absorption anisotropic layer.

A content ratio of the first dichroic azo coloring agent compound to the second dichroic azo coloring agent compound to the third dichroic azo coloring agent compound used as necessary can be set to any of content ratios in order to adjust the tint of the light absorption anisotropic layer. It should be noted that a content ratio of the second dichroic azo coloring agent compound to the first dichroic azo coloring agent compound (second dichroic azo coloring agent compound/first dichroic azo coloring agent compound) in terms of a molar ratio is preferably 0.1 to 10, more preferably 0.1 to 2, and still more preferably 0.1 to 0.5. In a case where a content ratio of the second dichroic azo coloring agent compound to the first dichroic azo coloring agent compound is within the range, the alignment degree is enhanced.

The light absorption anisotropic layer in the embodiment of the present invention can be manufactured, for example, by using a composition for forming a light absorption anisotropic layer including the liquid crystalline compound and a dichroic substance.

The composition for forming a light absorption anisotropic layer may include components other than the liquid crystalline compound and the dichroic substance, and examples of such other components include a solvent, a vertical alignment agent, an interface improver, a polymerizable component, and a polymerization initiator (for example, a radical polymerization initiator). In this case, the light absorption anisotropic layer in the embodiment of the present invention includes a solid component other than a liquid component (a solvent or the like).

As the interface improver, the interface improver described in the section of Examples can be used.

In a case where the composition for forming a light absorption anisotropic layer includes the interface improver, a content of the interface improver is preferably 0.001 to 5 parts by mass with respect to 100 parts by mass of the total amount of the dichroic substance and the liquid crystalline compound in the composition for forming a light absorption anisotropic layer.

Examples of the polymerizable component include a compound including an acrylate (for example, acrylate monomers). In this case, the light absorption anisotropic layer in the embodiment of the present invention includes a polyacrylate obtained by polymerizing the compound including an acrylate.

Examples of the polymerizable component include the compounds described in paragraph [0058] of JP2017-122776A.

In a case where the composition for forming a light absorption anisotropic layer includes the polymerizable component, a content of the polymerizable component is preferably 3 to 20 parts by mass with respect to 100 parts by mass of a total amount of the dichroic substance and the liquid crystalline compound in the composition for forming a light absorption anisotropic layer.

In a case where the liquid crystalline compound is used, the molecules of the dichroic substance can be brought into the desired alignment as described above in association with an alignment of host liquid crystals, using, for example, a technique of guest-host type liquid crystal cells. Specifically, the dichroic substance that serves as a guest and the liquid crystalline compound that serves as the host liquid crystals are mixed to align the host liquid crystals while aligning the molecules of the dichroic substance along the alignment of the liquid crystal molecules, whereby the alignment state is fixed and thus, the light absorption anisotropic layer in the embodiment of the present invention can be manufactured.

It is preferable to fix the alignment of the dichroic substance by forming a chemical bond in order to prevent the light absorption characteristics of the light absorption anisotropic layer in the embodiment of the present invention from fluctuating depending on the usage environment. For example, the alignment can be fixed by advancing the polymerization of the host liquid crystals, the dichroic substance, or a polymerizable component to be added as desired.

In addition, the guest-host type liquid crystal cells themselves which have a liquid crystal layer including at least a dichroic substance and a liquid crystalline compound (host liquid crystals) on a pair of substrates may be used as the light absorption anisotropic layer in the embodiment of the present invention. The alignment of the host liquid crystals (and the alignment of the accompanying dichroic substance) can be controlled by an alignment film formed on an inner surface of a substrate, and thus, the alignment state is maintained unless an external stimulus such as an electric field is applied, whereby the light absorption characteristics of the light absorption anisotropic layer in the embodiment of the present invention can be made constant.

[Vertical Alignment Agent]

Examples of the vertical alignment agent include a boronic acid compound and an onium salt.

A compound represented by Formula (30) is preferable as the boronic acid compound.

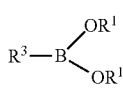

Formula (30)

In Formula (30), $R^1$ and $R^2$ each independently represent a hydrogen atom, a substituted or unsubstituted aliphatic hydrocarbon group, a substituted or unsubstituted aryl group, or a substituted or unsubstituted heterocyclic group.

$R^3$ represents a substituent including a (meth)acryl group.

Specific examples of the boronic acid compound include the boronic acid compound represented by General Formula (1) described in paragraphs [0023] to [0032] of JP2008-225281A.

As the boronic acid compound, compounds exemplified below are also preferable.

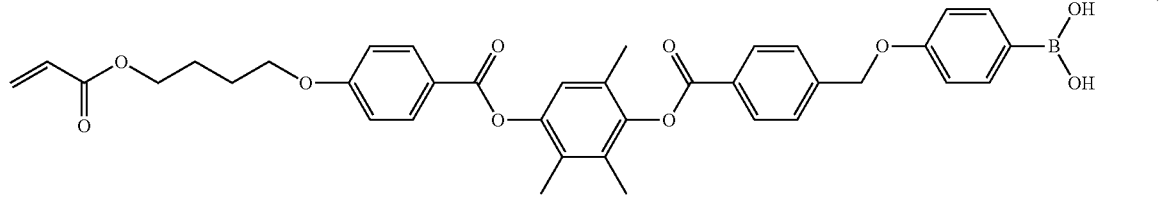

I-34)

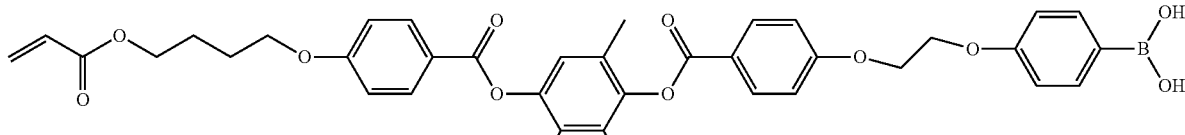

I-35)

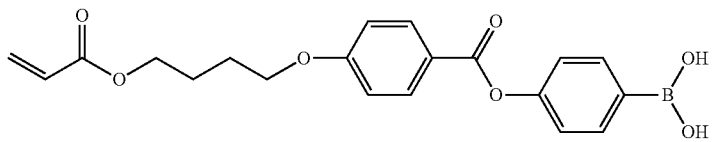

I-36)

As the onium salt, a compound represented by Formula (31) is preferable.

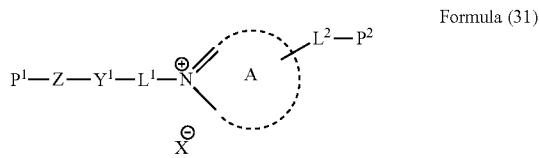

Formula (31)

In Formula (31), the ring A represents a quaternary ammonium ion consisting of a nitrogen-containing heterocycle. $X^-$ represents an anion. $L^1$ represents a divalent linking group. $L^2$ represents a single bond or a divalent linking group. $Y^1$ represents a divalent linking group having a 5- or 6-membered ring as a partial structure. Z represents a divalent linking group having 2 to 20 alkylene groups as a partial structure. $P^1$ and $P^2$ each independently represent a monovalent substituent having a polymerizable and ethylenically unsaturated bond.

Specific examples of the onium salt include the onium salts described in paragraphs [0052] to [0058] of JP2012-208397A, the onium salts described in paragraphs [0024] to [0055] of JP2008-026730A, and the onium salts described in JP2002-037777A.

A content of the vertical alignment agent in the composition for forming a light absorption anisotropic layer (light absorption anisotropic layer) is preferably 0.1% to 400% by mass, and more preferably 0.5% to 350% by mass with respect to the total mass of the liquid crystalline compound.

The vertical alignment agents may be used alone or in combination of two or more kinds thereof. In a case where two or more kinds of vertical alignment agents are used, a total amount thereof is preferably in the range.

[Leveling Agent Suitable for Vertical Alignment]

The composition for forming a light absorption anisotropic layer (light absorption anisotropic layer) preferably includes the following leveling agent. In a case where the composition for forming a light absorption anisotropic layer (light absorption anisotropic layer) includes a leveling agent, a surface roughness due to dry air applied to a surface of the light absorption anisotropic layer is suppressed and the dichroic substance is more uniformly aligned.

The leveling agent is not particularly limited, and is preferably a leveling agent including a fluorine atom (fluorine-based leveling agent) or a leveling agent including a silicon atom (silicon-based leveling agent), and more preferably the fluorine-based leveling agent.

Examples of the fluorine-based leveling agent include fatty acid esters of polyvalent carboxylic acids, in which a part of a fatty acid is substituted with a fluoroalkyl group, and polyacrylates having a fluoro substituent. In particular, in a case where a rod-like compound is used as the dichroic substance and the liquid crystalline compound, a leveling agent including a repeating unit derived from a compound represented by Formula (40) is preferable from the viewpoint of promoting the vertical alignment of the dichroic substance and the liquid crystalline compound.

Formula (40)

$R^0$ represents a hydrogen atom, a halogen atom, or a methyl group.

L represents a divalent linking group. As L, an alkylene group having 2 to 16 carbon atoms is preferable, and any —$CH_2$— which is not adjacent to the alkylene group may be substituted with —O—, —COO—, —CO—, or —CONH—.

n represents an integer of 1 to 18.

The leveling agent having the repeating unit derived from the compound represented by Formula (40) may further include another repeating unit.

Examples of the other repeating unit include a repeating unit derived from a compound represented by Formula (41).

Formula (41)

$R^{11}$ represents a hydrogen atom, a halogen atom, or a methyl group.

X represents an oxygen atom, a sulfur atom, or —N($R^{13}$)—. $R^{13}$ represents a hydrogen atom or an alkyl group having 1 to 8 carbon atoms.

$R^{12}$ represents a hydrogen atom, an alkyl group which may have a substituent, or an aromatic group which may have a substituent. The alkyl group preferably has 1 to 20 carbon atoms. The alkyl group may be any of linear, branched, and cyclic forms.

In addition, examples of the substituent which may be contained in the alkyl group include a poly(alkyleneoxy) group and a polymerizable group. The definition of the polymerizable group is the same as mentioned above.

In a case where the leveling agent includes the repeating unit derived from the compound represented by Formula (40) and the repeating unit derived from the compound represented by Formula (41), a content of the repeating unit derived from the compound represented by Formula (40) is preferably 10% to 90% by mole, and more preferably 15% to 95% by mole with respect to all the repeating units included in the leveling agent.

In a case where the leveling agent includes the repeating unit derived from the compound represented by Formula (40) and the repeating unit derived from the compound represented by Formula (41), a content of the repeating unit derived from the compound represented by Formula (41) is preferably 10% to 90% by mole, and more preferably 5% to 85% by mole with respect to all the repeating units included in the leveling agent.

In addition, examples of the leveling agent also include a leveling agent including a repeating unit derived from the compound represented by Formula (42) instead of the repeating unit derived from the compound represented by Formula (40).

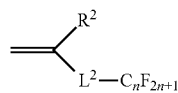

Formula (42)

$R^2$ represents a hydrogen atom, a halogen atom, or a methyl group.

$L^2$ represents a divalent linking group.

n represents an integer of 1 to 18.

Specific examples of the leveling agent include the compounds exemplified in paragraphs [0046] to [0052] of JP2004-331812A and the compounds described in paragraphs [0038] to [0052] of JP2008-257205A.

A content of the leveling agent in the composition for forming a light absorption anisotropic layer (light absorption anisotropic layer) is preferably 0.001% to 10% by mass, and more preferably 0.01% to 5% by mass with respect to the total mass of the liquid crystalline compound.

The leveling agents may be used alone or in combination of two or more kinds thereof. In a case where two or more kinds of leveling agents are used, a total amount thereof is preferably in the range.

[Polymerization Initiator]

The composition for forming a light absorption anisotropic layer preferably includes a polymerization initiator.

The polymerization initiator is not particularly limited, but is preferably a photosensitive compound, that is, a photopolymerization initiator.

As the photopolymerization initiator, various kinds of compounds can be used with no particular limitation. Examples of the photopolymerization initiator include the α-carbonyl compound (each of the specifications of U.S. Pat. Nos. 2,367,661A and 2,367,670A), the acyloin ether (the specification of U.S. Pat. No. 2,448,828A), the α-hydrocarbon-substituted aromatic acyloin compound (the specification of U.S. Pat. No. 2,722,512A), the polynuclear quinone compound (each of the specifications of U.S. Pat. Nos. 3,046,127A and 2,951,758A), the combination of a triarylimidazole dimer and p-aminophenyl ketone (the specification of U.S. Pat. No. 3,549,367A), the acridine and phenazine compounds (JP1985-105667A (JP-S60-105667A) and the specification of U.S. Pat. No. 4,239,850A), the oxadiazole compound (the specification of U.S. Pat. No. 4,212,970A), the o-acyloxime compounds (paragraph [0065] of JP2016-027384A), and the acyl phosphine oxide compounds (JP1988-40799B (JP-S63-40799B), JP1993-029234B (JP-H05-029234B), JP1998-095788A (JP-H10-095788A), and JP1998-029997A (JP-H10-029997A)).

A commercially available product can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SF.

In a case where the composition for forming a light absorption anisotropic layer includes the polymerization initiator, a content of the polymerization initiator is preferably 0.01 to 30 parts by mass, and more preferably 0.1 to 15 parts by mass with respect to 100 parts by mass of a total amount of the dichroic substance and the liquid crystalline compound in the composition for forming a light absorption anisotropic layer. In a case where the content of the polymerization initiator is 0.01 parts by mass or more, the durability of the light absorption anisotropic film is good, whereas in a case where the content of the polymerization initiator is 30 parts by mass or less, the alignment degree of the light absorption anisotropic film is better.

The polymerization initiators may be used alone or in combination of two or more kinds thereof. In a case where the two or more kinds of the polymerization initiators are included, a total amount thereof is preferably in the range.

[Solvent]

The composition for forming a light absorption anisotropic layer preferably includes a solvent from the viewpoint of workability and the like.

Examples of the solvent include organic solvents such as ketones (for example, acetone, 2-butanone, methyl isobutyl ketone, cyclopentanone, and cyclohexanone), ethers (for example, dioxane, tetrahydrofuran, 2-methyltetrahydrofuran, cyclopentylmethyl ether, tetrahydropyran, and dioxolane), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethyl sulfoxide), amides (for example, dimethylformamide, dimethylacetamide, N-methylpyrrolidone, and N-ethylpyrrolidone), and heterocyclic compounds (for example, pyridine), and water. These solvents may be used alone or in combination of two or more kinds thereof.

Among these solvents, ketones (in particular, cyclopentanone and cyclohexanone), ethers (in particular, tetrahydrofuran, cyclopentylmethyl ether, tetrahydropyran, and dioxolane), and amides (in particular, dimethylformamide, dimethylacetamide, N-methylpyrrolidone, and N-ethylpyrrolidone) are preferable.

In a case where the composition for forming a light absorption anisotropic layer includes the solvent, a content of the solvent is preferably 80% to 99% by mass, more preferably 83% to 98% by mass, and still more preferably 85% to 96% by mass with respect to the total mass of the composition for forming a light absorption anisotropic layer.

In a case where two or more kinds of solvents are included, the content of the solvent means a total content of the solvents.

<Method of Forming Light Absorption Anisotropic Layer>

A method for forming the light absorption anisotropic layer is not particularly limited, and examples thereof include a method including a step of applying the above-mentioned composition for forming a light absorption anisotropic layer to form a coating film (hereinafter also referred to as a "coating film forming step") and a step of aligning the liquid crystalline components included in the coating film (hereinafter also referred to as an "aligning step") in this order.

Furthermore, the liquid crystalline component is a component including not only the above-mentioned liquid crystalline compound but also a liquid crystal dichroic substance in a case where the above-mentioned dichroic substance has liquid crystallinity.

As the light absorption anisotropic layer, a layer obtained using the composition for forming a light absorption anisotropic layer is preferable, and a layer (cured layer) obtained by subjecting a coating film obtained using the composition for forming a light absorption anisotropic layer to a curing treatment is more preferable.

[Coating Film Forming Step]

The coating film forming step is a step of applying a composition for forming a light absorption anisotropic layer to form a coating film.

By using the composition for forming a light absorption anisotropic layer, including the above-mentioned solvent, or by using the composition for forming a light absorption anisotropic layer formed into a liquid state material such as a molten liquid by heating or the like, it is easier to apply the composition for forming a light absorption anisotropic layer.

A content of various components contained in the composition for forming a light absorption anisotropic layer is preferably adjusted to be a content of each of the above-mentioned components in the light absorption anisotropic layer.

Specific examples of a method for applying the composition for forming a light absorption anisotropic layer include known methods such as a roll coating method, a gravure printing method, a spin coating method, a wire bar coating method, an extrusion coating method, a direct gravure coating method, a reverse gravure coating method, a die-coating method, a spray method, and an ink jet method.

[Aligning Step]

The aligning step is a step of aligning the liquid crystalline components included in the coating film. With this step, a light absorption anisotropic layer can be obtained.

The aligning step may have a drying treatment. By the drying treatment, components such as a solvent can be removed from the coating film. The drying treatment may be performed by a method of leaving the coating film at room temperature for a predetermined time (for example, natural drying), or may be performed by a method of heating and/or blowing.

Here, the liquid crystalline component included in the composition for forming a light absorption anisotropic layer may sometimes be aligned by the above-mentioned coating film forming step or drying treatment. For example, in an aspect in which the composition for forming a light absorption anisotropic layer is prepared as a coating liquid including a solvent, a coating film having light absorption anisotropy (that is, a light absorption anisotropic film) can be obtained by drying the coating film and removing the solvent from the coating film.

In a case where the drying treatment is performed at a temperature no lower than the transition temperature of the liquid crystalline component included in the coating film to a liquid crystal phase, a heating treatment which will be described later may not be carried out.

The transition temperature of the liquid crystalline component included in the coating film to the liquid crystal phase is preferably 10° C. to 250° C., and more preferably 25° C. to 190° C., from the viewpoint of manufacturing suitability. In a case where the transition temperature is 10° C. or higher, a cooling treatment or the like for lowering the temperature to a temperature range in which a liquid crystal phase is exhibited is not required, which is thus preferable. In addition, in a case where the transition temperature is 250° C. or lower, a high temperature is not required even in a case where the liquid crystal phase is once brought into an isotropic liquid state at a higher temperature than the temperature range in which a liquid crystal phase is exhibited, which is thus preferable since waste of thermal energy, and deformation, deterioration, or the like of a substrate can be reduced.

The aligning step preferably has a heating treatment. By this treatment, the liquid crystalline component included in the coating film can be aligned, and therefore, the coating film after the heating treatment can be suitably used as the light absorption anisotropic film.

The heating treatment is preferably performed at 10° C. to 250° C., and more preferably performed at 25° C. to 190° C., from the viewpoint of manufacturing suitability. In addition, the heating time is preferably 1 to 300 seconds, and more preferably 1 to 60 seconds.

The aligning step may have a cooling treatment which is carried out after the heating treatment. The cooling treatment is a treatment for cooling the heated coating film to approximately room temperature (20° C. to 25° C.). By this treatment, the alignment of the liquid crystalline component included in the coating film can be immobilized. The cooling unit is not particularly limited, and can be carried out by a known method.

Through the steps above, a light absorption anisotropic film can be obtained.

In addition, in the present aspect, examples of the method for aligning the liquid crystalline component included in the coating film include, but are not limited to, the drying treatment, the heating treatment, and the like, and the method can be carried out by a known alignment treatment.

[Other Steps]

A method for forming the light absorption anisotropic layer may have a step of curing the light absorption anisotropic layer (hereinafter also referred to as a "curing step") after the aligning step.

For example, in a case where the light absorption anisotropic layer has a crosslinkable group (polymerizable group), the curing step is carried out by heating and/or light irradiation (exposure). Among these, the curing step is preferably carried out by light irradiation.

Various light sources such as infrared light, visible light, and ultraviolet rays can be used as a light source for curing, but the ultraviolet rays are preferable. In addition, the ultraviolet rays may be irradiated while heating at the time of curing or the ultraviolet rays may be irradiated through a filter which transmits only a specific wavelength.

In a case where the exposure is performed while heating, the heating temperature at the time of exposure depends on the transition temperature of the liquid crystalline component included in the liquid crystal film to the liquid crystal phase, but is preferably 25° C. to 140° C.

In addition, the exposure may be performed in a nitrogen atmosphere. In a case where curing of the liquid crystal film proceeds by radical polymerization, it is preferable that exposure is performed in a nitrogen atmosphere since inhibition of polymerization by oxygen is reduced.

A thickness of the light absorption anisotropic layer is not particularly limited, but is preferably 100 to 8,000 nm, and more preferably 300 to 5,000 nm from the viewpoint of the flexibility in a case where the laminate of the embodiment of the present invention, which will be described later, is used for a polarizing element.

Second Embodiment of Light Absorption Anisotropic Layer

A second embodiment of the light absorption anisotropic layer of the present invention is a light absorption anisotropic layer including a region A including a liquid crystalline compound and at least one dichroic substance, and a region B having a higher oblique transmittance as viewed from a polar angle of 30° than the region A, in which the dichroic substance is aligned perpendicular to a film surface (the main surface of the light absorption anisotropic layer), and an alignment degree of the region A at a wavelength of 550 nm is 0.95 or more.

The second embodiment of the light absorption anisotropic layer has two regions, a region A and a region B, in the in-plane direction. The region A has the same configuration as in the above-mentioned first embodiment of the light absorption anisotropic layer. That is, the region A includes the above-mentioned liquid crystalline compound and dichroic substance. In addition, in the region A, the dichroic substance is aligned perpendicular to the film surface, and the region A shows a predetermined alignment degree.

The region B is a region having a higher oblique transmittance as viewed from a polar angle of 30° than the region A. That is, in a case of comparing the oblique transmittance of the region A as viewed from a polar angle of 30° and the oblique transmittance of the region B as viewed from a polar angle of 30°, the oblique transmittance of the region B as viewed from a polar angle of 30° is higher.

The oblique transmittance means a transmittance at a wavelength of 550 nm.

The region B may be a space or a region including a liquid crystalline compound as in the region A. A dichroic substance may be included in the region B, but as described above, a content of the dichroic substance is adjusted so that the region A and the region B satisfy a predetermined transmittance relationship. A content of the dichroic substance in the region B is preferably 3% by mass or less, more preferably 1% by mass or less, and still more preferably 0% by mass with respect to a total mass of the region B.

The oblique transmittance as viewed from a polar angle of 30° of the region A is preferably 10% or less, and the oblique transmittance as viewed from a polar angle of 30° of the region B is preferably 80% or more.

In the second embodiment of the light absorption anisotropic layer, it is possible to increase or decrease the angle-of-view dependence (of polarized light) in some regions. This also makes it possible to display highly sensitive information only in a region where the angle-of-view dependence is strengthened. In addition, it is also possible to perform designing with excellent designability by freely controlling the angle-of-view dependence for a display device. In order to prevent light leakage from a light emitting part to a peripheral region in a display device such as a micro-light emitting diode (LED), it is also possible to increase a contrast between light and dark in a screen by performing patterning with a region other than the light emitting part taken as the region B, and the light emitting part taken as the region A.

Furthermore, the arrangement positions of the region A and the region B in the light absorption anisotropic layer are not particularly limited, and the both regions can be appropriately arranged according to the purpose of use. For example, the regions A and B may be alternately arranged in a striped pattern, or a part of the light absorption anisotropic layer may be designated as the region B and all the other regions may be designated as region A.

A method for forming the second embodiment of the light absorption anisotropic layer is not particularly limited, and various known methods as described in WO2019/176918A can be used. As an example thereof, a method of controlling the in-plane thickness of a light absorption anisotropic layer, a method of unevenly distributing dichroic coloring agent compounds in a light absorption anisotropic layer, a method of post-processing an optically uniform light absorption anisotropic layer, and the like can be cited.

As the method for controlling the in-plane thickness of the light absorption anisotropic layer, a method using lithography, a method using imprint, a method of forming a light absorption anisotropic layer on a substrate having an uneven structure, and the like can be cited.

Examples of the method of unevenly distributing the dichroic coloring agent compounds in the light absorption anisotropic layer include a method of extracting the dichroic coloring agent by solvent immersion (bleaching).

Further, examples of the method of post-processing an optically uniform light absorption anisotropic layer include a method of cutting a part of a flat light absorption anisotropic layer by laser processing or the like.

<Laminate>

The laminate of an embodiment of the present invention is a laminate in which the above-mentioned light absorption anisotropic layer (the first embodiment and the second embodiment) and a polarizer layer in which a dichroic substance is aligned horizontally are laminated. This makes it possible to reduce the transmittance of oblique light, and by narrowing the angle of view, the laminate can be used in applications such as privacy films.

The polarizer layer in which the dichroic substance is aligned horizontally is not particularly limited. A polarizer in which a dichroic substance is dyed onto polyvinyl alcohol or another high-molecular-weight resin and stretched, and is thus aligned horizontally may be used, or a polarizer in which a dichroic substance is aligned horizontally by utilizing the alignment of a liquid crystalline compound as in the light absorption anisotropic layer of the embodiment of the present invention may be used, but a polarizer in which a dichroic substance is aligned by utilizing the alignment of a liquid crystal without stretching is preferable.

The polarizer in which a dichroic substance is aligned by utilizing the alignment of a liquid crystal has many advantages that, for example, the polarizer can be extremely thinned to a thickness of about 0.1 to 5 µm, cracks at the time of bending the polarizer do not easily occur or thermal deformation is small as JP2019-194685A, and the durability is excellent even in a polarizing plate with a high transmittance of more than 50% as described in JP6483486B.

Taking advantage of these advantages, the polarizer can be used in applications that require high brightness or small size and light weight, applications of fine optical systems, molding applications for sites having curved surfaces, and applications for flexible sites.

[Barrier Layer]

The laminate of the embodiment of the present invention preferably has a barrier layer together with a light absorption anisotropic layer.

Here, the barrier layer is also called a gas shielding layer (oxygen shielding layer), and has a function of protecting the light absorption anisotropic layer of the embodiment of the present invention from a gas such as oxygen in the air, moisture, compounds included in an adjacent layer, and the like.

With regard to the barrier layer, reference can be made to, for example, the descriptions in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A.

[Refractive Index-Adjusting Layer]

The laminate of the embodiment of the present invention sometimes has a problem of internal reflection due to a high refractive index of the light absorption anisotropic layer. In that case, it is preferable that the refractive index-adjusting layer is present. The refractive index-adjusting layer is a layer arranged so that the layer is in contact with the light absorption anisotropic layer, and has an in-plane average refractive index at a wavelength of 550 nm of 1.55 to 1.70. The cured layer is preferably a refractive index-adjusting layer for performing a so-called index matching.

<Optical Film>

The optical film of an embodiment of the present invention has the above-mentioned light absorption anisotropic layer or the above-mentioned laminate.

The optical film may have a member other than the light absorption anisotropic layer and the laminate.

[Transparent Substrate Film]

The optical film of the embodiment of the present invention may have a transparent substrate film.

As the transparent substrate film, a known transparent resin film, a known transparent resin plate, a known transparent resin sheet, or the like can be used, and there is no particular limitation. Examples of the transparent resin film include a cellulose acylate film (for example, a cellulose triacetate film (refractive index of 1.48), a cellulose diacetate film, a cellulose acetate butyrate film, and a cellulose acetate propionate film), a polyethylene terephthalate film, a polyether sulfone film, a cycloolefin film, a polyacrylic resin film, a polyurethane resin film, a polyester film, a polycarbonate film, a polysulfone film, a polyether film, a polymethylpentene film, a polyether ketone film, and a (meth) acrylonitrile film.

Among those, the cellulose acylate film, which is highly transparent, has little optical birefringence, is easy to manufacture, and is generally used as a protective film for a polarizing plate, is preferable, and the cellulose triacetate film is more preferable.

A thickness of the transparent substrate film is usually 20 to 100 µm.

In the present invention, it is preferable that the transparent substrate film is a cellulose ester film and a film thickness thereof is 20 to 70 µm.

In addition, by using a polyacrylic film or a high-hardness film provided with a hard coat layer as a transparent base material, it is possible to prevent the light absorption anisotropic layer of the embodiment of the present invention from being damaged through a step of incorporating a step of affixing to other members (for example, a linearly polarizing plate) into an image display device.

In addition, it is possible to improve the high-temperature and high-humidity resistance and the light resistance of the light absorption anisotropic layer by using a low moisture-permeable/low oxygen-permeable film such as a polyethylene terephthalate film or a cycloolefin film as a transparent substrate.

[Alignment Film]

The optical film of the embodiment of the present invention may have an alignment film between the transparent substrate film and the light absorption anisotropic layer.

The alignment film may be any layer as long as the dichroic substance can be in a desired alignment state on the alignment film.

For example, a film formed from a polyfunctional acrylate compound or a polyvinyl alcohol may be used. In particular, the polyvinyl alcohol is preferable.

The light absorption anisotropic layer, the laminate, and the optical film of the embodiments of the present invention can also be used in combination with an optically anisotropic film or a rotator in order to control the angle dependence for an angle of view.

<Method for Producing Optical Film>

Examples of a method for producing the optical film of the embodiment of the present invention include a step of applying a composition for forming a light absorption anisotropic layer onto a transparent substrate film to form a coating film, a step of aligning liquid crystalline components included in the coating film to obtain the light absorption anisotropic layer, and a step of forming a protective layer so that the protective layer is adjacent to the light absorption anisotropic layer in this order.

Each step can be carried out according to a known method and is not particularly limited.

Furthermore, the liquid crystalline component is a component including not only the above-mentioned liquid crystalline compound but also a liquid crystal dichroic substance in a case where the above-mentioned dichroic substance has liquid crystallinity.

[Pressure Sensitive Adhesive Layer]

The laminate and the optical film of the embodiments of the present invention may have a pressure sensitive adhesive layer.

The pressure sensitive adhesive layer is preferably a transparent, optically isotropic pressure sensitive adhesive which is the same as those used in ordinary liquid crystal display devices, and an adhesive which is pressure sensitive is usually used.

In addition to a base material (pressure sensitive adhesive), conductive particles, and heat-expandable particles used as necessary, appropriate additives such as a crosslinking agent (for example, an isocyanate-based crosslinking agent and an epoxy-based crosslinking agent), a viscosity imparting agent (for example, a rosin derivative resin, a polyterpene resin, a petroleum resin, and an oil-soluble phenolic resin), a plasticizer, a filler, an aging-preventing agent, a surfactant, an ultraviolet absorbing agent, a light stabilizer, and an antioxidant may be blended into the pressure sensitive adhesive layer.

A thickness of the pressure sensitive adhesive layer is not particularly limited, but is preferably 20 to 500 µm, and more preferably 20 to 250 µm. In a case where the thickness of the pressure sensitive adhesive layer is 20 µm or more, necessary adhesive strength and rework suitability can be easily obtained, and in a case where the thickness of the pressure sensitive adhesive layer is 500 μm or less, the pressure sensitive adhesive can be further suppressed from squeeze out or seep out from a peripheral end part of an image display device.

For formation of the pressure sensitive adhesive layer, for example, a method of directly applying a coating liquid including a base material, conductive particles, and as necessary, heat-expandable particles, an additive, a solvent, and the like, and crimping the layer through a release liner, and a method of applying a coating liquid on an appropriate release liner (a release paper and the like) to form a heat-expandable, pressure sensitive adhesive layer, and then crimping and transferring (transferring) the layer onto an object to be applied.

[Adhesive Layer]

The laminate and the optical film of the embodiments of the present invention may have an adhesive layer.

The adhesive included in the adhesive layer exhibits adhesiveness by performing drying or a reaction after the affixing.

For example, a polyvinyl alcohol-based adhesive (PVA-based adhesive) exhibits adhesiveness by drying, and thus enables the adhesion between materials.

Specific examples of a curable adhesive which exhibits adhesiveness by being reacted include an active energy my curing type adhesive such as a (meth)acrylate-based adhesive, and a cationic polymerization curing type adhesive. Moreover, the (meth)acrylate means acrylate and/or methacrylate. Examples of a curable component in the (meth)acrylate-based adhesive include a compound having a (meth)acryloyl group and a compound having a vinyl group. Furthermore, a compound having an epoxy group or an oxetanyl group can also be used as the cationic polymerization-curable adhesive. The compound having an epoxy group is not particularly limited as long as it has at least two epoxy groups in the molecule, and various curable epoxy compounds generally known can be used. Preferred examples of the epoxy compound include a compound (aromatic epoxy compound) having at least two epoxy groups and at least one aromatic ring in the molecule and a compound (alicyclic epoxy compound) having at least two epoxy groups in the molecule, at least one of which is formed between two adjacent carbon atoms constituting an alicyclic ring.

Among those, an ultraviolet curable adhesive which is cured by ultraviolet irradiation is preferably used from the viewpoint of heating deformation resistance.

Each layer of the adhesive layer and the pressure sensitive adhesive layer has an ultraviolet absorbing ability by a method of treating with an ultraviolet absorber such as a salicylic acid ester-based compound, a benzophenol-based compound, a benzotriazole-based compound, a cyanoacrylate-based compound, and a nickel complex salt-based compound.

The pressure sensitive adhesive layer and the adhesive layer can be attached to a film by an appropriate method. For this, for example, a method in which a pressure sensitive adhesive solution at about 10% to 40% by weight in which a base polymer or a composition thereof is dissolved or dispersed in a solvent consisting of a single substance or a mixture of appropriate solvents such as toluene and ethyl acetate, and directly attaching the solution onto a film by an appropriate developing method such as a rolling method and a coating method, or a method of forming a pressure sensitive adhesive layer on a separator and transferring the pressure sensitive adhesive layer can be cited.

The pressure sensitive adhesive layer and the adhesive layer can also be provided on one or both surfaces of a film in the form of a layer having superposition of different compositions, types, and the like. In addition, in a case where the pressure sensitive adhesive layer and the adhesive layer are provided on both sides, adhesive layers having different compositions, types, thicknesses, and the like can be used on the front and back surfaces of the film.

Moreover, before attaching the adhesive or the pressure sensitive adhesive, a surface of an object to which the adhesive or the pressure sensitive adhesive is arranged may be modified for the purpose of improving the adhesiveness. Examples of specific treatments include a corona treatment, a plasma treatment, a primer treatment, and a saponification treatment.

<Image Display Device>

The image display device of an embodiment of the present invention has the above-mentioned light absorption anisotropic layer of the embodiment of the present invention, the above-mentioned laminate of the embodiment of the present invention, or the above-mentioned optical film of the embodiment of the present invention.

The optical film of the embodiment of the present invention has a high front transmittance and a low oblique transmittance, as compared with a film for controlling an angle of view known in the related art, using a dichroic substance, and is therefore highly useful for realizing a narrow angle of view. As the film for controlling an angle of view, a light control film manufactured by 3M Co., Ltd. is also well known, but it has problems such as a large thickness and susceptibility to moire caused by a periodic structure, and therefore, the optical film of the embodiment of the present invention can be used to replace it, contributing to an improvement of image quality, thinning, miniaturization, and designability improvement of an image display device.

A display element used in the image display device of the embodiment of the present invention is not particularly limited, and examples thereof include a liquid crystal cell, an organic electroluminescence (hereinafter simply referred to as "EL") display panel, and a plasma display panel.

Among those, a liquid crystal cell or an organic EL display panel is preferable and a liquid crystal cell is more preferable. That is, as the image display device of the embodiment of the present invention, a liquid crystal display device using a liquid crystal cell as a display element or an organic EL display device using an organic EL display panel as a display element is preferable, and the liquid crystal display device is more preferable.

[Liquid Crystal Display Device]

As the liquid crystal display device which is an example of the image display device of the embodiment of the present invention, an aspect thereof having the above-mentioned light absorption anisotropic layer and a liquid crystal cell is preferably cited. More suitably, a liquid crystal display device having the above-mentioned laminate of the embodiment of the present invention (provided that the laminate does not include a λ/4 plate) and a liquid crystal cell can be cited.

Furthermore, in the present invention, among the polarizing elements provided on both sides of the liquid crystal cell, the laminate of the embodiment of the present invention is preferably used as the front-side polarizing element, and the laminate of the embodiment of the present invention is more preferably used as the front-side and rear-side polarizing elements.

Hereinafter, the liquid crystal cell constituting the liquid crystal display device will be described in detail.

(Liquid Crystal Cell)

The liquid crystal cell used for the liquid crystal display device is preferably in a vertical alignment (VA) mode, an optically compensated bend (OCB) mode, an in-plane-switching (IPS) mode, or a twisted nematic (TN) mode, but is not limited thereto.

In a liquid crystal cell in the TN mode, rod-like liquid crystalline molecules are aligned substantially horizontally with no application of a voltage, and twist-aligned by 60° to 120°. The liquid crystal cell in the TN mode is most frequently used as a color thin film transistor (TFT) liquid crystal display device, and is described in many documents.

In a VA-mode liquid crystal cell, rod-like liquid crystal molecules are aligned substantially vertically with no application of voltage. The liquid crystal cell in the VA mode includes (1) a narrowly-defined liquid crystal cell in the VA mode in which rod-like liquid crystalline molecules are aligned substantially vertically with no application of a voltage, and are aligned substantially horizontally with the application of a voltage (described in JP1990-176625A (JP-H02-176625A)), (2) a liquid crystal cell (in the MVA mode) in which the VA mode is made into multi-domains in order to expand the angle of view (described in SID97, Digest of tech. Papers (proceedings) 28 (1997) 845), (3) an liquid crystal cell in a mode (the n-ASM mode) in which rod-like liquid crystalline molecules are aligned substantially vertically with no application of a voltage, and are twistedly aligned in multi-domains with the application of a voltage (described in the proceedings 58 and 59 of Japanese Liquid Crystal Conference (1998)), and (4) a liquid crystal cell in the SURVIVAL mode (announced at LCD International 98). In addition, the liquid crystal cell in the VA mode may be any one of a patterned vertical alignment (PVA) type, an optical alignment type, and a polymer-sustained alignment (PSA) type. With respect to the details of these modes, detailed descriptions can be found in JP2006-215326A and JP2008-538819A.

In an IPS-mode liquid crystal cell, rod-like liquid crystalline molecules are aligned substantially parallel with respect to a substrate, and application of an electric field parallel to the substrate surface causes the liquid crystal molecules to respond planarly. The IPS mode displays black in a state where no electric field is applied and a pair of upper and lower polarizing plates have absorption axes which are orthogonal to each other. A method for improving the angle of view by reducing light leakage during black display in an oblique direction using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

[Organic EL Display Device]

As an organic EL display device which is an example of the image display device of the embodiment of the present invention, for example, an aspect in which the above-mentioned light absorption anisotropic layer of the embodiment of the present invention, a horizontal alignment polarizer, a λ/4 plate, and an organic EL display panel are provided in this order from the visual recognition side is suitably cited.

In addition, the organic EL display panel is a display panel configured using an organic EL element in which an organic light emitting layer (organic electroluminescent layer) is sandwiched between electrodes (between a cathode and an anode). The configuration of the organic EL display panel is not particularly limited, and known configurations are employed.

[Curved Surface Image Display Device]

Examples of the curved surface image display device of the embodiment of the present invention are disclosed in JP2017-181821A, JP2017-181819A, JP2017-102456A, JP2014-095901A, and the like.

The curved surface image display device has a curved surface part in a display portion. Since the light absorption anisotropic layer of the embodiment of the present invention has low rigidity, the shape can be deformed along the curved surface part of the display portion. That is, the light absorption anisotropic layer of the embodiment of the present invention can be deformed so as to have a curved surface part in itself.

Furthermore, since the laminate and the optical film of the embodiments of the present invention also have low rigidity, the shape can be deformed along the curved surface part of the display portion. That is, the laminate and the optical film of the embodiment of the present invention can be deformed so as to have a curved surface part in itself.

[Image Display Device Capable of Switching Angle of View (Image Display Device that can Switch Angle of View)]

By using the light absorption anisotropic layer, the laminate, and the optical film of the embodiments of the present invention, it is possible to narrow an emission angle. Various methods are known for an image display device capable of switching an angle of view, but the light absorption anisotropic layer, the laminate, and the optical film of the embodiments of the present invention can be used for the purpose of generating light with a narrow emission angle.

For example, after using the light absorption anisotropic layer, the laminate, and the optical film of the embodiments of the present invention to generate light with a narrow emission angle, a narrow angle of view/a wide angle of view can be switched by passing through an element that controls the presence or absence of light diffusion as described in JP1997-105907A (JP-H09-105907A).

Alternatively, as described in JP2017-098246A, in a backlight system capable of switching a narrow angle of view/a wide angle of view consisting of an inversion prism sheet, a first light guide plate (light emitted from the inversion prism sheet has a narrow angle of view) that makes light incident on the inversion prism sheet at a relatively large incidence angle, an optical filter element that absorbs oblique incidence rays and makes rays having a narrow emission angle incident on the inversion prism sheet at a relatively small incidence angle, and a second light guide plate (light emitted from the inversion prism sheet has a narrow angle of view) in this order from the visual recognition side, the light absorption anisotropic layer, the laminate, or the optical film of the embodiment of the present invention can be used as the optical filter element.

In addition, a phase difference modulation element such as a liquid crystal cell can be arranged between the light absorption anisotropic layer of the embodiment of the present invention and a horizontal alignment polarizer to switch a narrow angle of view and a wide angle of view. For example, in a case where a VA mode or ECB mode liquid crystal cell is used as a phase difference modulation cell, the angle of view is smaller in a state where liquid crystals in the liquid crystal cell are aligned vertically, and the angle of view is in a wide mode in a state where liquid crystals in the liquid crystal cell are tilt-aligned, and in this manner, the narrow angle of view/the wide angle of view can be controlled by applying or not applying a voltage of the cell.

In addition, it is also conceivable to use an IPS mode liquid crystal cell as the phase difference modulation cell. By changing the alignment direction of the liquid crystal cell by applying a voltage so that the alignment direction of the liquid crystal cell where no voltage is applied and the absorption axis direction of a horizontal alignment polarizer are parallel or vertical, the angle of view can be switched from a narrow angle of view to a wide angle of view.

In addition, it is possible to switch a narrow angle of view/a wide angle of view by patterning regions A and B described in claims 3 and 4 of the present invention for each light emitting pixel and controlling the lighting of each light emitting pixel as in Example 7 which will be described later.

EXAMPLES

Hereinafter, the present invention will be specifically described with reference to Examples. The materials, the reagents, the amounts of materials and proportions thereof, operations, and the like shown in Examples below can be appropriately modified without departing from the spirit of the present invention. Therefore, the present invention is not limited to the following Examples.

Example 1

A light absorption anisotropic layer in which a coloring agent was aligned in the vertical direction was manufactured as follows.

[Manufacture of Transparent Support 1]

A surface of a cellulose acylate film 1 (TAC substrate having a thickness of 40 μm; TG40, Fujifilm Corporation) was saponified with an alkali liquid, and a coating liquid 1 for forming an alignment layer was coated on the surface with a wire bar. A support on which the coating film had been formed was dried with warm air at 60° C. for 60 seconds and further with warm air at 100° C. for 120 seconds to form an alignment layer, and a TAC film with the alignment layer was obtained.

A film thickness of the aligned layer was 1 μm.

| (Coating Liquid 1 for Forming Alignment Layer) | |
|---|---|
| The following modified polyvinyl alcohol | 3.80 parts by mass |
| Initiator Irg2959 | 0.20 parts by mass |

| (Coating Liquid 1 for Forming Alignment Layer) | |
|---|---|
| Water | 70 parts by mass |
| Methanol | 30 parts by mass |

Modified Polyvinyl Alcohol

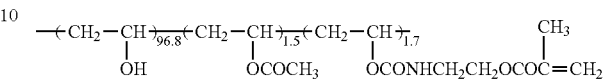

[Formation of Light Absorption Anisotropic Layer P1]

The following composition P1 for forming a light absorption anisotropic layer was continuously applied onto the obtained alignment layer PA1 with a wire bar to form a coating layer P1.

Next, the coating layer P1 was heated at 140° C. for 30 seconds, and the coating layer P1 was cooled to room temperature (23° C.).

Subsequently, the coating layer P1 was heated at 80° C. for 60 seconds and cooled again to room temperature.

Thereafter, the coating layer P1 was irradiated with light for 2 seconds under an irradiation condition of an illuminance of 200 mW/cm$^2$, using a LED lamp (center wavelength of 365 nm) to manufacture a light absorption anisotropic layer P1 on the alignment layer 1.

A film thickness of the coating layer P1 was 3 μm, and an alignment degree of the light absorption anisotropic layer P1 at a wavelength of 550 nm was 0.96.

This was designated as a light absorption anisotropic film 1.

| Composition of composition P1 for forming light absorption anisotropic layer | |
|---|---|
| The following dichroic substance D-1 | 0.40 parts by mass |
| The following dichroic substance D-2 | 0.15 parts by mass |
| The following dichroic substance D-3 | 0.63 parts by mass |
| The following high-molecular-weight liquid crystalline compound P-1 | 3.65 parts by mass |
| Polymerization initiator IRGACURE OXE-02 (manufactured by BASF) | 0.040 parts by mass |
| The following compound E-1 | 0.060 parts by mass |
| The following compound E-2 | 0.060 parts by mass |
| The following surfactant F-1 | 0.010 parts by mass |
| The following surfactant F-2 | 0.015 parts by mass |
| Cyclopentanone | 47.00 parts by mass |
| Tetrahydrofuran | 47.00 parts by mass |
| Benzyl alcohol | 1.00 part by mass |

Dichroic substance D-1

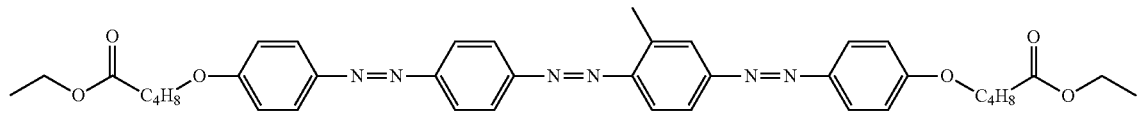

Dichroic substance D-2

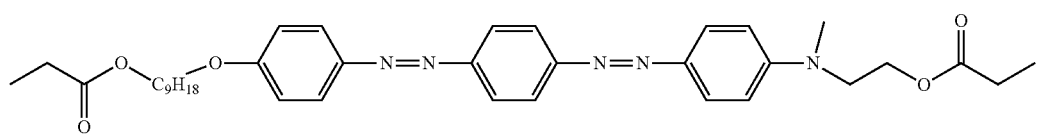

-continued

Dichroic substance D-2

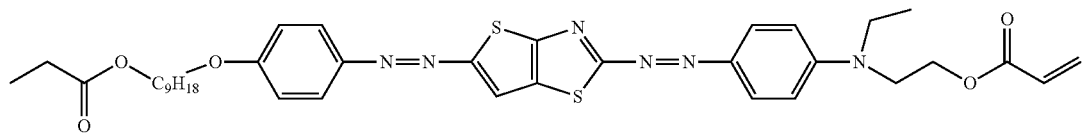

High-molecular-weight liquid crystalline compound P-1

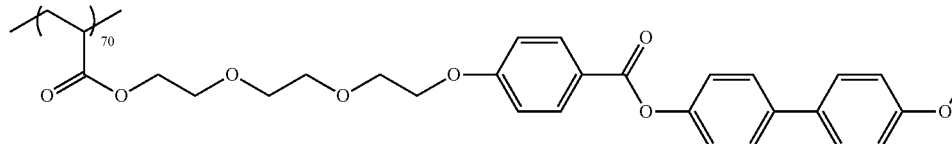

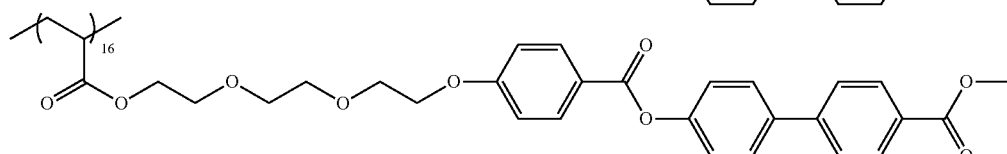

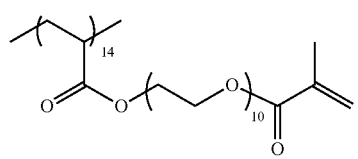

Compound E-1

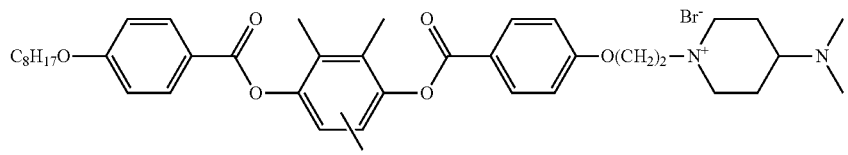

Compound E-2

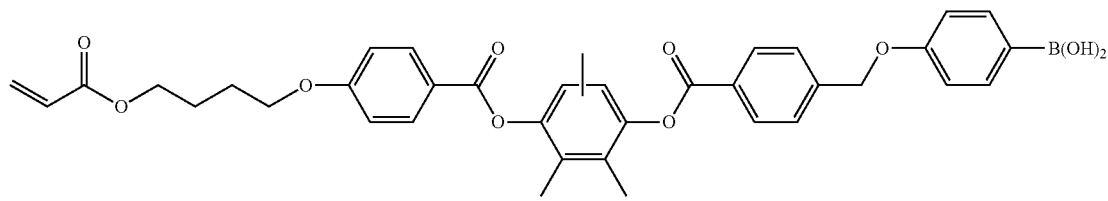

Surfactant F-1

Surfactant F-2

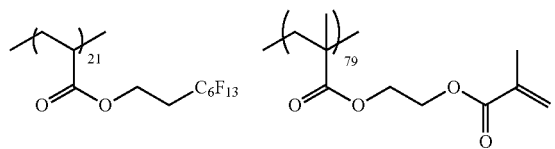

[Manufacture of Laminate A1]

A polarizing plate 1 in which a thickness of a polarizer was 8 µm and one surface of the polarizer was exposed was manufactured by the same method as the polarizing plate 02 with a protective film on one surface described in WO2015/166991A.

The exposed surface of the polarizer of the polarizing plate 1 and the light absorption anisotropic layer surface of the light absorption anisotropic film 1 manufactured above were subjected to a corona treatment and affixed to each other using the following PVA adhesive 1 to manufacture a laminate A1.

(Preparation of PVA Adhesive 1)

20 parts by mass of methylol melamine with respect to 100 parts by mass of a polyvinyl alcohol-based resin containing an acetoacetyl group (average degree of polymerization: 1,200, degree of saponification: 98.5% by mole, degree of acetoacetylation: 5% by mole) was dissolved in pure water under a temperature condition of 30° C. to prepare an aqueous solution with a concentration of solid contents adjusted to 3.7% by mass.

[Manufacture of Image Display Device A1]

iPad Air (registered trademark) Wi-Fi Model 16 GB (manufactured by APPLE) which is an IPS mode liquid crystal display device was disassembled, and the liquid crystal cell was taken out. The polarizing plate on a visual recognition side was peeled from the liquid crystal cell, the laminate A1 manufactured above was affixed onto a surface from which the polarizing plate on the visual recognition side had been peeled, so that the polarizing plate 1 side was on the liquid crystal cell side, using the following pressure sensitive adhesive sheet 1. At this time, the affixing was performed so that the direction of the absorption axis of the polarizing plate 1 was the same as the absorption axis of the polarizing plate on the visual recognition side, which had been affixed to a product. After the affixing, the components were reassembled to manufacture an image display device A1.

(Manufacture of Pressure Sensitive Adhesive Sheet 1)

An acrylate-based polymer was prepared according to the following procedure.

In a reaction vessel comprising a cooling pipe, a nitrogen introduction pipe, a thermometer, and a stirrer, 95 parts by weight of butyl acrylate and 5 parts by weight of acrylic acid were polymerized by a solution polymerization method to obtain an acrylate-based polymer A1 having an average molecular weight of 2,000,000 and a molecular weight distribution (Mw/Mn) of 3.0.

Next, in addition to the obtained acrylate-based polymer A1 (100 parts by mass), Coronate L (a 75% by mass ethyl acetate solution of a trimethylolpropane adduct of tolylene isocyanate: number of isocyanate groups in one molecule: 3, manufactured by Nippon Polyurethane Industry Co., Ltd.) (1.0 part by mass) and a silane coupling agent KBM-403 (manufactured by Shin-Etsu Chemical Co., Ltd.) (0.2 parts by mass) were mixed, and lastly, ethyl acetate was added thereto to a total concentration of solid contents of 10% by mass to prepare a composition for forming a pressure sensitive adhesive. The composition was applied onto a separate film which had been surface-treated with a silicone-based release agent, using a die coater, dried in an environment of 90° C. for 1 minute to obtain an acrylate-based pressure sensitive adhesive sheet (pressure sensitive adhesive sheet 1). A film thickness of the pressure sensitive adhesive sheet 1 was 25 µm, and a storage elastic modulus of the pressure sensitive adhesive sheet 1 was 0.1 MPa.

Example 2

An image display device A2 of Example 2 was manufactured in the same manner as in Example 1, except that the composition P1 for forming a light absorption anisotropic layer was changed to a composition P2 for forming a light absorption anisotropic layer.

| Composition of composition P2 for forming light absorption anisotropic layer | |
|---|---|
| The following dichroic substance D-4 | 0.40 parts by mass |
| The dichroic substance D-2 | 0.15 parts by mass |
| The dichroic substance D-3 | 0.63 parts by mass |
| The high-molecular-weight liquid crystalline compound P-1 | 3.65 parts by mass |
| Polymerization initiator IRGACURE OXE-02 (manufactured by BASF) | 0.040 parts by mass |
| The compound E-1 | 0.060 parts by mass |
| The compound E-2 | 0.060 parts by mass |
| The surfactant F-1 | 0.010 parts by mass |
| The surfactant F-2 | 0.015 parts by mass |
| Cyclopentanone | 47.00 parts by mass |
| Tetrahydrothran | 47.00 parts by mass |
| Benzyl alcohol | 1.00 part by mass |

Dichroic Substance D-4

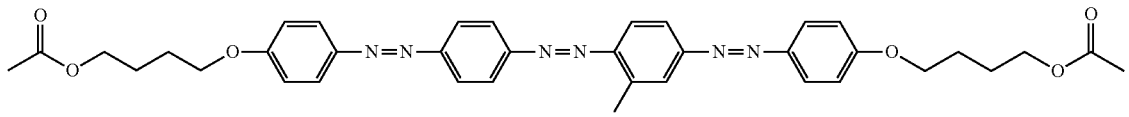

Example 3

An image display device A3 of Example 3 was manufactured in the same manner as in Example 1, except that the composition P1 for forming a light absorption anisotropic layer was changed to a composition P3 for forming a light absorption anisotropic layer.

| Composition of composition P3 for forming light absorption anisotropic layer | |
|---|---|
| The dichroic substance D-1 | 0.40 parts by mass |
| The dichroic substance D-2 | 0.15 parts by mass |
| The dichroic substance D-3 | 0.63 parts by mass |
| The following high-molecular-weight liquid crystalline compound P-2 | 3.20 parts by mass |
| The following low-molecular-weight liquid crystalline compound M-1 | 0.45 parts by mass |
| Polymerization initiator IRGACURE OXE-02 (manufactured by BASF) | 0.040 parts by mass |
| The following compound E-1 | 0.060 parts by mass |
| The following compound E-2 | 0.060 parts by mass |
| The following surfactant F-1 | 0.010 parts by mass |
| The following surfactant F-2 | 0.015 parts by mass |
| Cyclopentanone | 47.00 parts by mass |
| Tetrahydrofuran | 47.00 parts by mass |
| Benzyl alcohol | 1.00 part by mass |

High-molecular-weight liquid crystalline compound P-2

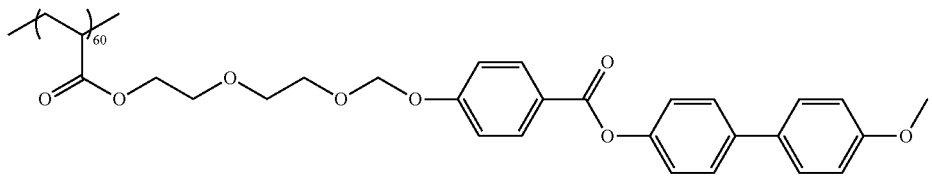

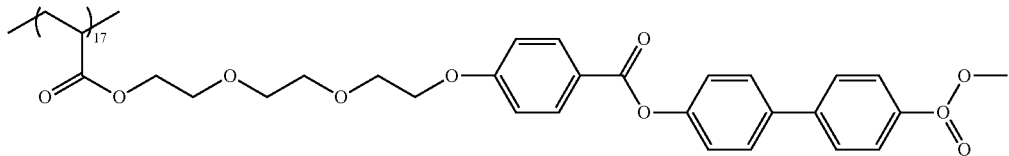

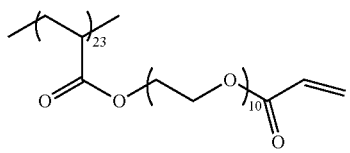

Low-molecular-weight liquid crystalline compound M-1

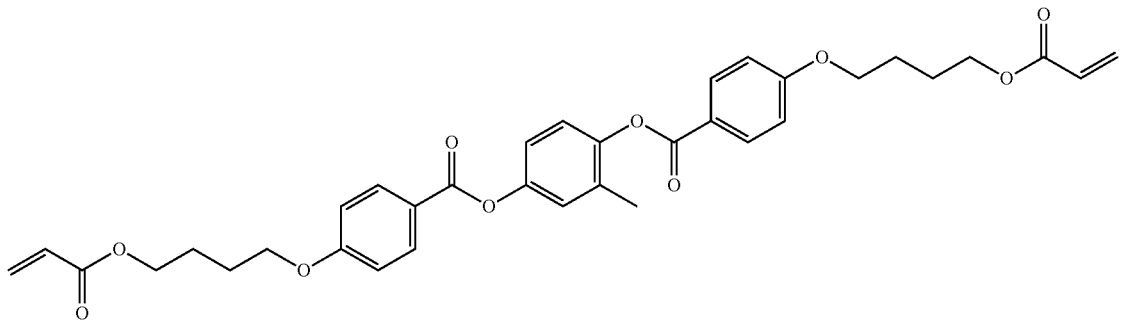

Example 4

An image display device A4 of Example 4 was manufactured in the same manner as in Example 1, except that the composition P1 for forming a light absorption anisotropic layer was changed to a composition P4 for forming a light absorption anisotropic layer.

| Composition of composition P4 for forming light absorption anisotropic layer | |
|---|---|
| The following dichroic substance D-5 | 0.40 parts by mass |
| The dichroic substance D-2 | 0.15 parts by mass |
| The dichroic substance D-3 | 0.63 parts by mass |
| The high-molecular-weight liquid crystalline compound P-1 | 3.65 parts by mass |
| Polymerization initiator IRGACURE OXE-02 (manufactured by BASF) | 0.040 parts by mass |
| The compound E-1 | 0.060 parts by mass |
| The compound E-2 | 0.060 parts by mass |
| The surfactant F-1 | 0.010 parts by mass |
| The surfactant F-2 | 0.015 parts by mass |
| Cyclopentanone | 47.00 parts by mass |
| Tetrahydrofuran | 47.00 parts by mass |
| Benzyl alcohol | 1.00 part by mass |

Dichroic substance D-5

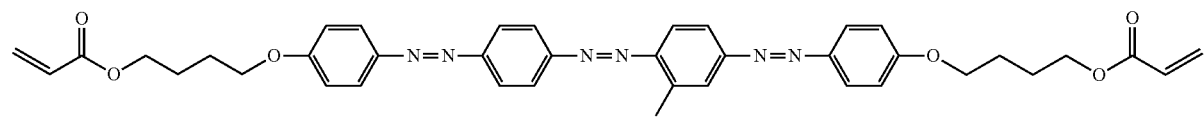

Example 5

[Manufacture of Cellulose Acylate Film 1]
(Manufacture of Core Layer Cellulose Acylate Dope)

The following composition was introduced into a mixing tank and stirred to dissolve the respective components, thereby preparing a cellulose acetate solution used as a core layer cellulose acylate dope.

| Core layer cellulose acylate dope | |
|---|---|
| Cellulose acetate having acetyl substitution degree of 2.88 | 100 parts by mass |
| Polyester compound B described in Examples of JP2015-227955A | 12 parts by mass |
| The following compound F | 2 parts by mass |
| Methylene chloride (first solvent) | 430 parts by mass |
| Methanol (second solvent) | 64 parts by mass |

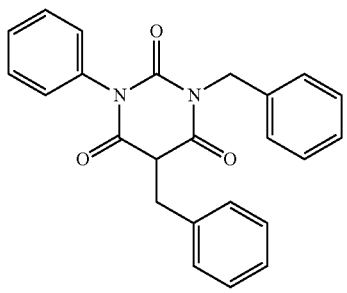

Compound F (Manufacture of Outer Layer Cellulose Acylate Dope)

To 90 parts by mass of the core layer cellulose acylate dope was added 10 parts by mass of the following matting agent solution to prepare a cellulose acetate solution used as an outer layer cellulose acylate dope.

| Matting agent solution | |
|---|---|
| Silica particles having average particle Size of 20 nm (AEROSIL R972, manufactured by NIPPON AEROSIL CO., LTD.) | 2 parts by mass |
| Methylene chloride (first solvent) | 76 parts by mass |
| Methanol (second solvent) | 11 parts by mass |
| The core layer cellulose acylate dope | 1 part by mass |

(Manufacture of Cellulose Acylate Film 2)

The core layer cellulose acylate dope and the outer layer cellulose acylate dope were filtered with filter paper having an average pore diameter of 34 μm and a sintered metal filter having an average pore diameter of 10 μm, and then three layers of the core layer cellulose acylate dope and the outer layer cellulose acylate dopes on both sides thereof were cast onto a drum at 20° C. from casting ports at the same time (band casting machine).

Subsequently, the film was peeled from the drum in a state where the solvent content reached approximately 20% by mass, the both ends of the film in the width direction were fixed with tenter clips, and the film was dried while being stretched at a stretching ratio of 1.1 times in the cross direction.

Thereafter, the film was transported between rolls in a heat treatment device and further dried to produce an optical film having a thickness of 20 μm, which was used as a cellulose acylate film 2. The in-plane retardation of the obtained cellulose acylate film 2 was 0 nm.

[Manufacture of Transparent Support 2]

A coating liquid PA1 for forming a photoalignment layer, which will be described later, was continuously applied onto the cellulose acylate film 2 with a wire bar. The support on which the coating film was formed was dried with hot air at 140° C. for 120 seconds, and subsequently, the coating film was irradiated with polarized ultraviolet rays (10 mJ/cm², using an ultra-high-pressure mercury lamp) to form a photoalignment layer PA1, whereby a TAC film with a photoalignment layer was obtained. A film thickness of the photoalignment layer PA1 was 0.3 μm.

| (Coating Liquid PA1 for Forming Photoalignment Layer) | |
|---|---|
| The following polymer PA-1 | 100.00 parts by mass |
| The following acid generator PAG-1 | 5.00 parts by mass |
| The following acid generator CPI-110TF | 0.005 parts by mass |
| Isopropyl alcohol | 16.50 parts by mass |
| Butyl acetate | 1,072.00 parts by mass |
| Methyl ethyl ketone | 268.00 parts by mass |

Polymer PA-1

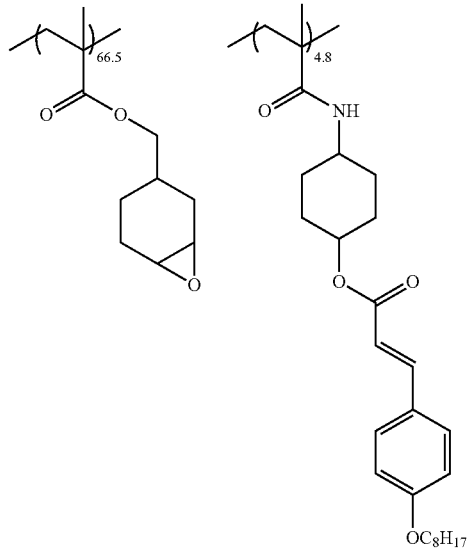

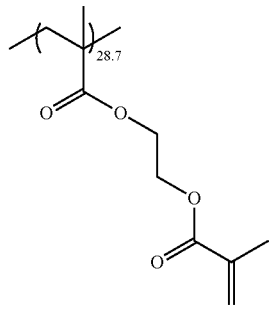

Acid generator PAG-1

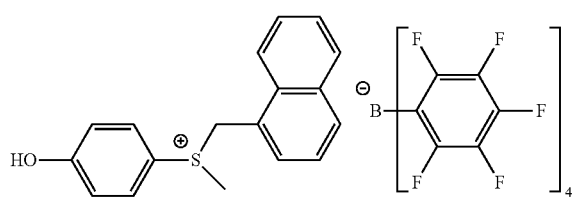

Acid generator CPI-110F

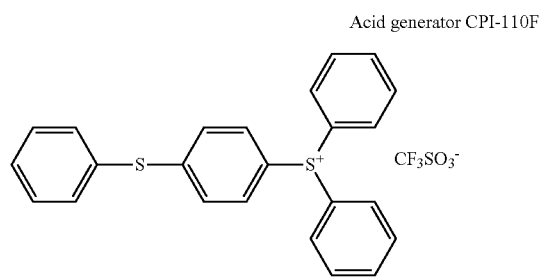

[Formation of Polarizer Layer 1]

The following composition 1 for forming a polarizer layer was continuously applied onto the obtained photoalignment layer PA1 with a wire bar to form a coating layer 1.

Next, the coating layer 1 was heated at 140° C. for 30 seconds, and the coating layer 1 was cooled to room temperature (23° C.).

Next, the obtained coating layer 1 was heated at 80° C. for 60 seconds and cooled again to room temperature.

Thereafter, the coating layer 1 was irradiated with light for 2 seconds under an irradiation condition of an illuminance of 200 mW/cm$^2$, using a LED lamp (center wavelength of 365 nm), to manufacture a polarizer layer 1 on the photoalignment layer PA1. A film thickness of the polarizer layer 1 was 1.6 μm.

| Composition of composition 1 for forming polarizer layer | |
|---|---|
| The dichroic substance D-1 | 0.25 parts by mass |
| The dichroic substance D-2 | 0.36 parts by mass |
| The dichroic substance D-3 | 0.59 parts by mass |
| The high-molecular-weight liquid crystalline compound P-2 | 2.21 parts by mass |
| The low-molecular-weight liquid crystalline compound M-1 | 1.36 parts by mass |
| Polymerization initiator IRGACURE OXE-02 (manufactured by BASF) | 0.200 parts by mass |
| The following surfactant F-3 | 0.026 parts by mass |
| Cyclopentanone | 46.00 parts by mass |
| Tetrahydrofuran | 46.00 parts by mass |
| Benzyl alcohol | 3.00 parts by mass |

[Formation of Alignment Layer 1]

A surface of the polarizer layer 1 was subjected to a corona treatment, and then the coating liquid 1 for forming an alignment layer was continuously applied with a wire bar. Thereafter, drying was performed with warm air at 100° C. for 2 minutes to form a polyvinyl alcohol (PVA) alignment layer 1 with a thickness of 1.0 μm on the polarizer layer 1.

[Formation of Light Absorption Anisotropic Layer P1]

The composition P1 for forming a light absorption anisotropic layer was continuously applied onto the obtained alignment layer 1 with a wire bar to form a coating layer P1.

Next, the coating layer P1 was heated at 140° C. for 30 seconds, and the coating layer P1 was cooled to room temperature (23° C.).

Next, the obtained coating layer P1 was heated at 80° C. for 60 seconds and cooled again to room temperature.

Thereafter, the coating layer P1 was irradiated with light for 2 seconds under an irradiation condition of an illuminance of 200 mW/cm$^2$, using a LED lamp (center wavelength of 365 nm), to manufacture a light absorption anisotropic layer P1, which was designated as a laminate A5, on the alignment layer 1. A film thickness of the coating layer P1 was 3 μm, and an alignment degree of the light absorption anisotropic layer P1 at a wavelength of 550 nm was 0.96.

[Manufacture of Image Display Device A5]

iPad Air (registered trademark) Wi-Fi Model 16 GB (manufactured by APPLE) which is an IPS mode liquid crystal display device was disassembled, and the liquid crystal cell was taken out. The polarizing plate on a visual recognition side was peeled from the liquid crystal cell, the laminate A5 manufactured above was affixed onto a surface from which the polarizing plate on the visual recognition side had been peeled, so that the cellulose acylate film 2 side was on the liquid crystal cell side, using the pressure sensitive adhesive sheet 1. At this time, the affixing was performed so that the direction of the absorption axis of the polarizer layer 1 was the same as the absorption axis of the polarizing plate on the visual recognition side, which had been affixed to a product. After the affixing, the components were reassembled to manufacture an image display device A5.

Comparative Example 1

An image display device B1 was manufactured in the same manner as in Example 1, except that the composition P1 for forming a light absorption anisotropic layer was changed to a composition P5 for forming a light absorption anisotropic layer.

| Composition of composition P5 for forming light absorption anisotropic layer | |
|---|---|
| The dichroic substance D-5 | 8.71 parts by mass |
| The following dichroic substance D-6 | 10.59 parts by mass |
| The following high-molecular-weight liquid crystalline compound P-3 | 44.13 parts by mass |

Surfactant F-3

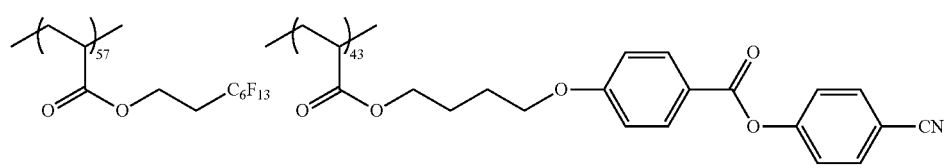

-continued

Composition of composition P5 for forming light absorption anisotropic layer

| | |
|---|---|
| Polymerization initiator IRGACURE OXE-02 (manufactured by BASF) | 0.040 parts by mass |
| The compound E-1 | 0.800 parts by mass |
| The compound E-2 | 0.800 parts by mass |
| The surfactant F-2 | 0.960 parts by mass |
| Cyclopentanone | 793.90 parts by mass |
| Tetrahydrofuran | 140.10 parts by mass |

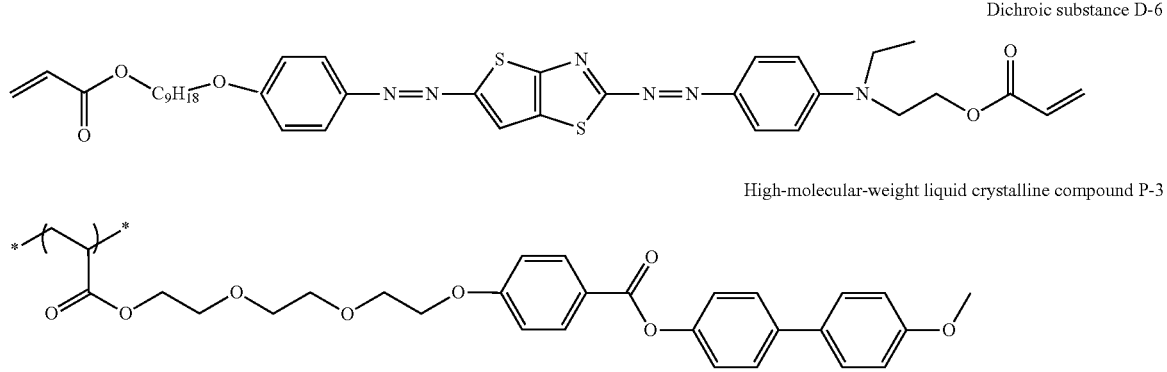

Dichroic substance D-6

High-molecular-weight liquid crystalline compound P-3

Comparative Example 2

An image display device B2 was manufactured in the same manner as in Comparative Example 1, except that the film thickness of the light absorption anisotropic layer was changed from 3 μm to 4.5 μm.

<Evaluation of Performance>

(1) Evaluation of Alignment Degree

The alignment degree of the obtained light absorption anisotropic layer at a wavelength of 550 nm was calculated by the following method.

At the time of measurement using AxoScan OPMF-1 (manufactured by Opto Science Inc.), the transmittance at a wavelength of 550 nm at the omnidirectional angle at each polar angle was measured while changing the polar angle which is an angle of the light absorption anisotropic layer with respect to the normal direction every 5° from 0 to 90°. Next, after removing the influence of surface reflection, the transmittance at an azimuthal angle and a polar angle, at which the transmittance is the highest, is defined as Tm(0), and the transmittance at an angle after further tilting a polar angle, at which the transmittance is the highest, by 400 is defined as Tm(40). Absorbances were calculated by the following equation from the obtained Tm(0) and Tm(40), and A(0) and A(40) are calculated.

$A=-\log(Tm)$

Here, Tm represents a transmittance and A represents an absorbance.

An alignment degree S at a wavelength of 550 nm defined by the following equation was calculated from the calculated A(0) and A(40).

$S=(4.6 \times A(40)-A(0))/(4.6 \times A(40)+2 \times A(0))$

By changing the wavelength from 550 nm to 420 nm, the alignment degree S at a wavelength of 420 nm was calculated.

(2) Evaluation of Transmittance and Tint

Using a measuring machine (EZ-Contrast XL88, manufactured by ELDIM) and the image display device A1 manufactured above, a brightness Y(0) A1 at a polar angle of 0° (front direction), a brightness Y(30) A1 at a polar angle of 30° (oblique direction), a tint a*(0) A1 and a tint b*(0) A1 at a polar angle of 0°, and a tint a*(30) A1 and a tint b*(30) A1 at a polar angle of 30° of a white display screen were measured.

In addition, an image display device C was manufactured in the same manner as in Example 1 in the manufacture of the image display device A1, except that a polarizing plate having no light absorption anisotropic layer was affixed to a liquid crystal cell, and a brightness Y(0) C at a polar angle of 0° (front direction) and a brightness Y(30) C at a polar angle of 30° (oblique direction) of the white display screen were measured, as described above. A front transmittance T0 (T(0)) and an oblique transmittance T30 (T(30)) were determined by comparing with the brightness with a brightness of an image display device C including no light absorption anisotropic layer.

Specifically, the transmittances were calculated using the following equations, and the transmittances were evaluated according to the following standard.

$T(0)=\{Y(0)A1/Y(0)C\} \times 100$ $T(30)=\{Y(30)A1/Y(30)C\} \times 100$

A: The transmittance at a polar angle of 0° (front) is 80% or more, and the transmittance at a polar angle of 30° (oblique) is 10% or less.

B: The transmittance at a polar angle of 0° (front) is lower than 80%, and the transmittance at a polar angle of 30° (oblique) is 10% or less.

Alternatively, the transmittance at a polar angle of 0° (front) is 80% or more, and the transmittance at a polar angle of 30° (oblique) is higher than 10%.

Alternatively, the transmittance at a polar angle of 0° (front) is lower than 80%, and the transmittance at a polar angle of 30° (oblique) is higher than 10%.

In addition, in the evaluation of tints, a tint was calculated using the following equation, and the tint was evaluated according to the following standard.

$|a*b*|=\sqrt{(a*(0)A1^2+b*(0)A1^2)}+\sqrt{(a*(30)A1^2+b*(30)A1^2)}$

AA: $|a*b*|$ is less than 12
A: $|a*b*|$ is 12 or more and less than 15
B: $|a*b*|$ is 15 or more Evaluations of the transmittance and the tint were carried out according to the same procedure as described above, except that image display devices A2 to A5 and B1 to B2 were used instead of the image display device A1.

Furthermore, in the light absorption anisotropic layers obtained in Examples 1 to 5, the dichroic substance was aligned perpendicular to the film surface. The definition of the vertical alignment is as mentioned above.

In Table 1, the "550-nm Alignment degree" represents an alignment degree of the light absorption anisotropic layer at a wavelength of 550 nm, and the "420-nm Alignment degree" represents an alignment degree of the light absorption anisotropic layer at a wavelength of 420 nm.

The "Front" column of the "Transmittance" column shows front transmittances, and the "30°" column shows transmittances at a polar angle of 300 (oblique).

TABLE 1

| | Light absorption anisotropic layer | | | Evaluation results | | | | |
|---|---|---|---|---|---|---|---|---|
| | Composition liquid | 550-nm Alignment degree | 420-nm Alignment degree | Transmittance Evaluation | Front | 30° | Tint Evaluation | Note |
| Example 1 | P1 | 0.96 | 0.94 | A | 80.0% | 8.0% | AA | Laminated with PVA polarizer |
| Example 2 | P2 | 0.96 | 0.93 | A | 80.0% | 8.0% | A | Laminated with PVA polarizer |
| Example 3 | P3 | 0.95 | 0.93 | A | 80.0% | 10.0% | A | Laminated with PVA polarizer |
| Example 4 | P4 | 0.96 | 0.90 | A | 80.0% | 8.0% | B | Laminated with PVA polarizer |
| Example 5 | P1 | 0.96 | 0.94 | A | 80.0% | 8.0% | AA | Laminated with liquid crystal polarizer |
| Comparative Example 1 | P5 | 0.92 | 0.90 | B | 80.0% | 21.0% | B | Laminated with PVA polarizer |
| Comparative Example 2 | P5 | 0.92 | 0.90 | B | 70.0% | 10.0% | B | Laminated with PVA polarizer |

[Appropriateness Confirmation for Curved Surface Processing]

The laminate A1 manufactured in Example 1 was affixed onto a display screen of a smartphone having a curved surface (Galaxy Note 9, manufactured by Samsung), so that the polarizing plate 1 side was on the side to be affixed, using a commercially available adhesive SK2057 (manufactured by Soken Chemical & Engineering Co., Ltd.). Since the laminate A1 has low rigidity with a film thickness of 100 μm or less, bubbles and the like did not enter even in a curved surface portion of the display screen, and the laminate A1 could be neatly affixed.

Subsequently, a louver type optical film (3M™ security/privacy filter PF12 H12 series), which has the same performance as the optical film of the embodiment of the present invention and is widely used in the market, was affixed onto the display screen of the smartphone, using a commercially available adhesive SK2057 (manufactured by Soken Chemical & Engineering Co., Ltd.). Since the louver type optical film has high rigidity with a film thickness of 500 μm, air bubbles entered in a curved surface portion of the display screen, and the louver type optical film could not be neatly affixed.

Example 6

[Formation of Light Absorption Anisotropic Layer]

A light absorption anisotropic layer having patterns of a region A and a region B was manufactured as follows.

The composition P1 for forming a light absorption anisotropic layer was continuously applied onto the alignment layer PA1 of Example 1 with a wire bar to form a coating layer P1.

Next, the coating layer P1 was heated at 140° C. for 30 seconds, and the coating layer P1 was cooled to room temperature (23° C.).

Next, the obtained coating layer P1 was heated at 80° C. for 60 seconds and cooled again to room temperature.

Thereafter, by irradiation with light emitted by a high-pressure mercury lamp through a mask for 60 seconds under the irradiation conditions of an illuminance of 28 mW/cm², a light absorption anisotropic layer having a cured region and a non-cured region of a liquid crystalline compound in the plane were manufactured on an alignment film PA. Furthermore, for the mask, a mask pattern having a light-shielding part (region B) and a light-transmitting part, which has a rectangular light-transmitting part having 10 mm in length×50 mm in width as the region A, was used.

A film having the manufactured light absorption anisotropic layer having the cured region (region A) and the non-cured region (region B) of the liquid crystalline compound in the plane was immersed in ethanol for 3 minutes, the liquid crystalline compounds which had not been polymerized were washed off to form a light absorption anisotropic film 6 having a patterned light absorption anisotropic layer having the regions A and B with different degrees of polarization in the plane.

In the region A, the dichroic substance was aligned perpendicular to the film surface. The definition of the vertical alignment is as mentioned above.

In the region A, the alignment degree at a wavelength of 550 nm was 0.96, and the alignment degree at a wavelength of 420 nm was 0.94.

Further, in the region A, the transmittance at a polar angle of 30° was 10% or less, and the front transmittance was 80% or more. In the region B, both the transmittance at a polar angle of 30° and the front transmittance were 80% or more.

[Manufacture of Laminate A6]

A polarizing plate 1 in which a thickness of a polarizer was 8 μm and one surface of the polarizer was exposed was manufactured by the same method as the polarizing plate 02 with a protective film on one surface described in WO2015/166991A.

The exposed surface of the polarizer of the polarizing plate 1 and the light absorption anisotropic layer surface of the manufactured light absorption anisotropic film 6 were affixed to each other using the pressure sensitive adhesive sheet 1 to manufacture a laminate A6.

[Manufacture of Image Display Device A6]

An image display device A6 was manufactured in the same manner as the image display device A1, except that the laminate A1 was changed to the laminate A6. Only the portion of the region A had a narrow angle of view and was clearly visible only from the front.

Example 7

[Formation of Light Absorption Anisotropic Layer]

A light absorption anisotropic layer having patterns of a region A and a region B was manufactured as follows.

The composition P1 for forming a light absorption anisotropic layer was continuously applied onto the alignment layer PA1 of Example 1 with a wire bar to form a coating layer P1.

Next, the coating layer P1 was heated at 140° C. for 30 seconds, and the coating layer P1 was cooled to room temperature (23° C.).

Next, the obtained coating layer P1 was heated at 80° C. for 60 seconds and cooled again to room temperature.

Thereafter, by irradiation with light emitted by a high-pressure mercury lamp through a mask for 60 seconds under the irradiation conditions of an illuminance of 28 mW/cm$^2$, a light absorption anisotropic layer having a cured region and a non-cured region of a liquid crystalline compound in the plane were manufactured on an alignment film. Furthermore, the mask had a rectangular light-transmitting part of 85 μm in length×50 mm in width as the region A, and a rectangular light-shielding part of 85 μm in length×50 mm in width as the region B, and a mask pattern in which the regions A and B were alternately arranged and the length in the vertical direction was 50 mm was used.

A film having the manufactured light absorption anisotropic layer having a cured region (region A) and an non-cured region (region B) of the liquid crystalline compound in the plane was immersed in ethanol for 3 minutes, the liquid crystalline compounds which had not been polymerized were washed off to form a light absorption anisotropic film 7 having a light absorption anisotropic layer having the regions A and B with different degrees of polarization in the plane.

In the region A, the dichroic substance was aligned perpendicular to the film surface. The definition of the vertical alignment is as mentioned above.

In the region A, the alignment degree at a wavelength of 550 nm was 0.96, and the alignment degree at a wavelength of 420 nm was 0.94.

Further, in the region A, the transmittance at a polar angle of 300 was 10% or less, and the front transmittance was 80% or more. In the region B, both the transmittance at a polar angle of 30° and the front transmittance were 80% or more.

[Manufacture of Laminate A7]

A polarizing plate 1 in which a thickness of a polarizer was 8 μm and one surface of the polarizer was exposed was manufactured by the same method as the polarizing plate 02 with a protective film on one surface described in WO2015/166991A.

The exposed surface of the polarizer of the polarizing plate 1 and the light absorption anisotropic layer surface of the manufactured light absorption anisotropic film 7 were affixed to each other using the pressure sensitive adhesive using a pressure sensitive adhesive, SK2057 (manufactured by Soken Chemical & Engineering Co., Ltd.), to manufacture a laminate A7.

[Manufacture of Image Display Device A7]

Samsung smartphone Galaxy S4 was disassembled, and the polarizing plate attached to the EL substrate was peeled. Pure Ace WR W142 (manufactured by Teijin Limited) and the above-described laminate A7 were affixed to the EL substrate from which the polarizing plate had been peeled, using a pressure sensitive adhesive, SK2057 (manufactured by Soken Chemical & Engineering Co., Ltd.), in which Pure Ace WR W142 was on the EL substrate side and the light absorption anisotropic film 7 side of the laminate A7 was on the visual recognition side. At this time, the affixing was performed so that the regions A and B of the laminate A7 coincided with the pixels of the EL substrate.

In the manufactured image display device A7, an image α for displaying an image only on the pixels overlapping the region A and an image β for displaying the image only on the pixels overlapping the region B were prepared. In a case where the image α was displayed, an image was darker as viewed from the direction of a polar angle of 30° with respect to the absorption axis of the film affixed to the image display device A7, and thus, the image could not be recognized. In addition, in a case where the image β was displayed, a change in the brightness was small as the image was viewed from the direction of a polar angle of 300 with respect to the absorption axis of the film affixed to the image display device A7, and thus, the image could be recognized. Therefore, it could be confirmed that an image display device capable of switching an angle of view can be manufactured by using the patterned light absorption anisotropic film 7.

Example 8

A backlight module capable of switching an angle of view was manufactured with reference to Examples of JP2017-098246A, using the optical filter element 140 as the light absorption anisotropic film 1 manufactured in Example 1.

FIG. 1 is a schematic view of a backlight module according to one Example of the present invention.

Referring to FIG. 1, a backlight module 100 of the present Example includes a first surface light source assembly 110, a second surface light source assembly 120, a first optical sheet 130, and an optical filter element 140.

The first surface light source assembly 110 includes a first light emitting unit 111 and a first light guide plate 112, in which the first light guide plate 112 has a first light exit surface 114 and a first bottom surface 115, facing each other, and a first light receiving surface 113 between the first light exit surface 114 and the first bottom surface 115, and the first light emitting unit 111 is located in the vicinity of the first light receiving surface 113 of the first light guide plate 112.

The second surface light source assembly 120 is located above the first surface light source assembly 110, and includes a second light emitting unit 121 and a second light guide plate 122, in which the second light guide plate 122 has a second light exit surface 124 and a second bottom surface 125, facing each other, and a second light receiving surface 123 between the second light exit surface 124 and the second bottom surface 125, and the second light emitting unit 121 is located in the vicinity of the second light receiving surface 123 of the second light guide plate 122.

The first optical sheet 130 is located above the second surface light source assembly 120, and includes a plurality of prism pillars 131 arranged in the first direction (for example, in the X-axis direction), and a distal end 132 of the prism pillar 131 faces the second surface light source assembly 120. In the present Example, the axial stretching direction of the prism pillar 131 is stretched in the second direction (for example, the Z-axis direction), and the first direction is perpendicular to the second direction. The optical filter element 140 is located between the first surface light source assembly 110 and the second surface light source assembly 120, and the optical filter element 140 transmits incidence rays within a predetermined incidence angle range.

The first light emitting unit 111 provides rays, these rays enter the first light guide plate 112 from the first light receiving surface 113, and the first light guide plate 112 converts the rays, which are thus used as a first surface light source emitted from the first light exit surface 114 of the first light guide plate 112. The second light emitting unit 121 provides rays, and these rays enter the second light guide plate 122 from the second light receiving surface 123, and the second light guide plate 122 converts the rays, which are thus used as a second surface light source emitted from the second light exit surface 124 of the second light guide plate 122.

The first light emitting unit 111 and the second light emitting unit 121 include, for example, a substrate (not shown) and a plurality of light emitting elements (not shown) arranged on the substrate, for example, a light emitting diode, but are not limited thereto. The present invention is not limited in terms of the types of the first light emitting unit 111 and the second light emitting unit 121. In addition, in the first bottom surface 115 of the first light guide plate 112 and the second bottom surface 125 of the second light guide plate 122, a microstructure (not shown) can be provided for the purpose of adjusting the type of light at the time of emitting rays from the first light exit surface 114 and the second light exit surface 124. The microstructure may be a halftone dot, a groove, or the like, but is not limited thereto.

The first optical sheet 130 is, for example, an inversion prism sheet or a composite optical sheet having an inversion prism sheet structure, and the emission angles at the time of emitting rays having different incidence angles from the first optical sheet 130 can be different. Taking the rays incident from the first surface 133 of the prism pillar 131 as an example, in a case where the incidence angle is relatively large, the rays are refracted to the second surface 134 and also reflected to the second surface 134, and then emitted from the light exit side 135 of the first optical sheet 130 at a relatively small emission angle. In a case where the incidence angle is relatively small, the rays are refracted and then emitted from the light exit side 135 of the first optical sheet 130 at a relatively large emission angle. In addition, the axial stretching direction of each prism pillar 131 is, for example, parallel to the Z-axis direction. The distal end 132 of each prism pillar 131 may be subjected to a chamfering treatment, for example, round chamfering.

Specifically, in a case where the first light emitting unit 111 is on, rays L1 are mainly incident on the first surface 133 and the second surface 134 of the prism pillar 131 of the first optical sheet 130 at a relatively small incidence angle, and therefore, the rays are emitted from the light exit side 135 of the first optical sheet 130 at a relatively large emission angle. In a case where the second light emitting unit 121 is on, rays L2 are mainly incident on the first surface 133 and the second surface 134 of the prism pillar 131 of the first optical sheet 130 in FIG. 1 at a relatively large angle of incidence, and therefore, the rays are emitted from the light exit side 135 of the first optical sheet 130 at a relatively small emission angle. In a case where both the first light emitting unit 111 and the second light emitting unit 121 are on, the rays L1 having a relatively large emission angle and the rays L2 having a relatively small emission angle are emitted from the light exit side 135 of the first optical sheet 130, and overlapped, and then a wide angle-of-view surface light source can be formed. Accordingly, in a case where both the first light emitting unit 111 and the second light emitting unit 121 are on, it can be defined as a wide angle-of-view mode. On the other hand, in a case where the first light emitting unit 111 is off and the second light emitting unit 121 is on, the rays L2 having a relatively small emission angle are emitted from the light exit side 135 of the first optical sheet 130, and then a narrow angle-of-view surface light source is formed. Accordingly, in a case where the second light emitting unit 121 is on and the first light emitting unit 111 is off, it can be defined as a narrow angle-of-view mode. That is, the backlight module described in FIG. 1 corresponds to a backlight module capable of switching an angle of view.

From the above, it was confirmed that by using the light absorption anisotropic film 1 of the embodiment of the present invention as the light filter element 140, a backlight module having a high front brightness and capable of switching an angle of view is obtained.

EXPLANATION OF REFERENCES

100: backlight module
110: first surface source assembly
111: first light emitting unit
112: first light guide plate
113: first light receiving surface
114: first light exit surface
115: first bottom surface
120: second surface source assembly
121: second light emitting unit
122: second light guide plate
123: second light receiving surface
124: second light exit surface
125: second bottom surface
130: first optical sheet
131: prism pillar
132: distal end
133: first surface
134: second surface
135: light exit side
140: optical filter element (light absorption anisotropic film)
151, 153: diffusion sheet
152: prism sheet

What is claimed is:

1. A light absorption anisotropic layer comprising:
a liquid crystalline compound; and
at least one dichroic substance,
wherein the dichroic substance is aligned perpendicular to a main surface of the light absorption anisotropic layer, and
an alignment degree of the light absorption anisotropic layer at a wavelength of 550 nm is 0.95 or more.

2. The light absorption anisotropic layer according to claim 1,
wherein an alignment degree of the light absorption anisotropic layer at a wavelength of 420 nm is 0.93 or more.

3. A light absorption anisotropic layer comprising:
a region A including a liquid crystalline compound and at least one dichroic substance; and
a region B having a higher oblique transmittance as viewed from a polar angle of 30° than the region A,
wherein the dichroic substance is aligned perpendicular to a main surface of the light absorption anisotropic layer, and
an alignment degree of the region A at a wavelength of 550 nm is 0.95 or more.

4. The light absorption anisotropic layer according to claim 3,
wherein the oblique transmittance as viewed from a polar angle of 30° of the region A is 10% or less, and
the oblique transmittance as viewed from a polar angle of 30° of the region B is 80% or more.

5. A laminate comprising:
the light absorption anisotropic layer according to claim 1; and
a polarizer layer in which a dichroic substance is aligned horizontally with respect to a film surface, the light absorption anisotropic layer and the polarizer layer being laminated with each other.

6. A laminate comprising:
the light absorption anisotropic layer according to claim 1; and
a polarizer layer in which a liquid crystalline compound and a dichroic substance are aligned horizontally with respect to a film surface, the light absorption anisotropic layer and the polarizer layer being laminated with each other.

7. An optical film comprising the light absorption anisotropic layer according to claim 1.

8. An image display device comprising the light absorption anisotropic layer according to claim 1.

9. The image display device according to claim 8,
wherein the image display device has a curved surface part in a display portion.

10. An image display device capable of switching an angle of view, comprising the light absorption anisotropic layer according to claim 3.

11. An image display device capable of switching an angle of view, comprising the light absorption anisotropic layer according to claim 1.

12. A backlight module capable of switching an angle of view, comprising:
a first light guide plate;
an optical filter element; and
a second light guide plate in this order from a visual recognition side,
wherein the optical filter element is the light absorption anisotropic layer according to claim 1.

13. An image display device comprising the laminate according to claim 5.

14. An image display device comprising the optical film according to claim 7.

15. A laminate comprising:
the light absorption anisotropic layer according to claim 2; and
a polarizer layer in which a dichroic substance is aligned horizontally with respect to a film surface, the light absorption anisotropic layer and the polarizer layer being laminated with each other.

16. A laminate comprising:
the light absorption anisotropic layer according to claim 2; and
a polarizer layer in which a liquid crystalline compound and a dichroic substance are aligned horizontally with respect to a film surface, the light absorption anisotropic layer and the polarizer layer being laminated with each other.

17. An optical film comprising the laminate according to claim 5.

18. An image display device comprising the light absorption anisotropic layer according to claim 2.

19. The image display device according to claim 18,
wherein the image display device has a curved surface part in a display portion.

20. An image display device capable of switching an angle of view, comprising the light absorption anisotropic layer according to claim 4.

21. The light absorption anisotropic layer according to claim 1,
wherein the light absorption anisotropic layer includes a vertical alignment agent.

22. The light absorption anisotropic layer according to claim 21,
wherein the vertical alignment agent includes a boronic acid.

23. The light absorption anisotropic layer according to claim 21,
wherein the vertical alignment agent includes an onium salt.

24. The light absorption anisotropic layer according to claim 3,
wherein the light absorption anisotropic layer includes a vertical alignment agent.

25. The light absorption anisotropic layer according to claim 24,
wherein the vertical alignment agent includes a boronic acid.

26. The light absorption anisotropic layer according to claim 24,
wherein the vertical alignment agent includes an onium salt.

27. An image display device capable of switching an angle of view, comprising the light absorption anisotropic layer according to claim 1 and a liquid crystal cell.

28. An image display device capable of switching an angle of view, comprising the light absorption anisotropic layer according to claim 3 and a liquid crystal cell.

* * * * *